(12) United States Patent
Miki et al.

(10) Patent No.: US 8,416,505 B2
(45) Date of Patent: Apr. 9, 2013

(54) ZOOM LENS AND IMAGE PICKUP APPARATUS USING THE SAME

(75) Inventors: Mayu Miki, Musashino (JP); Akinori Nishio, Hachioji (JP); Takeshi Hosoya, Machida (JP); Minoru Ueda, Sagamihara (JP); Akiko Naito, Hachioji (JP); Tomoyuki Satori, Yokohama (JP); Tetsuya Yanai, Kodaira (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/482,648

(22) Filed: May 29, 2012

(65) Prior Publication Data

US 2012/0300096 A1 Nov. 29, 2012

(30) Foreign Application Priority Data

May 26, 2011  (JP) ................................. 2011-118208
May 26, 2011  (JP) ................................. 2011-118214
May 26, 2011  (JP) ................................. 2011-118217

(51) Int. Cl.
*G02B 15/14* (2006.01)

(52) U.S. Cl.
USPC ......................................................... 359/683

(58) Field of Classification Search .................. 359/676, 359/683
See application file for complete search history.

(56) References Cited

FOREIGN PATENT DOCUMENTS

| JP | 2009-163066 | 7/2009 |
| JP | 2009-186983 | 8/2009 |
| JP | 2010-276655 | 12/2010 |
| JP | 2011-033868 | 2/2011 |

*Primary Examiner* — Jack Dinh
(74) *Attorney, Agent, or Firm* — Kenyon & Kenyon LLP

(57) ABSTRACT

A zoom lens comprises in order from an object side, a first lens unit, a second lens unit, a third lens unit, a fourth lens unit, and a fifth lens unit having, respectively, a positive, negative, positive, negative, and positive refractive power. At the time of zooming from a wide angle end to a telephoto end, the first, third, and fourth lens units move toward the object side. A distance between the first and second lens units increase, a distance between the second and third lens units decrease, a distance between the third lens unit and the fourth lens unit changes, and a distance between the fourth lens unit and the fifth lens unit increases. The zoom lens satisfies the following expressions:

$$1.54 < \beta_{4T}/\beta_{4w} < 3.0 \quad (1a)$$

$$1.0 < \beta_{3T}/\beta_{3w} < 5.0 \quad (2)$$

$$1.0 < \beta_{5T}/\beta_{5w} < 3.0 \quad (3).$$

58 Claims, 25 Drawing Sheets

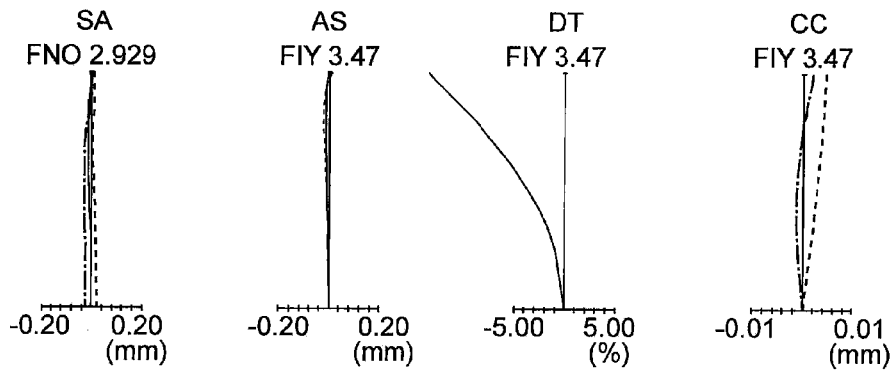
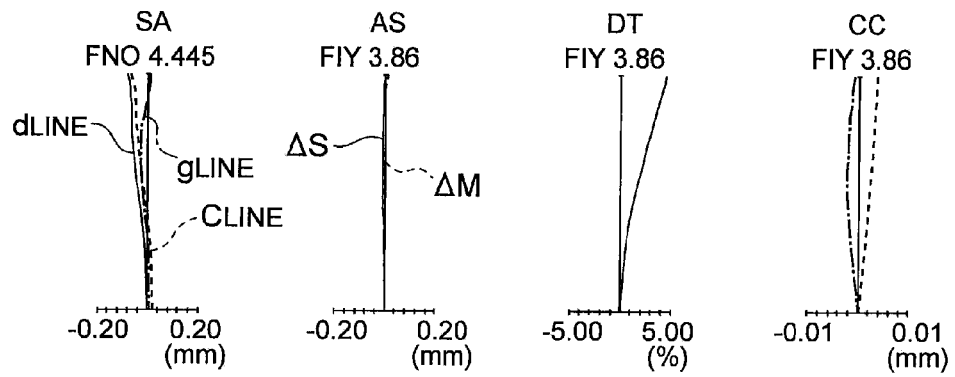
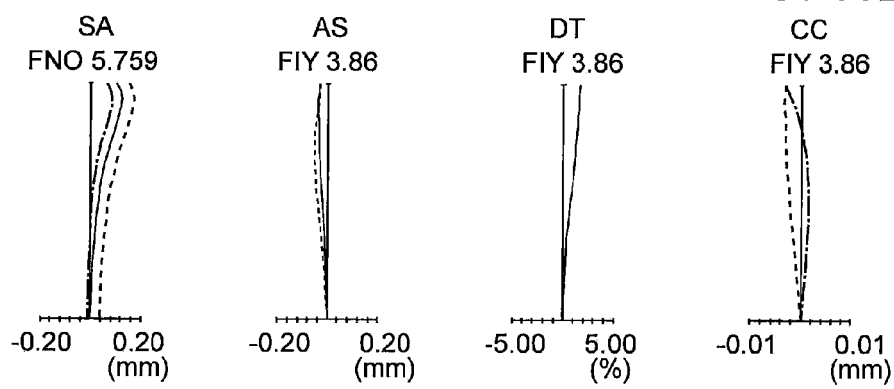

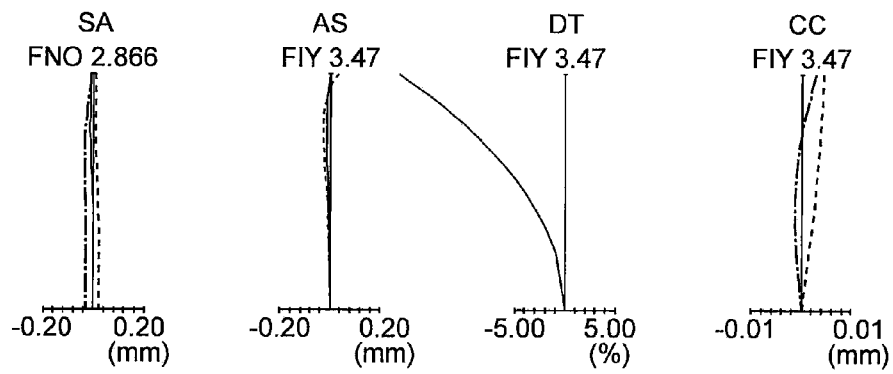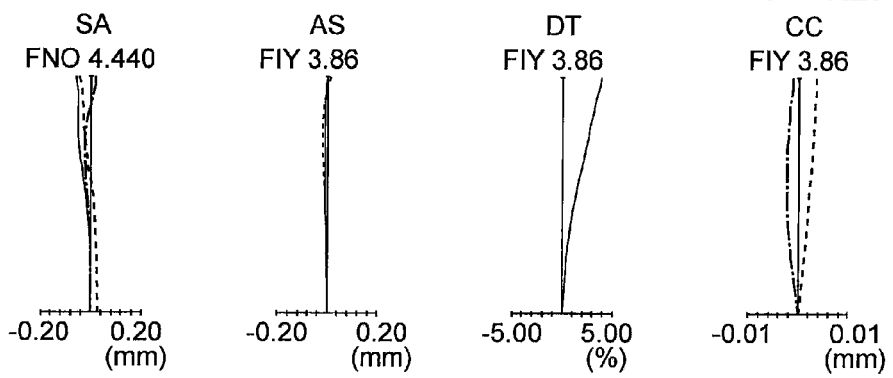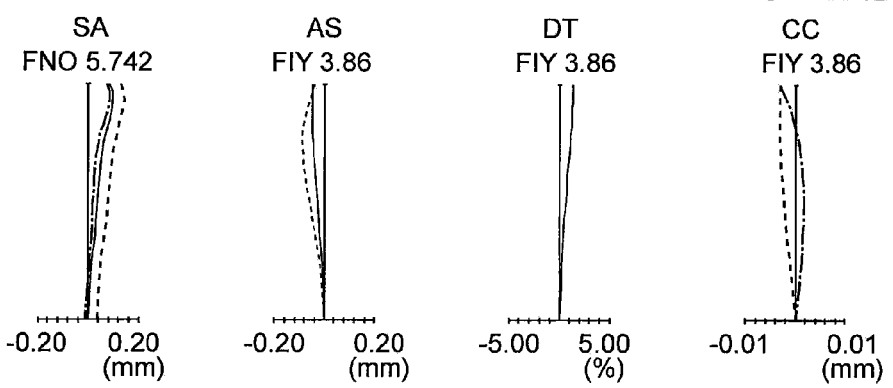

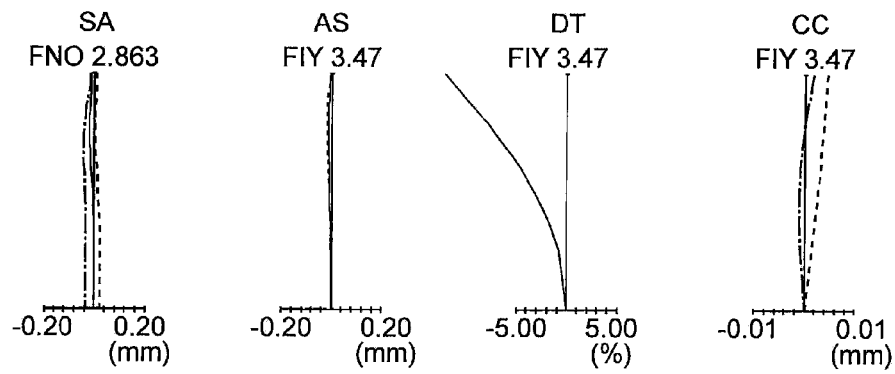
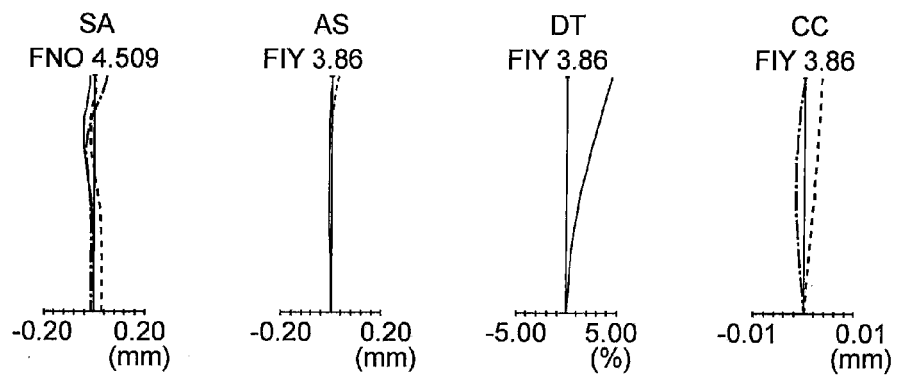
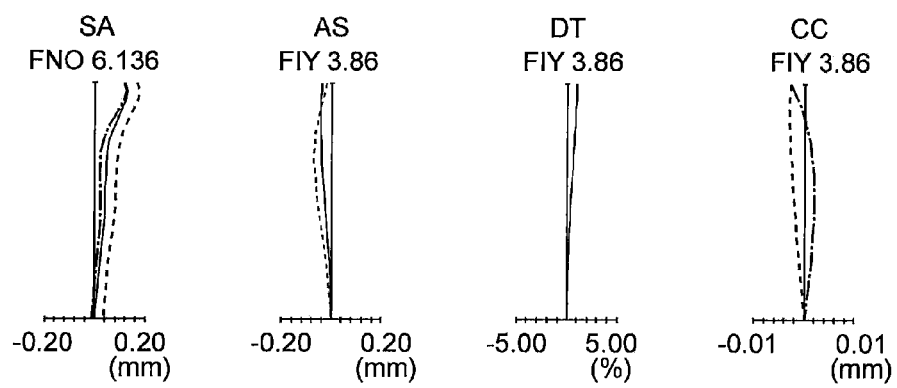

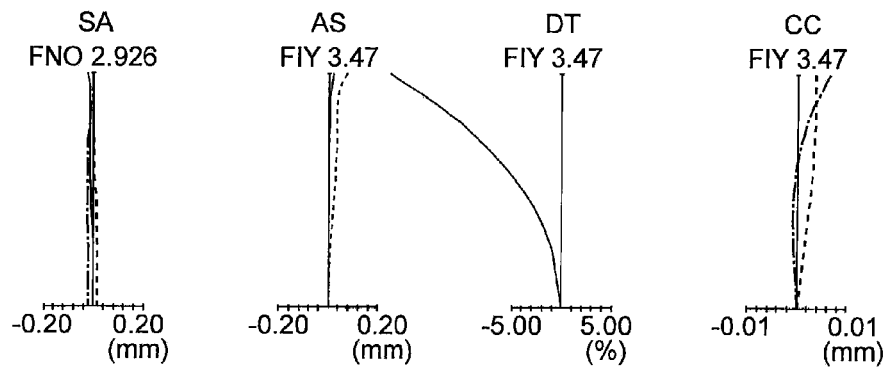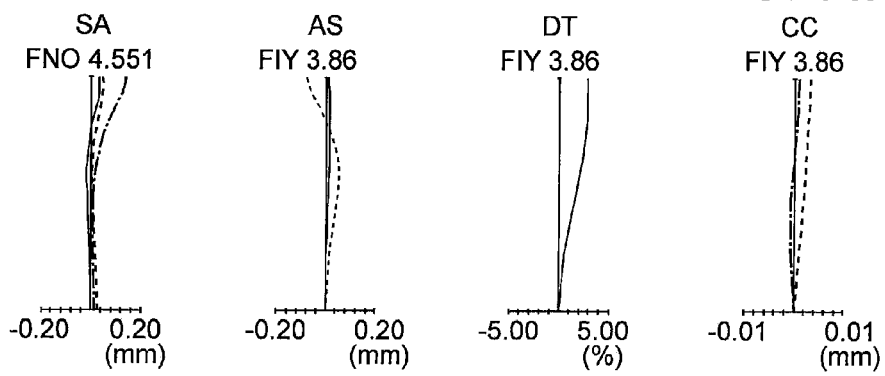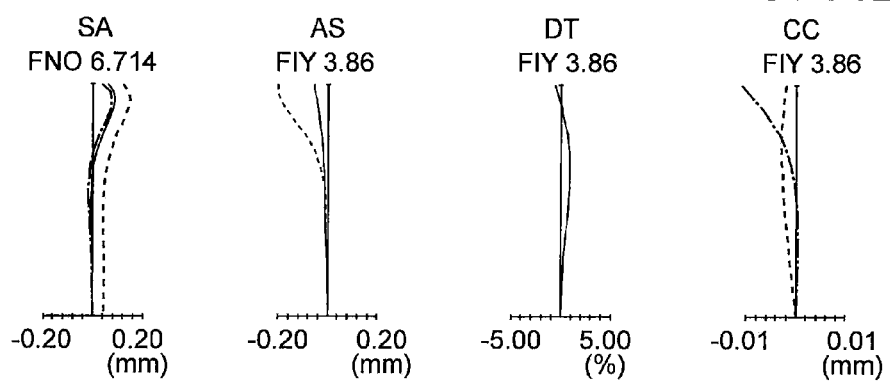

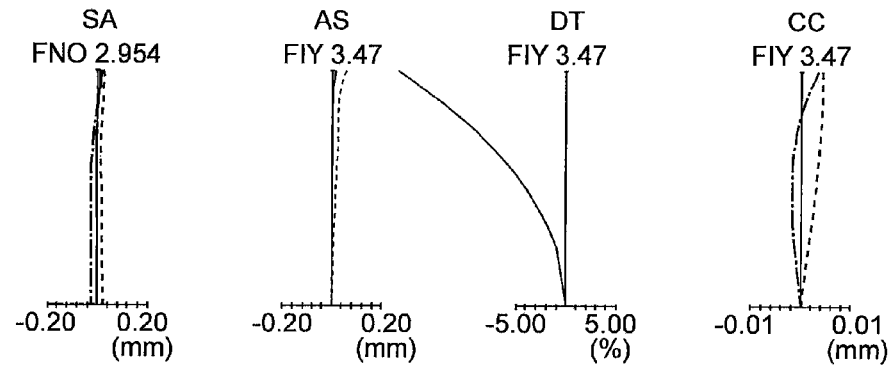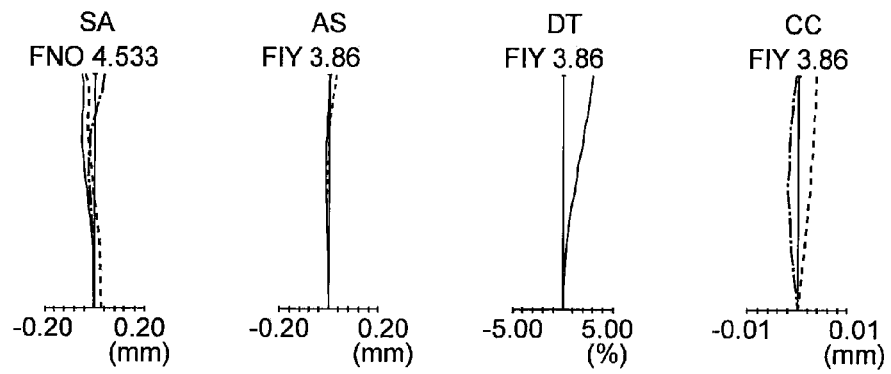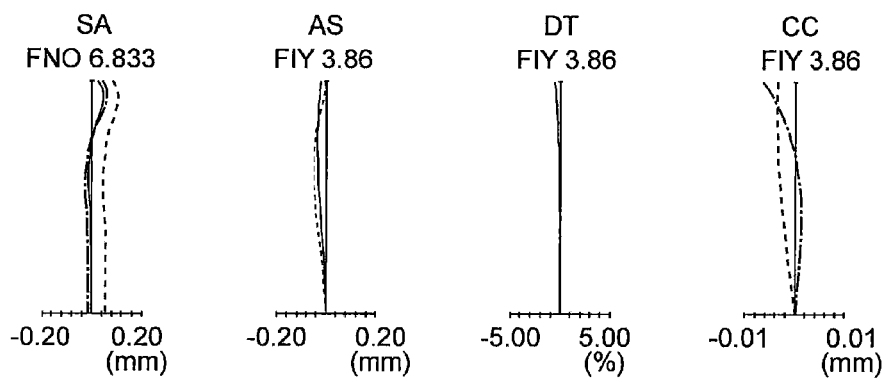

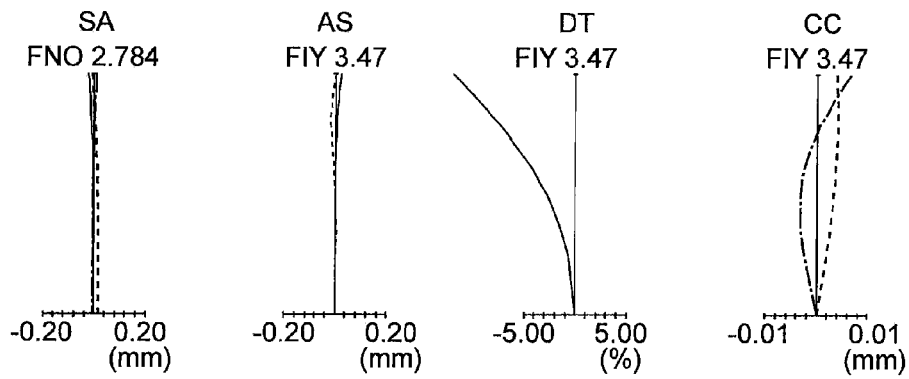
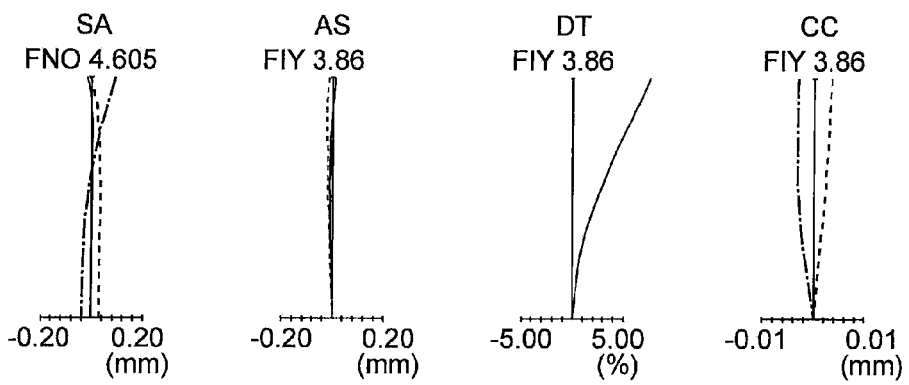
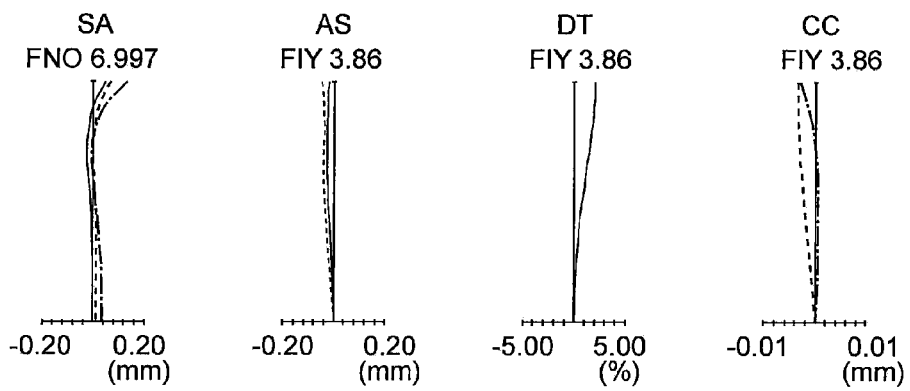

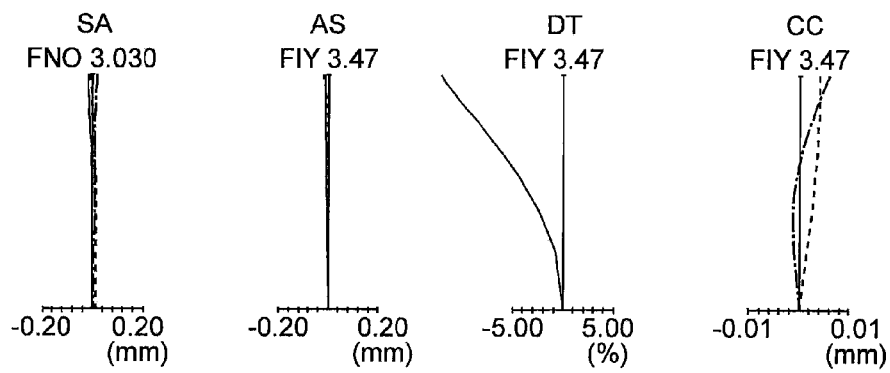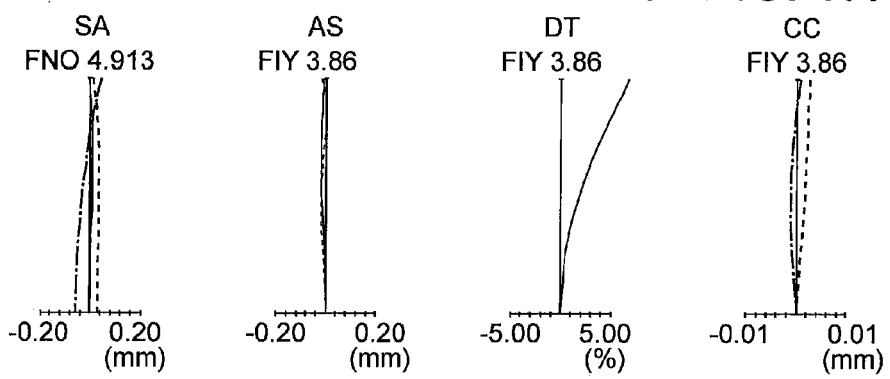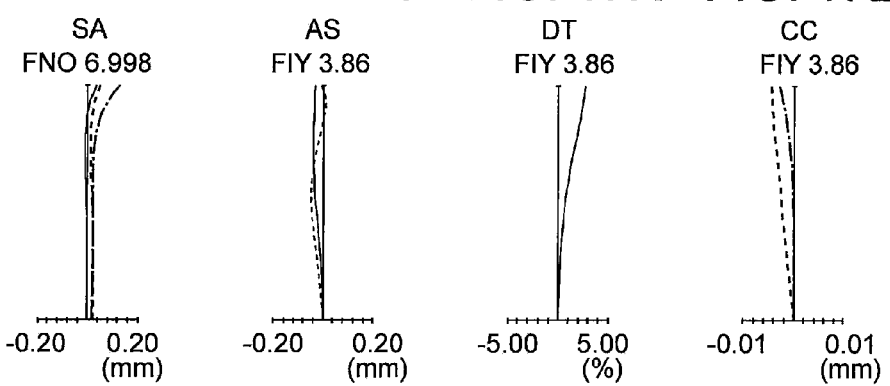

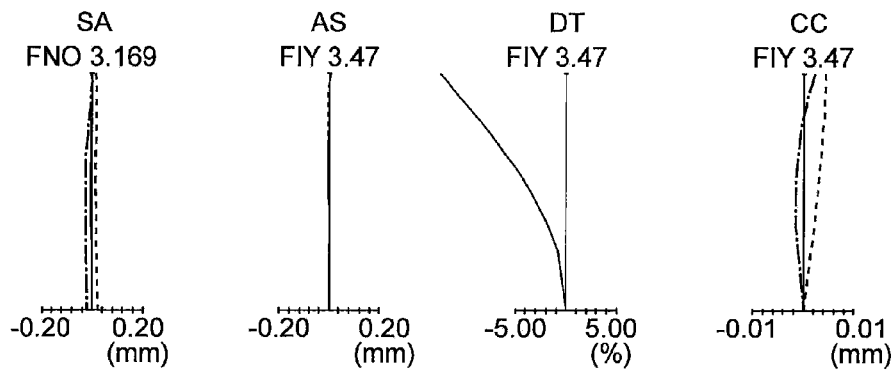
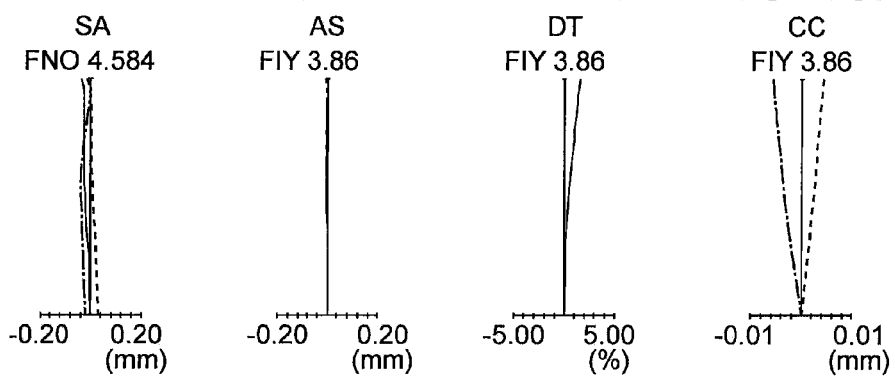
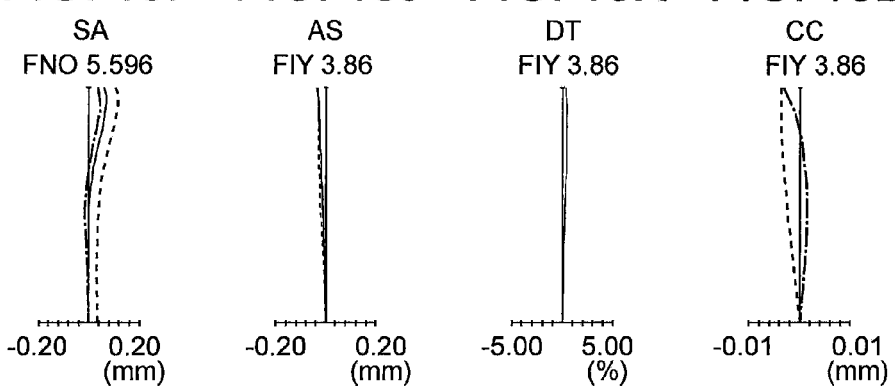

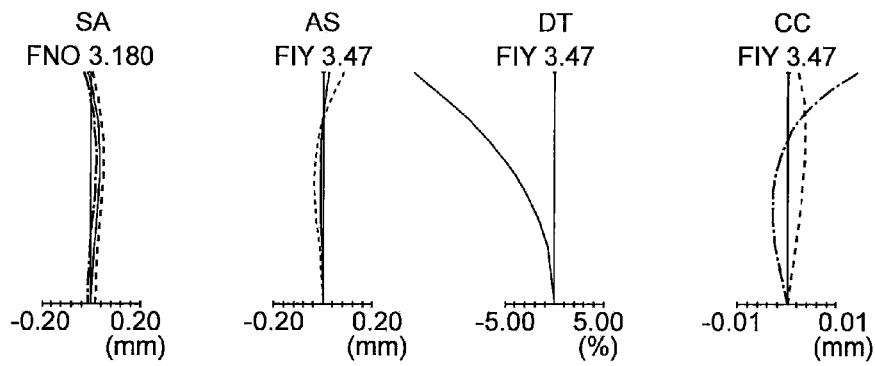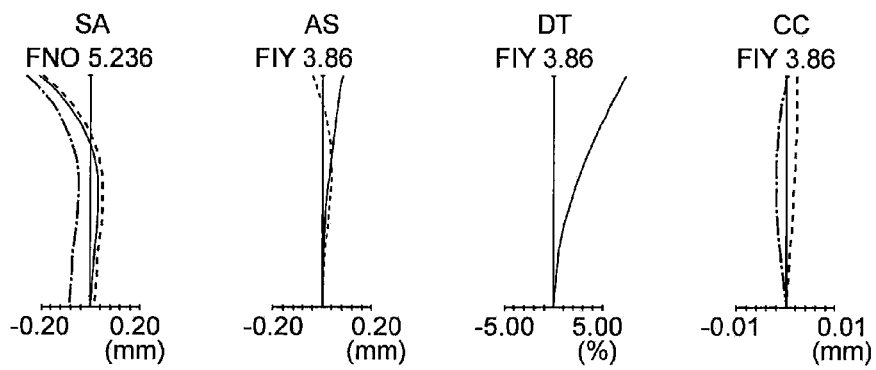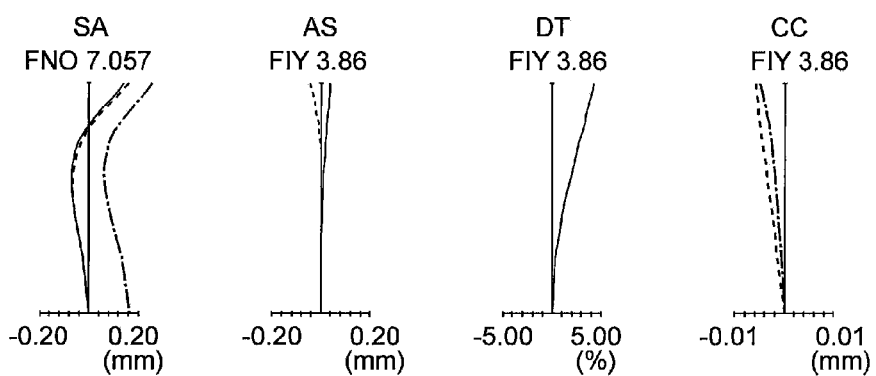

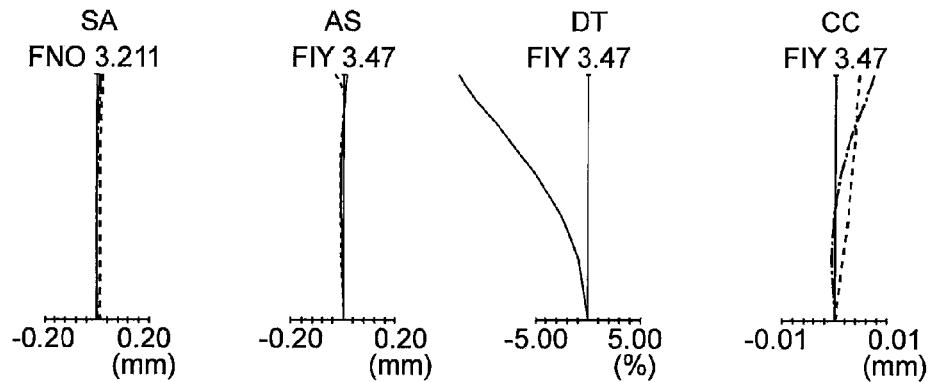
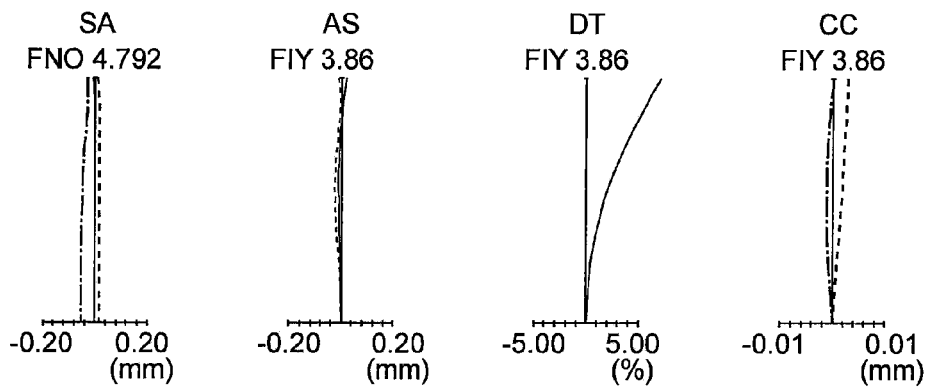
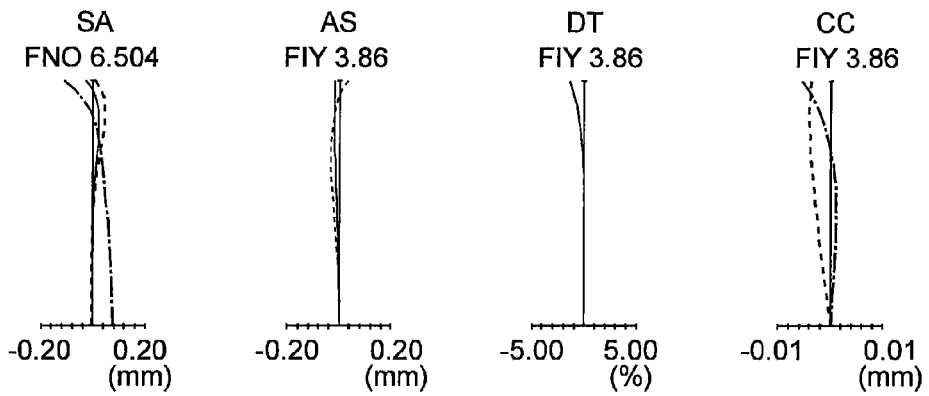

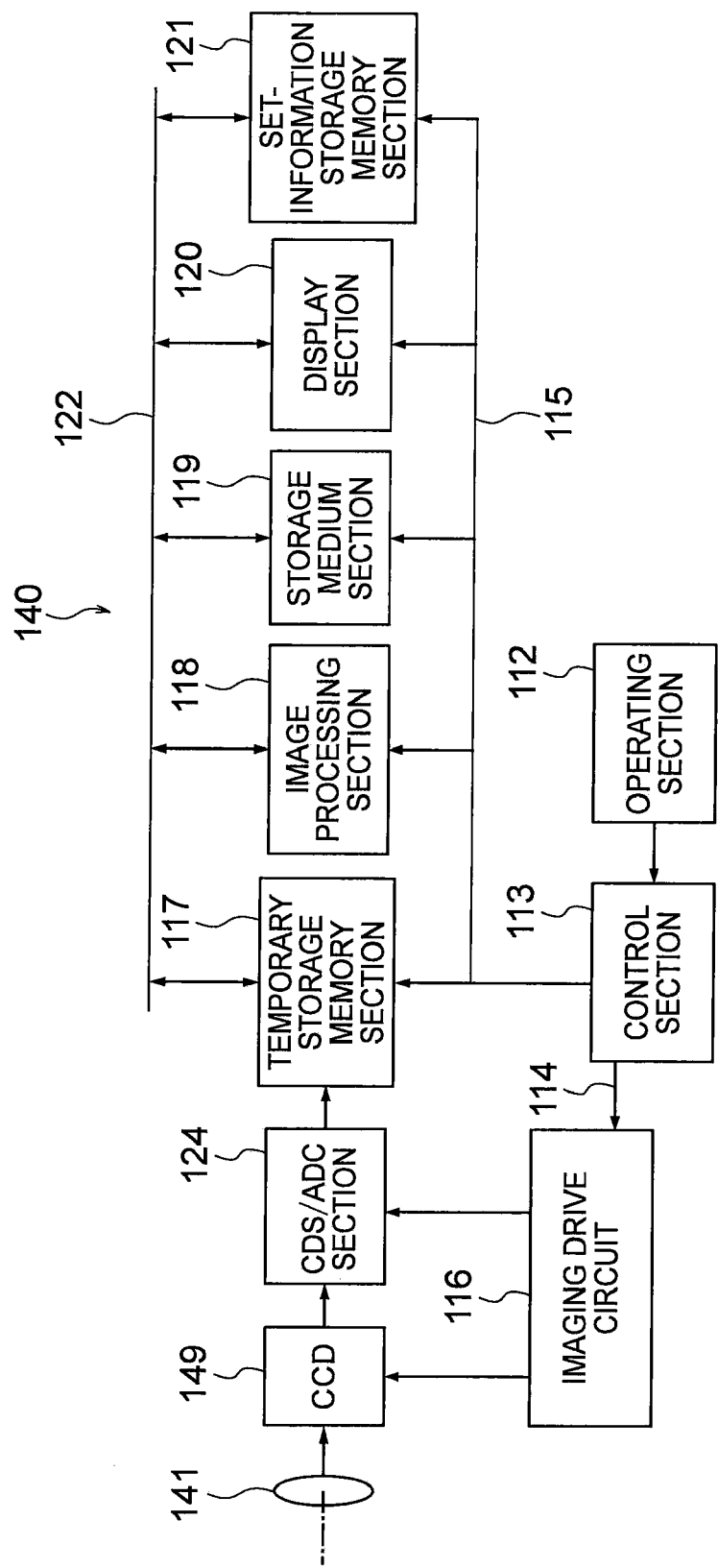

ZOOM LENS AND IMAGE PICKUP APPARATUS USING THE SAME

CROSS-REFERENCE TO RELATED APPLICATION

The present application is based upon and claims the benefit of priority from the prior Japanese Patent Application Nos. 2011-118208 filed on May 26, 2011, 2011-118214 filed on May 26, 2011, and 2011-118217 filed on May 26, 2011; the entire contents of which are incorporated herein by reference.

BACKGROUND OF THE INVENTION

1. Field of the Invention

The present invention relates to a zoom lens and an image pickup apparatus using the same.

2. Description of the Related Art

In recent years, instead of a silver-salt film camera, a digital camera in which, an object is photographed by using an image pickup element such as a CCD (Charge Coupled Device) or a CMOS (Complementary Metal Oxide Semiconductor) has become a mainstream. Furthermore, there are several categories of digital cameras in a wide range from a high-function type for professional use to a compact popular and widely-used type.

From among the digital cameras in the wide range, with the popular and widely-used type digital camera, a user seeks to enjoy photography readily, anywhere at any time with a wide range of scenes. Particularly, since a slim digital camera can be accommodated easily in a pocket of clothes or a bag, and can be carried conveniently, such digital camera has been preferred. Due to this, further small-sizing even of a taking-lens system has been required.

Moreover, since the number of pixels of an image pickup element tends to increase, an improved optical performance corresponding to the increase in the number of pixels has been required. From a point of view of widening a capture area, a zoom lens having a zoom ratio of more than 10 times is becoming common, and even higher zoom ratio is required. On the other hand, an angle of view is also expected to increase.

In order that such requirements are fulfilled, various zoom lens systems have been proposed. As a zoom lens which is compact and having a high zoom ratio, a zoom lens which includes in order from an object side, a first lens unit having a positive refractive power, a second lens unit having a negative refractive power, a third lens unit having a positive refractive power, a fourth lens unit having a negative refractive power, and a fifth lens unit having a positive refractive power has hitherto been known (Japanese Patent Application Laid-open Publication Nos. 2010-276655, 2011-33868, 2009-186983 and 2009-163066)

SUMMARY OF THE INVENTION

A zoom lens according to a first aspect of the present invention consists in order from an object side
a first lens unit having a positive refractive power,
a second lens unit having a negative refractive power,
a third lens unit having a positive refractive power,
a fourth lens unit having a negative refractive power, and
a fifth lens unit having a positive refractive power, and
at the time of zooming from a wide angle end to a telephoto end,
the first lens unit moves toward the object side,
the third lens unit moves toward the object side,
the fourth lens unit moves toward the object side,
a distance between the first lens unit and the second lens unit increases,
a distance between the second lens unit and the third lens unit decreases,
a distance between the third lens unit and the fourth lens unit changes, and
a distance between the fourth lens unit and the fifth lens unit increases, and
the zoom lens satisfies the following conditional expressions (1a), (2), and (3)

$$1.54 < \beta_{4T}/\beta_{4w} < 3.0 \qquad (1a)$$

$$1.0 < \beta_{3T}/\beta_{3w} < 5.0 \qquad (2)$$

$$1.0 < \beta_{5T}/\beta_{5w} < 3.0 \qquad (3)$$

where,
$\beta_{4T}$ denotes a lateral magnification of the fourth lens unit at the telephoto end,
$\beta_{4w}$ denotes a lateral magnification of the fourth lens unit at the wide angle end,
$\beta_{3T}$ denotes a lateral magnification of the third lens unit at the telephoto end,
$\beta_{3w}$ denotes a lateral magnification of the third lens unit at the wide angle end,
$\beta_{5T}$ denotes a lateral magnification of the fifth lens unit at the telephoto end, and
$\beta_{5w}$ denotes a lateral magnification of the fifth lens unit at the wide angle end.

A zoom lens according to a second aspect of the present invention consists in order from an object side
a first lens unit having a positive refractive power,
a second lens unit having a negative refractive power,
a third lens unit having a positive refractive power,
a fourth lens unit having a negative refractive power, and
a fifth lens unit having a positive refractive power, and
at the time of zooming from a wide angle end to a telephoto end,
the first lens unit moves toward the object side,
the third lens unit moves toward the object side,
the fourth lens unit moves toward the object side, and
a distance between the first lens unit and the second lens unit increases,
a distance between the second lens unit and the third lens unit decreases,
a distance between the third lens unit and the fourth lens unit changes, and
a distance between the fourth lens unit and the fifth lens unit increases, and
the zoom lens satisfies the following conditional expressions (1b), (2), (3), and (5b)

$$1.0 < \beta4T/\beta_{4w} < 3.0 \qquad (1b)$$

$$1.0 < \beta_{3T}/\beta_{3w} < 5.0 \qquad (2)$$

$$1.0 < \beta_{5T}/\beta_{5w} < 3.0 \qquad (3)$$

$$0.05 < |f_4|/f_t < 0.12 \qquad (5b)$$

where,
$\beta_{4T}$ denotes a lateral magnification of the fourth lens unit at the telephoto end,
$\beta_{4w}$ denotes a lateral magnification of the fourth lens unit at the wide angle end,
$\beta_{3T}$ denotes a lateral magnification of the third lens unit at the telephoto end, $\beta_{3w}$ denotes a lateral magnification of the third lens unit at the wide angle end, $\beta_{5T}$ denotes a lateral magnification of the fifth lens unit at the telephoto end, and $\beta_{5w}$ denotes a lateral magnification of the fifth lens unit at the wide angle end, $f_4$ denotes a focal length of the fourth lens unit, and $f_t$ denotes a focal length of the overall zoom lens system at the telephoto end.

A zoom lens according to a third aspect of the present invention consists in order from an object side, a first lens unit having a positive refractive power,
a second lens unit having a negative refractive power,
a third lens unit having a positive refractive power,
a fourth lens unit having a negative refractive power, and
a fifth lens unit having a positive refractive power, and at the time of zooming from a wide angle end to a telephoto end, the first lens unit moves toward the object side,
the third lens unit moves toward the object side,
the fourth lens unit moves toward the object side,
a distance between the first lens unit and the second lens unit increases,
a distance between the second lens unit and the third lens unit decreases,
a distance between the third lens unit and the fourth lens unit changes, and
a distance between the fourth lens unit and the fifth lens unit increases, and the zoom lens satisfies the following conditional expressions (22), (1b), and (5b)

$$0.02 < (\beta_{4T}/\beta_{4w})/(f_T/f_w) < 0.25 \quad (22)$$

$$1.0 < \beta_{4T}/\beta_{4w} < 3.0 \quad (1b)$$

$$0.05 < |f_4|/f_t < 0.12 \quad (5b)$$

$\beta_{4T}$ denotes a lateral magnification of the fourth lens unit at the telephoto end, $\beta_{4w}$ denotes a lateral magnification of the fourth lens unit at the wide angle end, $f_t$ denotes a focal length of the overall zoom system lens at the telephoto end, $f_w$ denotes a focal length of the overall zoom lens system at the wide angle end, and $f_4$ denotes a focal length of the fourth lens unit.

An image pickup apparatus according to a fourth aspect of the present invention consists (comprises)

the zoom lens, and an image pickup element having an image pickup element which is disposed on an image side of the zoom lens, and which converts an optical image formed by the zoom lens to an electric signal.

BRIEF DESCRIPTION OF THE DRAWINGS

FIG. 1A shows a state at a wide angle end, FIG. 1B shows an intermediate focal length state, and FIG. 1C shows a state at a telephoto end;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams at the time of infinite object point focusing of the first embodiment;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of infinite object point focusing of the second embodiment;

FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L are aberration diagrams at the time of infinite object point focusing of the third embodiment;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams at the time of infinite object point focusing of the fourth embodiment;

FIG. 15A, FIG. 15B, FIG. 15C, FIG. 15D, FIG. 15E, FIG. 15F, FIG. 15G, FIG. 15H, FIG. 15I, FIG. 15J, FIG. 15K, and FIG. 15L are aberration diagrams at the time of infinite object point focusing of the fifth embodiment;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are aberration diagrams at the time of infinite object point focusing of the sixth embodiment;

FIG. 17A, FIG. 17B, FIG. 17C, FIG. 17D, FIG. 17E, FIG. 17F, FIG. 17G, FIG. 17H, FIG. 17I, FIG. 17J, FIG. 17K, and FIG. 17L are aberration diagrams at the time of infinite object point focusing of the seventh embodiment;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams at the time of infinite object point focusing of the eighth embodiment;

FIG. 19A, FIG. 19B, FIG. 19C, FIG. 19D, FIG. 19E, FIG. 19F, FIG. 19G, FIG. 19H, FIG. 19I, FIG. 19J, FIG. 19K, and FIG. 19L are aberration diagrams at the time of infinite object point focusing of the ninth embodiment;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are aberration diagrams at the time of infinite object point focusing of the tenth embodiment;

FIG. 25 is a structural block diagram of an internal circuit of main components of a digital camera.

DETAILED DESCRIPTION OF THE INVENTION

Figure 1A:
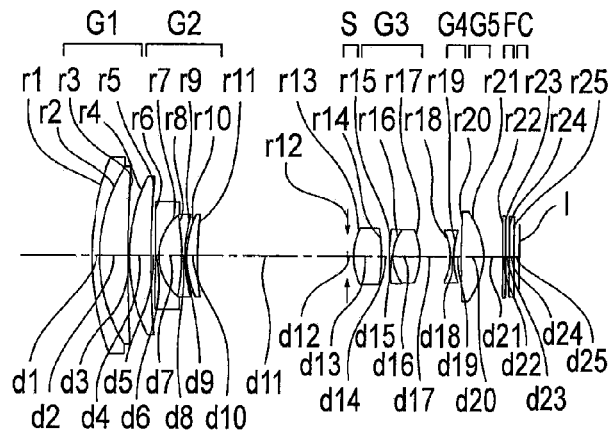
FIG. 1A, FIG. 1B, and FIG. 1C are cross-sectional views at a time of infinite object point focusing according to a first embodiment of the zoom lens according to the present invention, where.

A first zoom lens of the present invention includes in order from an object side, a first lens unit having a positive refractive power, a second lens unit having a negative refractive power, a third lens unit having a positive refractive power, a fourth lens unit having a negative refractive power, and a fifth lens unit having a positive refractive power, and at the time of zooming from a wide angle end to a telephoto end, the first lens unit moves toward the object side, the third lens unit moves toward the object side, the fourth lens unit moves toward the object side, a distance between the first lens unit and the second lens unit increases, a distance between the second lens unit and the third lens unit decreases, a distance between the third lens unit and the fourth lens unit changes, and a distance between the fourth lens unit and the fifth lens unit increases, and the zoom lens satisfies the following conditional expressions (1a), (2), and (3)

$$1.54 < \beta_{4T}/\beta_{4w} < 3.0 \quad (1a)$$

$$1.0 < \beta_{3T}/\beta_{3w} < 5.0 \quad (2)$$

$$1.0 < \beta_{5T}/\gamma_{5w} < 3.0 \quad (3)$$

where, $\beta_{4T}$ denotes a lateral magnification of the fourth lens unit at the telephoto end, $\beta_{4w}$ denotes a lateral magnification of the fourth lens unit at the wide angle end, $\beta_{3T}$ denotes a lateral magnification of the third lens unit at the telephoto end, $\beta_{3w}$ denotes a lateral magnification of the third lens unit at the wide angle end, $\beta_{5T}$ denotes a lateral magnification of the fifth lens unit at the telephoto end, and $\beta_{5w}$ denotes a lateral magnification of the fifth lens unit at the wide angle end.

A second zoom lens of the present invention includes in order from an object side, a first lens unit having a positive refractive power, a second lens unit having a negative refractive power, a third lens unit having a positive refractive power, a fourth lens unit having a negative refractive power, and a fifth lens unit having a positive refractive power, and at the time of zooming from a wide angle end to a telephoto end, the first lens unit moves toward the object side, the third lens unit moves toward the object side, the fourth lens unit moves toward the object side, and a distance between the first lens unit and the second lens unit increases, a distance between the second lens unit and the third lens unit decreases, a distance between the third lens unit and the fourth lens unit changes, and a distance between the fourth lens unit and the fifth lens unit increases, and the zoom lens satisfies the following conditional expressions (1b), (2), (3), and (5b)

$$1.0 < \beta_{4T}/\beta_{4w} < 3.0 \quad (1b)$$

$$1.0 < \beta_{3T}/\beta_{3w} < 5.0 \quad (2)$$

$$1.0 < \beta_{5T}/\beta_{5w} < 3.0 \quad (3)$$

$$0.05 < |f_4|/f_t < 0.12 \quad (5b)$$

where, $\beta_{4T}$ denotes a lateral magnification of the fourth lens unit at the telephoto end, $\beta_{4w}$ denotes a lateral magnification of the fourth lens unit at the wide angle end, $\beta_{3T}$ denotes a lateral magnification of the third lens unit at the telephoto end, $\beta_{3w}$ denotes a lateral magnification of the third lens unit at the wide angle end, $\beta_{5T}$ denotes a lateral magnification of the fifth lens unit at the telephoto end, and $\beta_{5w}$ denotes a lateral magnification of the fifth lens unit at the wide angle end, $f_4$ denotes a focal length of the fourth lens unit, and $f_t$ denotes a focal length of the overall zoom lens system at the telephoto end.

A third zoom lens of the present invention comprises in order from an object side, a first lens unit having a positive refractive power, a second lens unit having a negative refractive power, a third lens unit having a positive refractive power, a fourth lens unit having a negative refractive power, and a fifth lens unit having a positive refractive power, and at the time of zooming from a wide angle end to a telephoto end, the first lens unit moves toward the object side, the third lens unit moves toward the object side, the fourth lens unit moves toward the object side, a distance between the first lens unit and the second lens unit increases, a distance between the second lens unit and the third lens unit decreases, a distance between the third lens unit and the fourth lens unit changes, and a distance between the fourth lens unit and the fifth lens unit increases, and the zoom lens satisfies the following conditional expressions (22), (1b), and (5b)

$$0.02 < (\beta_{4T}/\beta_{4W})/(f_T/f_w) < 0.25 \quad (22)$$

$$1.0 < \beta_{4T}/\beta_{4w} < 3.0 \quad (1b)$$

$$0.05 < |f_4|/f_t < 0.12 \quad (5b)$$

$\beta_{4T}$ denotes a lateral magnification of the fourth lens unit at the telephoto end, $\beta_{4w}$ denotes a lateral magnification of the fourth lens unit at the wide angle end, $f_4$ denotes a focal length of the fourth lens unit, $f_t$ denotes a focal length of the overall zoom lens system at the telephoto end, and $f_w$ denotes a focal length of the overall zoom lens system at the wide angle end.

In the zoom lens according to the present invention, an optical system includes in order from the object side, the first lens unit having a positive refractive power, the second lens unit having a negative refractive power, the third lens unit having a positive refractive power, the fourth lens unit having a negative refractive power, and the fifth lens unit having a positive refractive power. Moreover, at the time of zooming from the wide angle end to the telephoto end, the first lens unit moves toward the object side, the third lens unit moves toward the object side, and the fourth lens unit moves toward the object side. Accordingly, the distance between the first lens unit and the second lens unit increases, the distance between the second lens unit and the third lens unit decreases, the distance between the third lens unit and the fourth lens unit changes, and the distance between the fourth lens unit and the fifth lens unit increases.

By making such an arrangement, in the zoom lens according to the present invention, it is possible to distribute efficiently (in a balanced manner) a load of zooming. Therefore, it is possible to suppress an amount of fluctuation in aberration which occurs at the time of zooming, to be small in each lens unit. Moreover, it is possible to prevent an amount of movement of each group from becoming large. As a result, it is possible to realize a zoom lens having a high zoom ratio while achieving a compactness of the optical system.

Moreover, by the first zoom lens of the present invention satisfying conditional expressions (1a), (2), and (3), the load of zooming on each lens unit is distributed appropriately.

Conditional expression (1a) is a conditional expression related to a zooming effect of the fourth lens unit. When a lower limit of conditional expression (1a) is surpassed, it is possible to secure a large zooming effect of the fourth lens unit. In this case, since an increase in the load of zooming on the second lens unit and the third lens unit is suppressed, it is possible to suppress an aberration which occurs in the second lens unit and the third lens unit. As a result, it is possible to realize a compact zoom lens while securing a desired optical performance.

Moreover, when an upper limit of conditional expression (1a) is surpassed, a refractive power of the fourth lens unit becomes excessively high. Therefore, a correction of aberration which occurs in the fourth lens unit becomes difficult.

Conditional expression (2) is a conditional expression related to the zooming effect of the third lens unit, and conditional expression (3) is a conditional expression related to the zooming effect of the fifth lens unit. By a lower limit of each of conditional expressions (2) and (3) being surpassed, it is possible to impart the zooming effect (increase in magnification) to the third lens unit and the fifth lens unit. Accordingly, it is possible to prevent the load of zooming on the second lens unit and the fourth lens unit from becoming excessive. As a result, it is possible to suppress the fluctuation in aberration in each lens unit, and to make small a telephoto ratio at the telephoto end. Moreover, it is possible to make small a lens diameter of the first lens unit, and to design a compact optical system with a short overall length.

Moreover, when an upper limit of each of conditional expression (2) and (3) is surpassed, the zooming effect (increase in magnification) of the third lens unit and the fifth lens unit becomes excessively large. Therefore, a correction of aberration which occurs in each lens unit becomes difficult.

By the second zoom lens of the present invention satisfying conditional expressions (1b), (2), (3), and (5b), the load of zooming on each lens unit is distributed appropriately. From among conditional expressions (1b), (2), (3), and (5b), conditional expression (1b) is a conditional expression related to the zooming effect of the fourth lens unit, conditional expression (2) is a conditional expression related to the zooming effect of the third lens unit, and conditional expression (3) is a conditional expression related to the zooming effect of the fifth lens unit.

When a lower limit value of each of conditional expressions (1b), (2), and (3) is surpassed, the third lens unit, the fourth lens unit, and the fifth lens unit have an effect of increase in magnification. Accordingly, it is possible to prevent the load of zooming on the second lens unit from becoming excessive. As a result, it is possible to suppress the fluctuation in aberration in each lens unit, as well as to make the telephoto ratio at the telephoto end small. Moreover, it is possible to make small the lens diameter of the first lens unit, and to design a compact optical system with a short overall length. When an upper limit of each of conditional expression (1b), (2), and (3) is surpassed, since an effect of increase in magnification by the third lens unit, the fourth lens unit, and the fifth lens unit becomes excessively large, correction of aberration occurring in each lens unit becomes difficult.

Conditional expression (5b) is an expression in which the focal length of the fourth lens unit is normalized by the focal length of the overall zoom lens system at the telephoto end. By satisfying conditional expression (5b), it is possible to secure the refractive power of the fourth lens unit. As a result, it becomes easy to enlarge (magnify) an image by the first lens unit, the second lens unit, and the third lens unit. Moreover, it is possible to make small an optical effective diameter from the first lens unit to the third lens unit. Moreover, since it is possible to form the optical system compactly, it is possible to curtail the telephoto ratio. Furthermore, since the refractive power of the fourth lens unit is secured, it is possible to make the zoom ratio high. Moreover, it is possible to correct a coma aberration and an astigmatism efficiently.

When an upper limit of conditional expression (5b) is surpassed, the refractive power of the fourth lens unit becomes weak. In this case, since an optical system from the first lens unit up to the third lens unit becomes large, it becomes difficult to realize a compact zoom lens. Moreover, when an attempt is made to achieve a high zooming ratio, it is necessary to make large an amount of movement of the fourth lens unit at the time of zooming. When the amount of movement of the fourth lens unit is increased, since the overall length of the zoom lens becomes long, it becomes difficult to realize a compact zoom lens.

Moreover, when a lower limit of conditional expression (5b) is lowered, the refractive power of the fourth lens unit becomes strong. In this case, since an amount of a spherical aberration and a curvature of field occurring in the fourth lens unit become large, correction of such aberrations becomes difficult. Moreover, an effect (occurrence of aberration) due to decentering of the lens unit becomes large.

By the third zoom lens of the present invention satisfying conditional expressions (22), (1b), and (5b), the load of zooming on each lens unit is distributed even more appropriately. From among conditional expressions (22), (1b), and (5b), conditional expression (22) regulates the ratio of load of the zoom ratio of the fourth lens unit with respect to the overall zoom lens.

By a lower limit of conditional expression (22) being surpassed, it is possible to improve (make high) the ratio of load of the zoom ratio on the fourth lens unit. Accordingly, it is possible to reduce the load of zoom ratio on other lens units including the second lens unit. Furthermore, by the ratio of load of the increase in magnification (zoom ratio) of the second lens unit being reduced, it is possible to shorten the overall length at the wide angle end. As a result, since the effective diameter of the first lens unit becomes small, it is possible to form an optical system which is compact as a whole.

When an upper limit of conditional expression (22) is surpassed, since the fluctuation in aberration such as a curvature of field in the fourth lens unit becomes large, correction of such aberrations becomes difficult.

Conditional expression (1b) is a conditional expression related to the zooming effect of the fourth lens unit. By a lower limit value of the conditional expression (1b) being surpassed, the fourth lens unit is imparted the effect of increase in magnification. Accordingly, it is possible to prevent the load of zooming on the second lens unit and the third lens unit from becoming excessive. As a result, it is possible to suppress the fluctuation in aberration in each lens unit, and to make small the telephoto ratio at the telephoto end. Moreover, it is possible to make small the lens diameter of a lens unit such as the first lens unit, as well as to design a compact optical system with a short overall length.

When an upper limit of conditional expression (1b) is surpassed, since the effect of increase in magnification by the fourth lens unit becomes large, correction of aberration which occurs in the fourth lens unit becomes difficult.

Conditional expression (5b) is an expression in which the focal length of the fourth lens unit is normalized by the focal length of the overall zoom lens system at the telephoto end. When an upper limit of conditional expression (5b) is surpassed, the refractive power of the fourth lens unit becomes weak. In this case, the load of zooming on the fourth lens unit becomes small. Therefore, when an attempt is made to achieve a high zoom ratio, it is necessary to make large the amount of movement of the fourth lens unit at the time of zooming. When the amount of movement of the fourth lens unit is increased, since the overall length of the zoom lens becomes long, it becomes difficult to realize a compact zoom lens.

Moreover, when a lower limit of conditional expression (5b) is lowered, the refractive power of the fourth lens unit becomes strong. In this case, since an amount of a spherical aberration and a curvature of field occurring in the fourth lens unit become large, correction of such aberrations becomes difficult. Moreover, an effect (occurrence of aberration) due to decentering of the lens unit becomes large.

Moreover, it is preferable that the first zoom lens, the second zoom lens, and the third zoom lens according to the present invention satisfy the following conditional expression (4).

$$1.0 \leq \Delta 3G/\Delta 4G \leq 1.9 \tag{4}$$

where, $\Delta 3G$ denotes an amount of movement of the third lens unit from a wide angle end position to a telephoto end position, and $\Delta 4G$ denotes an amount of movement of the fourth lens unit from a wide angle end position to a telephoto end position.

Conditional expression (4) is an expression in which an amount of movement of the third lens unit is normalized by the amount of movement of the fourth lens unit. When an upper limit of conditional expression (4) is surpassed, the amount of movement of the third lens unit with respect to the amount of movement of the fourth lens unit at the time of zooming becomes excessively large. Therefore, the fourth lens unit comes further closer to the fifth lens unit. Here, the correction of curvature of field is carried out in the fourth lens unit and the fifth lens unit. Therefore, as the fourth lens unit comes closer to the fifth lens unit, when there is a decentering between the fourth lens unit and the fifth lens unit, the curvature of field cannot be corrected fully. As a result, the performance of the optical system is degraded remarkably.

Moreover, when a lower limit of conditional expression (4) is lowered, the amount of movement of the third lens unit with respect to the amount of movement of the fourth lens unit at the time of zooming becomes excessively small. Therefore, the fourth lens unit comes further closer to the third lens unit. Here, correction of spherical aberration is carried out in the third lens unit and the fourth lens unit. Therefore, as the fourth lens unit comes closer to the third lens unit, when there is a decentering between the third lens unit and the fourth lens unit, the spherical aberration cannot be corrected fully. As a result, the performance of the optical system is degraded remarkably.

Moreover, it is preferable that the first zoom lens of the present invention satisfies the following conditional expression (5a).

$$0.05 < |f_4|/f_t < 0.14 \tag{5a}$$

where, $f_4$ denotes a focal length of the fourth lens unit, and $f_t$ denotes a focal length of the overall zoom lens system at the telephoto end.

Conditional expression (5a) is an expression in which the focal length of the fourth lens unit is normalized by the focal length of the overall zoom lens system at the telephoto end. When an upper limit of conditional expression (5a) is surpassed, the refractive power of the fourth lens unit becomes weak. In this case, the load of zooming on the fourth lens unit becomes small. Therefore, when an attempt is made to achieve a high zoom ratio, it is necessary to make large the amount of movement of the fourth lens unit at the time of zooming. When the amount of movement of the fourth lens unit is increased, since the overall length of the zoom lens becomes long, it becomes difficult to realize a compact zoom lens.

Moreover, when a lower limit of conditional expression (5a) is lowered, the refractive power of the fourth lens unit becomes strong. In this case, since the amount of a spherical aberration and a curvature of field occurring in the fourth lens unit become large, correction of such aberrations becomes difficult. Moreover, an effect (occurrence of aberration) due to decentering of the lens unit becomes large.

Moreover, it is preferable that the first zoom lens, the second zoom lens, and the third zoom lens according to the present invention satisfy the following conditional expression (6).

$$0.05 < |f_5|/f_t < 0.3 \tag{6}$$

where, $f_5$ denotes a focal length of the fifth lens unit, and $f_t$ denotes the focal length of the overall zoom lens system at the telephoto end.

Conditional expression (6) is an expression in which the focal length of the fifth lens unit is normalized by the focal length of the overall zoom lens system at the telephoto end. When an upper limit of conditional expression (6) is surpassed, the refractive power of the fifth lens unit becomes weak. In this case, since the load of zooming on the fifth lens unit becomes small, it becomes difficult to realize a zoom lens having a high zoom ratio. Moreover, when an attempt is made to make the zoom ratio high, it becomes difficult to form the zoom lens compactly.

When a lower limit of conditional expression (6) is lowered, the refractive power of the fifth lens unit becomes strong. In this case, since the amount of the curvature of field occurring in the fifth lens unit becomes large, correction of the curvature of field becomes difficult.

Moreover, it is preferable that the first zoom lens, the second zoom lens, and the third zoom lens according to the present invention satisfy the following conditional expression (7).

$$0.05 < |f_3|/f_t < 0.15 \tag{7}$$

where, $f_3$ denotes a focal length of the third lens unit, and $f_t$ denotes the focal length of the overall zoom lens system at the telephoto end.

Conditional expression (7) is an expression in which, the focal length of the third lens unit is normalized by the focal length of the overall zoom lens system at the telephoto end. When an upper limit of conditional expression (7) is surpassed, the refractive power of the third lens unit becomes weak. In this case, the load of zooming on the third lens unit becomes small. Therefore, when an attempt is made to achieve a high zoom ratio, it is necessary to make large the amount of movement of the third lens unit at the time of zooming. When the amount of movement of the third lens unit is increased, since the overall length of the zoom lens becomes long, it becomes difficult to realize a compact zoom lens.

Moreover, when a lower limit of conditional expression (7) is lowered, the refractive power of the third lens unit becomes strong. In this case, since an amount of a spherical aberration and a curvature of field occurring in the third lens unit become large, correction of such aberrations becomes difficult. Moreover, an effect due to decentering of the lens units becomes large.

Moreover, it is preferable that the first zoom lens, the second zoom lens, and the third zoom lens according to the present invention satisfy the following conditional expression (8).

$$0.02 < |f_2|/f_t < 0.15 \qquad (8)$$

where, $f_2$ denotes a focal length of the second lens unit, and $f_t$ denotes the focal length of the overall zoom lens system at the telephoto end.

Conditional expression (8) is an expression in which, the focal length of the second lens unit is normalized by the focal length of the overall zoom lens system at the telephoto end. When an upper limit of conditional expression (8) is surpassed, the refractive power of the second lens unit becomes weak. In this case, the load of zooming on the second lens unit becomes small. Therefore, when an attempt is made to achieve a high zoom ratio, it is necessary to make large an amount of movement of the second lens unit at the time of zooming. When the amount of movement of the second lens unit is increased, since the overall length of the zoom lens becomes long, it becomes difficult to realize a compact zoom lens.

Moreover, when a lower limit of conditional expression (8) is lowered, the refractive power of the second lens unit becomes strong. In this case, since an amount of a curvature of field occurring in the second lens unit become large, correction of the curvature of field becomes difficult. Moreover, an effect due to decentering of the lens units becomes large.

Moreover, it is preferable that the first zoom lens, the second zoom lens, and the third zoom lens according to the present invention satisfy the following conditional expression (9).

$$0.2 < |f_1|/f_t < 0.6 \qquad (9)$$

where, $f_1$ denotes a focal length of the first lens unit, and $f_t$ denotes the focal length of the overall zoom lens system at the telephoto end.

Conditional expression (9) is an expression in which, the focal length of the first lens unit is normalized by the focal length of the overall zoom lens system at the telephoto end. When an upper limit of conditional expression (9) is surpassed, the refractive power of the first lens unit becomes weak. In this case, the load of zooming on the first lens unit becomes small. Therefore, when an attempt is made to achieve a high zoom ratio, it is necessary to make large an amount of movement of the first lens unit at the time of zooming. When the amount of movement of the first lens unit is increased, since the overall length of the zoom lens becomes long, it becomes difficult to realize a compact zoom lens.

Moreover, when a lower limit of conditional expression (9) is lowered, the refractive power of the first lens unit becomes strong. In this case, since the amount of a spherical aberration occurring in the first lens unit becomes large, correction of the spherical aberration becomes difficult.

Moreover, it is preferable that the first zoom lens, the second zoom lens, and the third zoom lens according to the present invention satisfy the following conditional expression (10).

$$-0.7 \leq \Delta 5G/\Delta 4G \leq 0 \qquad (10)$$

where, $\Delta 4G$ denotes the amount of movement of the fourth lens unit from the wide angle end position to the telephoto end position, and $\Delta 5G$ denotes an amount of movement of the fifth lens unit from a wide angle end position to a telephoto end position.

Conditional expression (10) is an expression in which, the amount of movement of the fifth lens unit is normalized by the amount of movement of the fourth lens unit. When an upper limit of conditional expression (10) is surpassed, the fifth lens unit moves toward the object side at the time of zooming. Therefore, since the zooming effect of the fifth lens unit becomes small, it becomes difficult to realize a zoom lens having a high zooming.

When a lower limit of conditional expression (10) is lowered, the amount of movement of the fifth lens unit with respect to the amount of movement of the fourth lens unit at the time of zooming becomes large. In this case, since a fluctuation in the curvature of field and chromatic aberration in the fifth lens unit at the time of zooming becomes large, correction of these aberrations becomes difficult. Moreover, the amount of movement of the fourth lens unit with respect to the amount of movement of the fifth lens unit becomes small. Here, the correction of the curvature of field is carried out in the fourth lens unit and the fifth lens unit. Therefore, when there is a decentering between the fourth lens unit and the fifth lens unit, the curvature of field is not corrected fully. As a result, the performance of the optical system is degraded remarkably.

Moreover, it is preferable that the first zoom lens, the second zoom lens, and the third zoom lens according to the present invention satisfy the following conditional expression (11).

$$-1.5 \leq \Delta 5G/f_w \leq 0 \qquad (11)$$

where, $\Delta 5G$ denotes the amount of movement of the fifth lens unit from the wide angle end position to the telephoto end position, and $f_w$ denotes a focal length of the overall zoom lens at the wide angle end.

Conditional expression (11) is an expression in which the amount of movement of the fifth lens unit is normalized by the focal length of the overall zoom lens system at the wide angle end. When an upper limit of conditional expression (11) is surpassed, the zooming effect (effect of increase in magnification) in the fifth lens unit cannot be achieved. In this case, since the load of zooming on the other lens units becomes large, an amount of aberration occurring in each lens unit increases.

Moreover, when a lower limit of conditional expression (11) is lowered, since the fluctuation in the curvature of field and the chromatic aberration in the fifth lens unit at the time of zooming becomes large, correction of these aberrations becomes difficult.

Moreover, it is preferable that in the first zoom lens, the second zoom lens, and the third zoom lens according to the present invention, the third lens unit moves integrally with an aperture stop, and that the first zoom lens, the second zoom lens, and the third zoom lens satisfy the following conditional expression (12).

$$\Delta 3G/f_t \leq 0.2 \quad (12)$$

where, $\Delta 3G$ denotes the amount of movement of the third lens unit from the wide angle end position to the telephoto end position, and $f_t$ denotes the focal length of the overall zoom lens system at the telephoto end.

Conditional expression (12) is an expression in which the amount of movement of the third lens unit is normalized by the focal length of the overall zoom lens system at the telephoto end. By satisfying conditional expression (12), it is possible to suppress the amount of movement of the third lens unit. Accordingly, it is possible to suppress the fluctuation in various aberrations and the fluctuation in F-number at the time of zooming.

Moreover, it is preferable that the first zoom lens, the second zoom lens, and the third zoom lens according to the present invention satisfy the following conditional expression (13).

$$(\beta_{2T}/\beta_{2w})/(f_t/f_w) \leq 0.45 \quad (13)$$

where, $\beta_{2T}$ denotes lateral magnification of the second lens unit at the telephoto end, $\beta_{2w}$ denotes lateral magnification of the second lens unit at the wide angle end, $f_t$ denotes the focal length of the overall zoom lens system at the telephoto end, and $f_w$ denotes the focal length of the overall zoom lens system at the wide angle end.

Conditional expression (13) is a regulation related to the load of zooming on the second lens unit. By satisfying conditional expression (13), it is possible to suppress the zoom ratio of the second lens unit with respect to the zoom ratio of the overall zoom lens. As a result, it is possible to suppress effectively various aberrations occurring in the second lens unit. Moreover, since an amount of fluctuation in the aberration occurring with the zooming is suppressed, it is possible to secure a favorable optical performance (a state in which the aberrations are corrected favorably) over the entire zooming area.

Moreover, it is preferable that the first zoom lens, the second zoom, and the third zoom lens according to the present invention satisfy the following conditional expression (14).

$$|\beta_{2T}| \geq 0.8 \quad (14)$$

Where, $\beta_{2T}$ denotes the lateral magnification of the second lens unit at the telephoto end.

Conditional expression (14) is a regulation related to the lateral magnification of the second lens unit at the telephoto end. When a lower limit of conditional expression (14) is lowered, since the degree of divergence of an axial light beam incident on the third lens unit is high, an effective diameter in the fifth lens unit becomes large. As a result, it becomes difficult to realize a compact zoom lens.

Moreover, in the first zoom lens, the second zoom lens, and the third zoom lens of the present invention, it is preferable that the first lens unit includes a first lens element having a positive refractive power and a second lens element having a positive refractive power, and the first zoom lens, the second zoom lens, and the third zoom lens satisfy the following conditional expressions (15) and (16).

$$-2.0 \leq (R_{1r}+R_{1l})/(R_{1r}-R_{1l}) \leq -0.3 \quad (15)$$

$$-2.0 \leq (R_{2r}+R_{2l})/(R_{2r}-R_{2l}) \leq -0.9 \quad (16)$$

where, $R_{1r}$ denotes a radius of curvature of an object-side surface of the first lens element in the first lens unit, $R_{1l}$ denotes a radius of curvature of an image-side surface of the first lens element in the first lens unit, $R_{2r}$ denotes a radius of curvature of an object-side surface of the second lens element in the first lens unit, and $R_{2l}$ denotes a radius of curvature of an image-side surface of the second lens element in the first lens unit.

Conditional expressions (15) and (16) are shape factors for lenses of positive refractive power in the first lens unit, and more elaborately, the first lens element having a positive refractive power and the second lens element having a positive refractive power. By satisfying conditional expressions (15) and (16), a refractive power of an object-side surface in each lens becomes stronger than a refractive power of an image-side surface. Therefore, it is possible to suppress a coma aberration. As a result, even when there is a decentering of units between the first lens unit and the second lens unit, it is possible to suppress deterioration of aberration.

Moreover, in the first zoom lens, the second zoom lens, and the third zoom lens according to the present invention, it is preferable that the first lens unit includes a cemented lens in which, a lens having a negative refractive power and a lens having a positive refractive power are cemented, and satisfies the following conditional expression (17).

$$0.4 \leq R_{1c}/f_1 \leq 0.7 \quad (17)$$

where, $f_1$ denotes the focal length of the first lens unit, and $R_{1c}$ denotes a radius of curvature of a cemented surface of the cemented lens in the first lens unit.

Conditional expression (17) is an expression in which, a radius of curvature of a cemented surface of the cemented lens in the first lens unit is normalized by the focal length of the first lens unit. When an upper limit of conditional expression (17) is surpassed, since the radius of curvature of the cemented surface becomes large (the curvature becomes gentle), there is an increase in the longitudinal chromatic aberration.

When a lower limit of conditional expression (17) is lowered, since the radius of curvature of the cemented surface becomes small (the curvature becomes sharp), there is an increase in an amount of various aberrations such as chromatic coma aberration.

Moreover, in the first zoom lens, the second zoom lens, and the third zoom lens according to the present invention, it is preferable that the number of lenses in the fourth lens unit is one, and the number of lenses in the fifth lens unit is one. By letting each of the fourth lens unit and the fifth lens unit have the minimum number of lenses, it is possible to let the zoom lens have a compact structure.

Moreover, in the first zoom lens, the second zoom lens, and the third zoom lens according to the present invention, it is preferable that the lens in the fourth lens unit is a negative lens, and the negative lens satisfies the following conditional expression (18).

$$\nu_{d4} \geq 60 \quad (18)$$

where, $\nu_{d4}$ denotes Abbe's number for the negative lens in the fourth lens unit.

Conditional expression (18) is a regulation related to the negative lens in the fourth lens unit. By satisfying conditional expression (18), even when the amount of movement of the fourth lens unit becomes large due to the zoom ratio borne by the fourth lens unit, it is possible to suppress the fluctuation in the chromatic aberration.

Moreover, it is preferable that the first zoom lens, the second zoom lens, and the third zoom lens according to the present invention satisfy the following conditional expression (19).

$$\nu_{d1G} \geq 70 \quad (19)$$

where, $\nu_{d1G}$ denotes an average value of Abbe's number for the positive lenses in the first lens unit.

Conditional expression (19) is a regulation related to the positive lenses in the first lens unit. By satisfying conditional expression (19), it is possible to suppress the chromatic aberration occurring in the first lens unit.

Moreover, it is preferable that the first zoom lens, the second zoom lens, and the third zoom lens according to the present invention satisfy the following conditional expression (20).

$$f_t/f_w > 11 \quad (20)$$

where, $f_t$ denotes the focal length of the overall zoom lens system at the telephoto end, and $f_w$ denotes the focal length of the overall zoom lens system at the wide angle end.

Conditional expression (20) is a regulation regarding the zoom ratio of the overall zoom lens system. By satisfying conditional expression (20), it is possible to secure a high zoom ratio.

Moreover, it is preferable that the first zoom lens, the second zoom lens, and the third zoom lens according to the present invention satisfy the following conditional expression (21)

$$d_t/f_t < 1.0 \quad (21)$$

where, $d_t$ denotes an overall length of the zoom lens at the telephoto end, and $f_t$ denotes the focal length of the overall zoom lens system at the telephoto end.

Conditional expression (21) is an expression in which the total length of the overall zoom lens system at the telephoto end is normalized by the focal length of the zoom lens at the telephoto end. By satisfying conditional expression (21), it is possible to suppress the total length of the zoom lens at the telephoto end.

Moreover, an image pickup apparatus according to the present invention includes above-mentioned zoom lens and an image pickup element which is disposed on an image side of the zoom lens and which converts an optical image formed by the zoom lens to an electric signal. By making such an arrangement, it is possible to realize a thin image pickup apparatus which has a wide angle of view and a high zoom ratio.

Moreover, it is preferable to improve each of the above-mentioned conditional expressions to the following conditional expression. Only an upper limit value or a lower limit value of each conditional expression may be let to a new upper limit value or a lower limit value. By making such an arrangement, it is possible to achieve more effectively the effect described while describing each conditional expression.

Moreover, by changing the conditional expressions as follow, the zoom lens is structured more favorably.

In the first zoom lens according to the present invention, conditional expression (1a) is to be changed to the following conditional expression (1a)', and conditional expression (1a)" is even more preferable.

$$1.54 < \beta_{4T}/\beta_{4w} < 2.5 \quad (1a)'$$

$$1.54 < \beta_{4T}/\beta_{4w} < 2.1 \quad (1a)''$$

In the second zoom lens and the third zoom lens according to the present invention, conditional expression (1b) is to be changed to conditional expression (1b)', and conditional expression (1b)" is even more preferable.

$$1.0 < \beta_{4T}/\beta_{4w} < 2.5 \quad (1b)'$$

$$1.0 < \beta_{4T}/\beta_{4w} < 2.1 \quad (1b)''$$

In the first zoom lens and the second zoom lens according to the present invention, conditional expression (2) is to be changed to the following conditional expression (2)'

$$1.0 < \beta_{3T}/\beta_{3w} < 4.0 \quad (2)'$$

In the first zoom lens and the second zoom lens according to the present invention, conditional expression (3) is to be changed to the following conditional expression (3)'.

$$1.0 < \beta_{5T}/\beta_{5w} < 2.0 \quad (3)'$$

In the first zoom lens, the second zoom lens, and the third zoom lens according to the present invention, conditional expression (4) is to be changed to the following conditional expression (4)', and conditional expression (4)" is even more preferable.

$$1.03 \leq \Delta 3G/\Delta 4G \leq 1.8 \quad (4)'$$

$$1.05 \leq \Delta 3G/\Delta 4G \leq 1.7 \quad (4)''$$

In the first zoom lens according to the present invention, conditional expression (5a) is to be changed to the following conditional expression (5a)', and conditional expression (5a)" is even more preferable.

$$0.05 < |f_4|/f_t < 0.12 \quad (5a)'$$

$$0.05 < |f_4|/f_t < 0.10 \quad (5a)''$$

In the second zoom lens and the third zoom lens according to the present invention, conditional expression (5b) is to be changed to conditional expression (5b)', and conditional expression (5b)" is even more preferable.

$$0.05 < |f_4|/f_t < 0.12 \quad (5b)'$$

$$0.05 < |f_4|/f_t < 0.10 \quad (5b)''$$

In the first zoom lens, the second zoom lens, and the third zoom lens according to the present invention, conditional expression (6) is to be changed to the following conditional expression (6)', and conditional expression (6)" is even more preferable.

$$0.05 < |f_5|/f_t < 0.20 \quad (6)'$$

$$0.05 < |f_5|/f_t < 0.16 \quad (6)''$$

In the first zoom lens, the second zoom lens, and the third zoom lens according to the present invention, conditional expression (7) is to be changed to the following conditional expression (7)', and conditional expression (7)" is even more preferable.

$$0.06 < |f_3|/f_t < 0.13 \tag{7}'$$

$$0.06 < |f_3|/f_t < 0.11 \tag{7}''$$

In the first zoom lens, the second zoom lens, and the third zoom lens according to the present invention, conditional expression (8) is to be changed to the following conditional expression (8)', and conditional expression (8)" is even more preferable.

$$0.03 < |f_2|/f_t < 0.10 \tag{8}'$$

$$0.03 < |f_2|/f_t < 0.095 \tag{8}''$$

In the first zoom lens, the second zoom lens, and the third zoom lens, conditional expression (9) is to be changed to the following conditional expression (9)'.

$$0.3 < |f_1|/f_t < 0.55 \tag{9}'$$

In the first zoom lens, the second zoom lens, and the third zoom lens according to the present invention, conditional expression (10) is to be changed to the following conditional expression (10)', and conditional expression (10)" is even more preferable.

$$-0.6 \Delta 5G/\Delta 4G \leq 0 \tag{10}'$$

$$-0.2 \Delta 5G/\Delta 4G \leq 0 \tag{10}''$$

Furthermore, in the first zoom lens according to the present invention, conditional expression (10) is to be changed to the following conditional expression (10)'''.

$$-0.19 \Delta 5G/\Delta 4G \leq 0 \tag{10}'''$$

In the first zoom lens, the second zoom lens, and the third zoom lens according to the present invention, conditional expression (11) is to be changed to the following conditional expression (11)', and conditional expression (11)" is even more preferable.

$$-1.3 \Delta 5G/f_w \leq 0 \tag{11}'$$

$$-1.1 \Delta 5G/f_w \leq 0 \tag{11}''$$

Furthermore, in the first zoom lens according to the present invention, conditional expression (11) is to be changed to the following conditional expression (11)'''.

$$-0.9 \Delta 5G/f_w \leq 0 \tag{11}'''$$

In the first zoom lens, the second zoom lens, and the third zoom lens according to the present invention, conditional expression (12) is to be changed to the following conditional expression (12)'.

$$\Delta 3G/f_t \leq 0.16 \tag{12}'$$

In the first zoom lens, the second zoom lens, and the third zoom lens according to the present invention, conditional expression (13) is to be changed to the following conditional expression (13)'.

$$(\beta_{2T}/\beta_{2W})/(f_t/f_w) \leq 0.4 \tag{13}'$$

Furthermore, in the first zoom lens according to the present invention, conditional expression (13) is to be changed to the following conditional expression (13)", and conditional expression (13)''' is even more preferable.

$$(\beta_{2T}/\beta_{2W})/(f_t/f_w) \leq 0.35 \tag{13}''$$

$$(\beta_{2T}/\beta_{2W})/(f_t/f_w) \leq 0.34 \tag{13}'''$$

In the first zoom lens, the second zoom lens, and the third zoom lens according to the present invention, conditional expression (15) is to be changed to the following conditional expression (15)', and conditional expression (15)" is even more preferable.

$$-1.8 \leq (R_{1r}+R_{1l})/(R_{1r}-R_{1l}) - 0.7 \tag{15}'$$

$$-1.6 \leq (R_{1r}+R_{1l})/(R_{1r}-R_{1l}) - 1.0 \tag{15}''$$

In the first zoom lens, the second zoom lens, and the third zoom lens according to the present invention, conditional expression (16) is to be changed to the following conditional expression (16)', and conditional expression (16)" is even more preferable.

$$-1.8 \leq (R_{2r}+R_{2l})/(R_{2r}-R_{2l}) - 1.0 \tag{16}'$$

$$-1.5 \leq (R_{2r}+R_{2l})/(R_{2r}-R_{2l}) - 1.1 \tag{16}''$$

Furthermore, in the first zoom lens according to the present invention, conditional expression (16) is to be changed to the following conditional expression (16)'''.

$$-1.5 \leq (R_{2r}+R_{2l})/(R_{2r}-R_{2l}) - 1.2 \tag{16}'''$$

In the first zoom lens, the second zoom lens, and the third zoom lens according to the present invention, conditional expression (17) is to be changed to the following conditional expression (17)'.

$$0.4 \leq R_{1c}/f_1 \leq 0.65 \tag{17}'$$

Furthermore, in the first zoom lens according to the present invention, conditional expression (17) is to be changed to the following conditional expression (17)".

$$0.4 \leq R_{1c}/f_1 \leq 0.56 \tag{17}''$$

In the first zoom lens, the second zoom lens, and the third zoom lens according to the present invention, conditional expression (18) is to be changed to the following conditional expression (18)'.

$$\nu_{d4} \geq 4 \tag{18}'$$

In the first zoom lens, the second zoom lens, and the third zoom lens according to the present invention, conditional expression (19) is to be changed to the following conditional expression (19)', and conditional expression (19)" is even more preferable.

$$\nu_{d1G} \geq 75 \tag{19}'$$

$$\nu_{d1G} \geq 80 \tag{19}''$$

In the first zoom lens, the second zoom lens, and the third zoom lens according to the present invention, conditional expression (20) is to be changed to the following conditional expression (20)', and conditional expression (20)" is even more preferable.

$$f_t/f_w > 13 \tag{20}'$$

$$f_t/f_w > 15 \tag{20}''$$

In the first zoom lens, the second zoom lens, and the third zoom lens according to the present invention, conditional expression (21) is to be changed to the following conditional expression (21)'.

$$d_t/f_t < 0.9 \tag{21}'$$

Furthermore, in the third zoom lens according to the present invention, conditional expression (22) is to be changed to the following conditional expression (22)'. Conditional expression (22)" is more preferable and conditional expression (22)''' is even more preferable.

$$0.03 < (\beta_{4T}/\beta_{4w})/(f_T/f_w) < 0.20 \tag{22}'$$

$$0.03 < (\beta_{4T}/\beta_{4w})/(f_T/f_w) < 0.15 \tag{22}''$$

$$0.03 < (\beta_{4T}/\beta_{4w})/(f_T/f_w) < 0.13 \tag{22}'''$$

A function and an effect due to the structure of the zoom lens and the image pickup apparatus according to embodiments will be described below. However, the present invention is not restricted to the embodiments described below. In other words, the description of the embodiments includes a large amount of specific contents in detail for exemplification. However, various changes and modifications made in the contents in detail will not be beyond the scope of the present invention. Consequently, the exemplary embodiments of the present invention which are described below do not lead to loss of generality of the invention for which the right has been claimed, and do not restrict the invention for which the right has been claimed.

Embodiments from a first embodiment to a tenth embodiment of the zoom lens according to the present invention will be described below.

FIG. 1A, FIG. 2A, FIG. 3A, FIG. 4A, FIG. 5A, FIG. 6A, FIG. 7A, FIG. 8A, FIG. 9A, and FIG. 10A are cross-sectional views at a wide angle end at the time of infinite object point focusing of the embodiments from the first embodiment to the tenth embodiment respectively.

FIG. 1B, FIG. 2B, FIG. 3B, FIG. 4B, FIG. 5B, FIG. 6B, FIG. 7B, FIG. 8B, FIG. 9B, and FIG. 10B are cross-sectional views in an intermediate state at the time of infinite object point focusing of the embodiments from the first embodiment to the tenth embodiment respectively.

FIG. 1C, FIG. 2C, FIG. 3C, FIG. 4C, FIG. 5C, FIG. 6C, FIG. 7C, FIG. 8C, FIG. 9C, and FIG. 10C are cross-sectional views at a telephoto end at the time of infinite object point focusing of the embodiments from the first embodiment to the tenth embodiment respectively.

In diagrams from FIG. 1A to FIG. 10C, a first lens unit is denoted by G1, a second lens unit is denoted by G2, an aperture stop is denoted by S, a third lens unit is denoted by G3, a fourth lens unit is denoted by G4, a fifth lens unit is denoted by G5, a parallel-flat plate which forms a low-pass filter on which, a wavelength-region restricting coating which restricts infrared light has been applied, is denoted by F, a parallel-flat plate of a cover glass of an electronic image pickup element is denoted by C, and an image plane is denoted by I. A multilayer film for restricting a wavelength region may be provided on a surface of the cover glass C. Moreover, an arrangement may be made such that a low-pass filter effect is imparted to the cover glass C.

Moreover, in each embodiment, the aperture stop S moves integrally with the third lens unit G3. Each numerical data is data in a state when focused at an object at infinity. A unit of length of each numerical value is mm and a unit of angle is ° (degree). Focusing in all the embodiments is to be carried out by moving a lens unit nearest to an image side. Furthermore, zoom data are values at a wide angle end, in an intermediate focal length state, and at a telephoto end. Moreover, a sign (positive or negative) of a refractive power is based on a paraxial radius of curvature.

For cutting off unnecessary light such as ghost (light) and flare, a flare aperture stop apart from the aperture stop may be disposed. The flare stop may be disposed at any position such as on an object side of the first lens unit, between the first lens unit and the second lens unit, between the second lens unit and the third lens unit, between the third lens unit and the fourth lens unit, between the fourth lens unit and the fifth lens unit, and between the fifth lens unit and the image plane. An arrangement may be made such that flare light rays are cut off by a frame member; or another member may be used. Printing, coating, or sticking a seal directly on an optical system may be carried out. A shape thereof may be any shape such as a circular shape, an elliptical shape, a rectangular shape, a polygonal shape, and a range surrounded by a function curve. Moreover, not only harmful light beam but also light beams such as coma flare around a screen may be cut off.

Moreover, an antireflection coating may be applied to each lens, and ghost and flare may be reduced. When the antireflection coating is a multi-coating, it is possible to reduce ghost and flare effectively. Antireflection coating is generally applied to an air-contact surface of a lens for preventing occurrence of ghost and flare. Moreover, an infrared coating may be applied to a lens surface or a surface of the cover glass.

On the other hand, a refractive index of an adhesive material on a cemented surface of a cemented lens is sufficiently higher than a refractive index of air. Therefore, a reflectance at the cemented surface in many cases is either of same level as a reflectance of a single-layer coat or lower than the reflectance of a single-layer coat. Therefore, the antireflection coating is applied to the cemented surface of the cemented lens in few cases. However, when the antireflection coating is applied positively even to the cemented surface, it is possible to further reduce ghost and flare. As a result, it is possible to achieve more favorable image.

Particularly, glass materials having a high refractive index which are being widely used recently are highly effective in aberration correction. Therefore, the glass materials having a high refractive index have been heavily used in camera optical systems. However, when a glass material having a high refractive index is used as a cemented lens, even reflection at a cemented surface cannot be ignored. In such case, applying an antireflection coating on the cemented surface is particularly effective. Effective methods of using cemented surface coating have been disclosed in patent literatures such as Japanese Patent Application Laid-open Publication Nos. Hei 2-27301, 2001-324676, and 2005-92115, and U.S. Pat. No. 7,116,482 Specification.

Zoom lenses in the abovementioned patent literatures are positive-lead type zoom lenses, and a cemented-lens surface coat in a first lens unit has been mentioned therein. It is preferable to use the cemented lens surface in the first lens unit having a positive refractive power in the embodiments as it has been disclosed in the abovementioned patent literatures. A coating material which is to be used is to be selected according to a refractive index of a lens which is a base, and a refractive index of an adhesive material. A coating material having a comparatively higher refractive index, such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$, and a coating material having a comparatively lower refractive index, such as $MgF_2$, $SiO_2$, and $Al_2O_3$ may be selected appropriately, and a film thickness which satisfies phase conditions may be set.

As a matter of course, similarly as a coating on an air-contact surface of a lens, the cemented surface coating may as well be let to be a multi-coating. By combining the film thickness and a coating material of films of two layers or more, it is possible to further reduce the reflectance, and to carry out a control of spectral characteristics and angular characteristics of reflectance. Moreover, regarding lens cemented surfaces in lens units other than the first lens unit, it is needless to mention that coating the cemented surface based on similar principle is effective.

The fifth lens unit or the fourth lens unit is desirable for carrying out focusing. When the focusing is carried out by the fifth lens unit or the fourth lens unit, since lens weight is light, a load exerted on a motor is small. The focusing may as well be carried out by other lens units. Moreover, the focusing may be carried out by moving the plurality of lens units. The focusing may be carried out by drawing out the entire lens system, or by drawing out some of the lenses, or by drawing in.

Figure 1B:
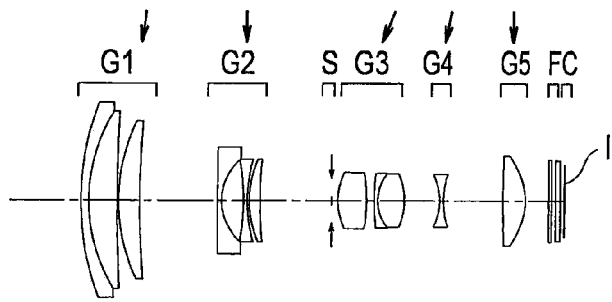
Figure 1C:
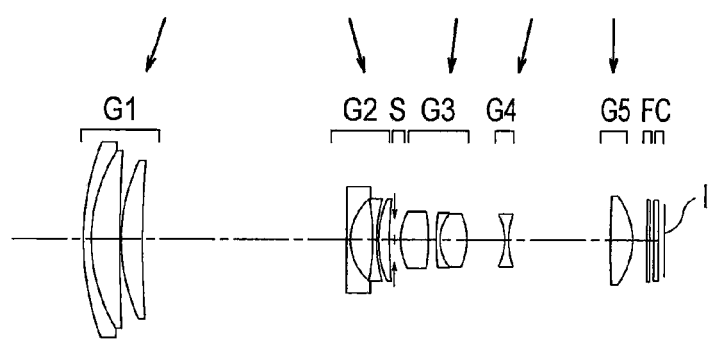

A zoom lens according to the first embodiment, as shown in FIG. 1A, FIG. 1B, and FIG. 1C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from the wide angle end to the telephoto end, the first lens unit G1 moves toward the object side. The second lens unit G2 moves toward an image side. The third lens unit G3 moves toward the object side. The fourth lens unit G4 moves toward the object side. The fifth lens unit G5, after moving toward the object side, moves toward the image side. Consequently, a distance between the first lens unit G1 and the second lens unit G2 increases, a distance between the second lens unit G2 and the third lens unit G3 decreases, a distance between the third lens unit G3 and the fourth lens unit G4 changes, and a distance between the fourth lens unit G4 and the fifth lens unit G5 increases.

In order from the object side, the first lens unit G1 includes a cemented lens of a negative meniscus lens having a convex surface directed toward the object side and a positive meniscus lens having a convex surface directed toward the object side, and a positive meniscus lens having a convex surface directed toward the object side. The second lens unit G2 includes a negative meniscus lens having a convex surface directed toward the object side, a biconcave negative lens, and a positive meniscus lens having a convex surface directed toward the object side. The third lens unit G3 includes a biconvex positive lens, and a cemented lens of a negative meniscus lens having a convex surface directed toward the object side and a biconvex positive lens. The fourth lens unit G4 includes a biconcave negative lens. The fifth lens unit G5 includes a biconvex positive lens.

An aspheric surface is used for three surfaces namely, both surfaces of the biconvex positive lens in the third lens unit G3 and an image-side surface of the biconvex positive lens in the fifth lens unit G5.

Figure 2A:
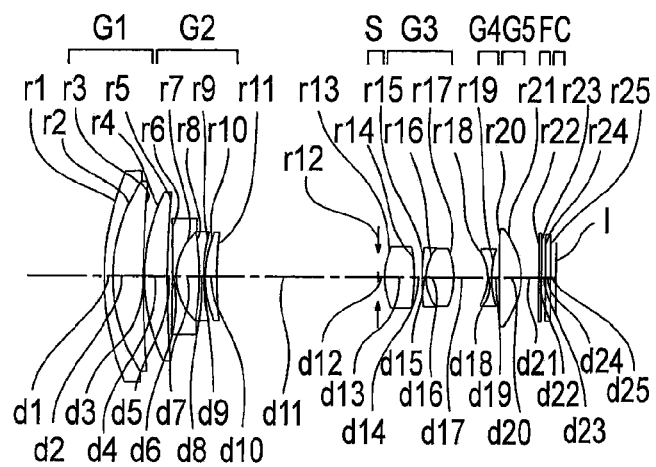
FIG. 2A, FIG. 2B, and FIG. 2C are diagrams similar to FIG. 1A, FIG. 1B, and FIG. 1C respectively, of a second embodiment of the zoom lens according to the present invention.
Figure 2B:
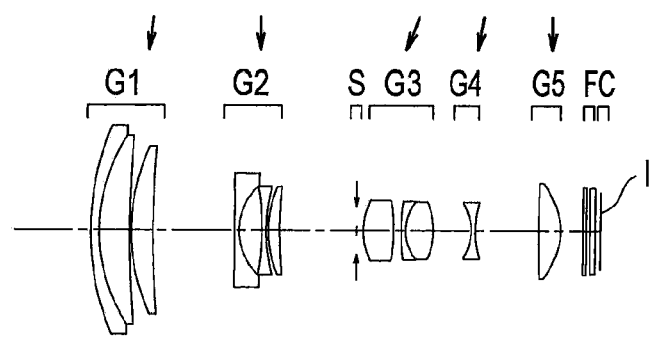
Figure 2C:
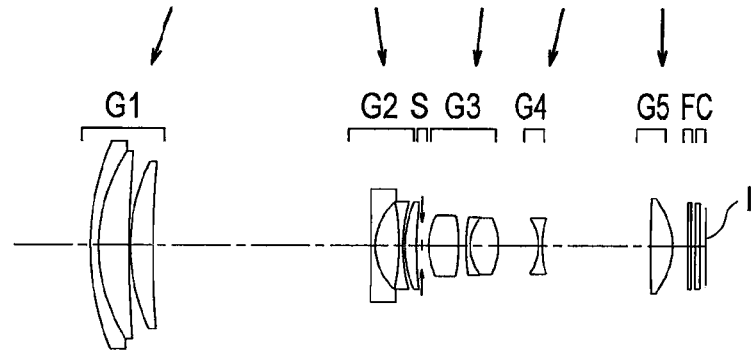

A zoom lens according to the second embodiment, as shown in FIG. 2A, FIG. 2B, and FIG. 2C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from the wide angle end to the telephoto end, the first lens unit G1 moves toward the object side. The second lens unit G2 moves toward an image side. The third lens unit G3 moves toward the object side. The fourth lens unit G4 moves toward the object side. The fifth lens unit G5, after moving toward the object side, moves toward the image side. Consequently, a distance between the first lens unit G1 and the second lens unit G2 increase, a distance between the second lens unit G2 and the third lens unit G3 decreases, a distance between the third lens unit G3 and the fourth lens unit G4 changes, and a distance between the fourth lens unit G4 and the fifth lens unit G5 increases.

In order from the object side, the first lens unit G1 includes a cemented lens of a negative meniscus lens having a convex surface directed toward the object side and a positive meniscus lens having a convex surface directed toward the object side, and a positive meniscus lens having a convex surface directed toward the object side. The second lens unit G2 includes a biconcave negative lens, a biconcave negative lens, and a positive meniscus lens having a convex surface directed toward the object side. The third lens unit G3 includes a biconvex positive lens, and a cemented lens of a negative meniscus lens having a convex surface directed toward the object side and a biconvex positive lens. The fourth lens unit G4 includes a biconcave negative lens. The fifth lens unit G5 includes a biconvex positive lens.

An aspheric surface is used for three surfaces namely, both surfaces of the biconvex positive lens in the third lens unit and an image-side surface of the biconvex positive lens in the fifth lens unit.

Figure 3A:
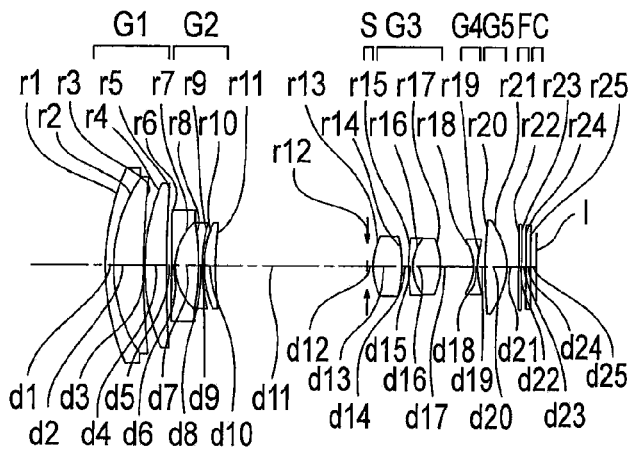
FIG. 3A, FIG. 3B, and FIG. 3C are diagrams similar to FIG. 1A, FIG. 1B, and FIG. 1C respectively, of a third embodiment of the zoom lens according to the present invention.
Figure 3B:
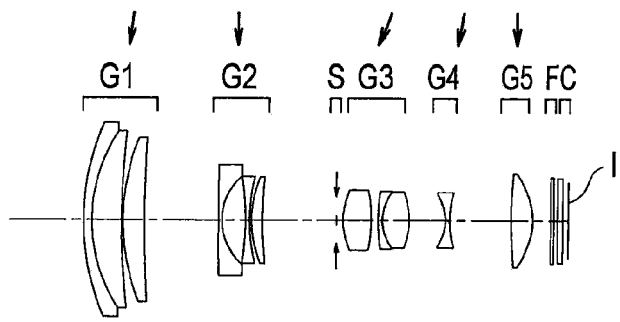
Figure 3C:
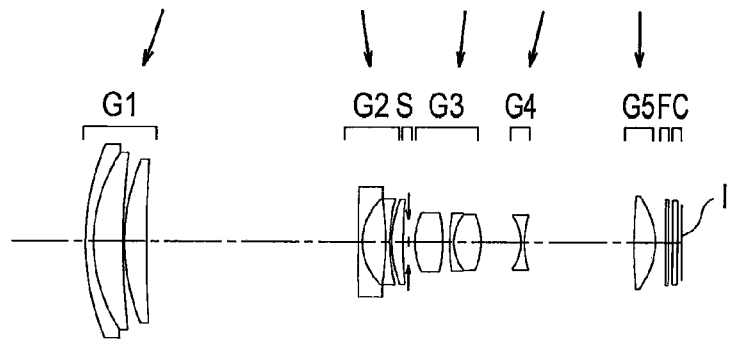

A zoom lens according to the third embodiment, as shown in FIG. 3A, FIG. 3B, and FIG. 3C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from the wide angle end to the telephoto end, the first lens unit G1 moves toward the object side. The second lens unit G2 moves toward an image side. The third lens unit G3 moves toward the object side. The fourth lens unit G4 moves toward the object side. The fifth lens unit G5, after moving toward the object side, moves toward the image side. Consequently, a distance between the first lens unit G1 and the second lens unit G2 increases, a distance between the second lens unit G2 and the third lens unit G3 decreases, a distance between the third lens unit G3 and the fourth lens unit G4 changes, and a distance between the fourth lens unit G4 and the fifth lens unit G5 increases.

In order from the object side, the first lens unit G1 includes a cemented lens of a negative meniscus lens having a convex surface directed toward the object side and a positive meniscus lens having a convex surface directed toward the object side, and a positive meniscus lens having a convex surface directed toward the object side. The second lens unit G2 includes a negative meniscus lens having a convex surface directed toward the object side, a biconcave negative lens, and a positive meniscus lens having a convex surface directed toward the object side. The third lens unit G3 includes a biconvex positive lens, and a cemented lens of a negative meniscus lens having a convex surface directed toward the object side and a biconvex positive lens. The fourth lens unit G4 includes a biconcave negative lens. The fifth lens unit G5 includes a biconvex positive lens.

An aspheric surface is used for three surfaces namely, both surfaces of the biconvex positive lens in the third lens unit G3 and an image-side surface of the biconvex positive lens in the fifth lens unit G5.

Figure 4A:
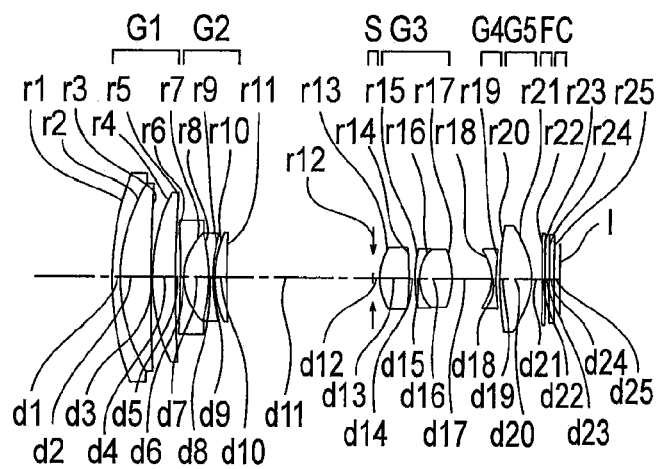
FIG. 4A, FIG. 4B, and FIG. 4C are diagrams similar to FIG. 1A, FIG. 1B, and FIG. 1C respectively, of a fourth embodiment of the zoom lens according to the present invention.
Figure 4B:
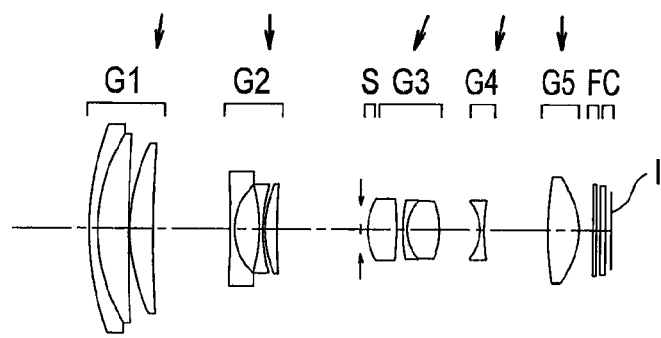
Figure 4C:
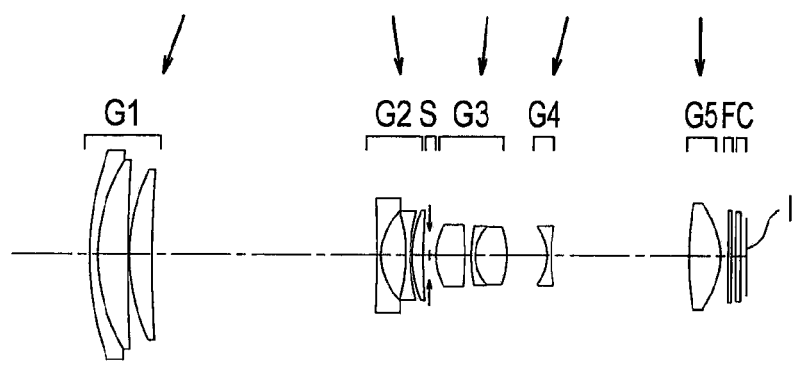

A zoom lens according to the fourth embodiment, as shown in FIG. 4A, FIG. 4B, and FIG. 4C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from the wide angle end to the telephoto end, the first lens unit G1 moves toward the object side. The second lens unit G2 moves toward an image side. The third lens unit G3 moves toward the object side. The fourth lens unit G4 moves toward the object side. The fifth lens unit G5, after moving toward the object side, moves toward the image side. Consequently, a distance between the first lens unit G1 and the second lens unit G2 increases, a distance between the second lens unit G2 and the third lens unit G3 decreases, a distance between the third lens unit G3 and the fourth lens unit G4 changes, and a distance between the fourth lens unit G4 and the fifth lens unit G5 increases.

In order from the object side, the first lens unit G1 includes a cemented lens of a negative meniscus lens having a convex surface directed toward the object side and a positive meniscus lens having a convex surface directed toward the object side, and a positive meniscus lens having a convex surface directed toward the object side. The second lens unit G2 includes a biconcave negative lens, a biconcave negative lens, and a positive meniscus lens having a convex surface directed toward the object side. The third lens unit G3 includes a biconvex positive lens, and a cemented lens of a negative meniscus lens having a convex surface directed toward the object side and a biconvex positive lens. The fourth lens unit G4 includes a biconcave negative lens. The fifth lens unit G5 includes a biconvex positive lens.

An aspheric surface is used for three surfaces namely, both surfaces of the biconvex positive lens in the third lens unit G3 and an image-side surface of the biconvex positive lens in the fifth lens unit G5.

Figure 5A:
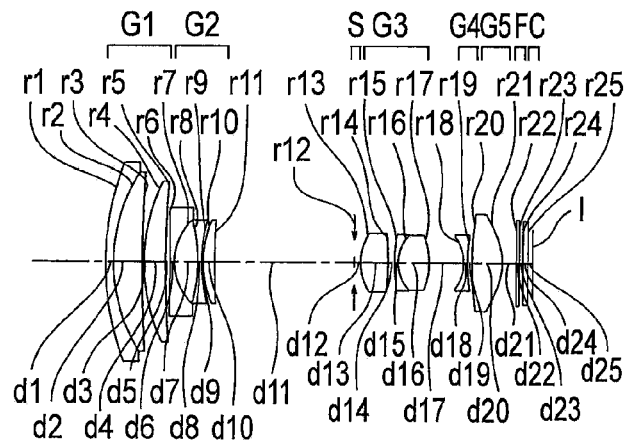
FIG. 5A, FIG. 5B, and FIG. 5C are diagrams similar to FIG. 1A, FIG. 1B, and FIG. 1C respectively, of a fifth embodiment of the zoom lens according to the present invention.
Figure 5B:
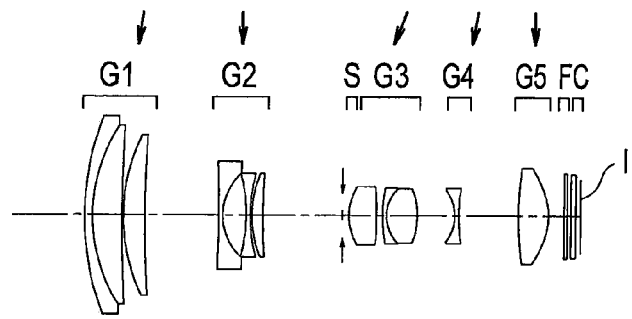
Figure 5C:
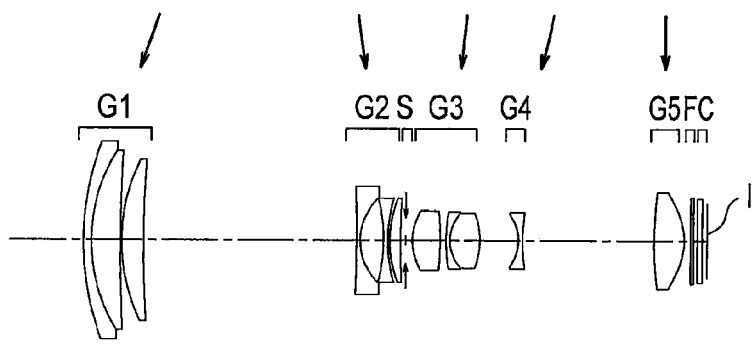

A zoom lens according to a fifth embodiment, as shown in FIG. 5A, FIG. 5B, and FIG. 5C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from the wide angle end to the telephoto end, the first lens unit G1 moves toward the object side. The second lens unit G2 moves toward an image side. The third lens unit G3 moves toward the object side. The fourth lens unit G4 moves toward the object side. The fifth lens unit G5, after moving toward the object side, moves toward the image side. Consequently, a distance between the first lens unit G1 and the second lens unit G2 increases, a distance between the second lens unit G2 and the third lens unit G3 decreases, a distance between the third lens unit G3 and the fourth lens unit G4 changes, and a distance between the fourth lens unit G4 and the fifth lens unit G5 increases.

In order from the object side, the first lens unit G1 includes a cemented lens of a negative meniscus lens having a convex surface directed toward the object side and a positive meniscus lens having a convex surface directed toward the object side, and a positive meniscus lens having a convex surface directed toward the object side. The second lens unit G2 includes a biconcave negative lens, a biconcave negative lens, and a positive meniscus lens having a convex surface directed toward the object side. The third lens unit G3 includes a biconvex lens, and a cemented lens of a negative meniscus lens having a convex surface directed toward the object side and a biconvex positive lens. The fourth lens unit G4 includes a biconcave negative lens. The fifth lens unit G5 includes a biconvex positive lens.

An aspheric surface is used for three surfaces namely, both surfaces of the biconvex positive lens in the third lens unit G3 and an image-side surface of the biconvex positive lens in the fifth lens unit G5.

Figure 6A:
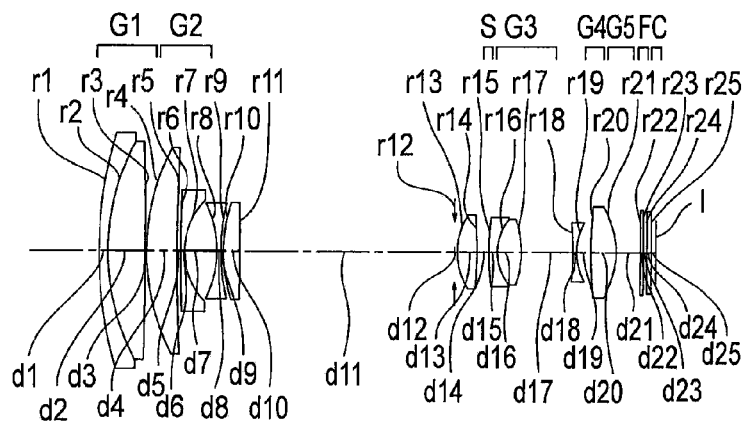
FIG. 6A, FIG. 6B, and FIG. 6C are diagrams similar to FIG. 1A, FIG. 1B, and FIG. 1C respectively, of a sixth embodiment of the zoom lens according to the present invention.
Figure 6B:
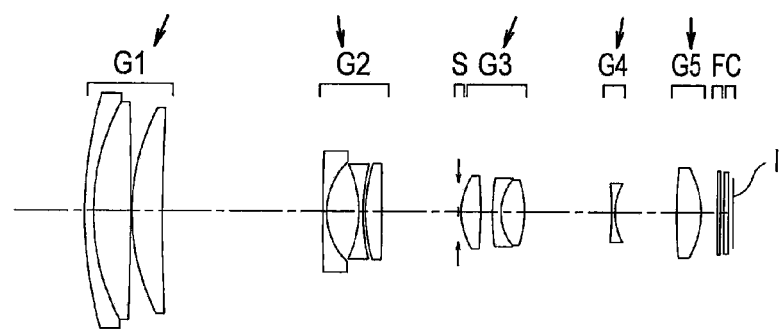
Figure 6C:
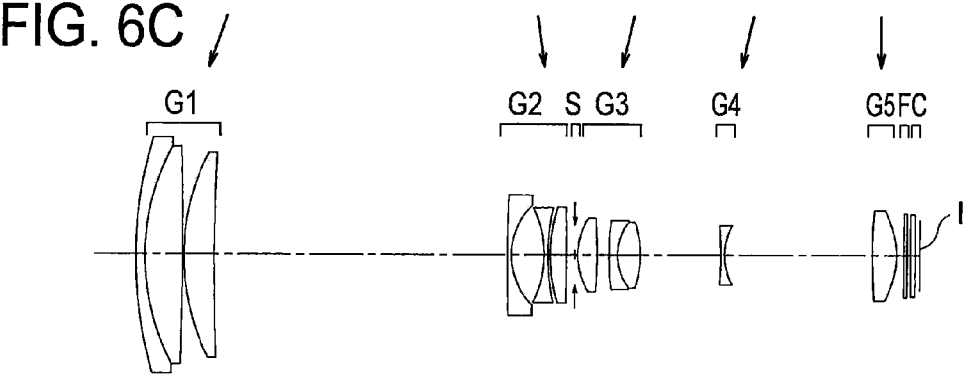

A zoom lens according to a sixth embodiment, as shown in FIG. 6A, FIG. 6B, and FIG. 6C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from the wide angle end to the telephoto end, the first lens unit G1 moves toward the object side. The second lens unit G2, after moving toward an image side, moves toward the object side. The third lens unit G3 moves toward the object side. The fourth lens unit G4 moves toward the object side. The fifth lens unit G5 moves toward the image side. Consequently, a distance between the first lens unit G1 and the second lens unit G2 increases, a distance between the second lens unit G2 and the third lens unit G3 decreases, a distance between the third lens unit G3 and the fourth lens unit G4 changes, and a distance between the fourth lens unit G4 and the fifth lens unit G5 increases.

In order from the object side, the first lens unit G1 includes a cemented lens of a negative meniscus lens having a convex surface directed toward the object side and a biconvex positive lens, and a positive meniscus lens having a convex surface directed toward the object side. The second lens unit G2 includes a negative meniscus lens having a convex surface directed toward the object side, a biconcave negative lens, and a biconvex positive lens. The third lens unit G3 includes a biconvex positive lens, and a cemented lens of a negative meniscus lens having a convex surface directed toward the object side and a biconvex positive lens. The fourth lens unit G4 includes a biconcave negative lens. The fifth lens unit G5 includes a biconvex positive lens.

An aspheric surface is used for three surfaces namely, both surfaces of the biconvex positive lens in the third lens unit G3 and an image-side surface of the biconvex positive lens in the fifth lens unit G5.

Figure 7A:
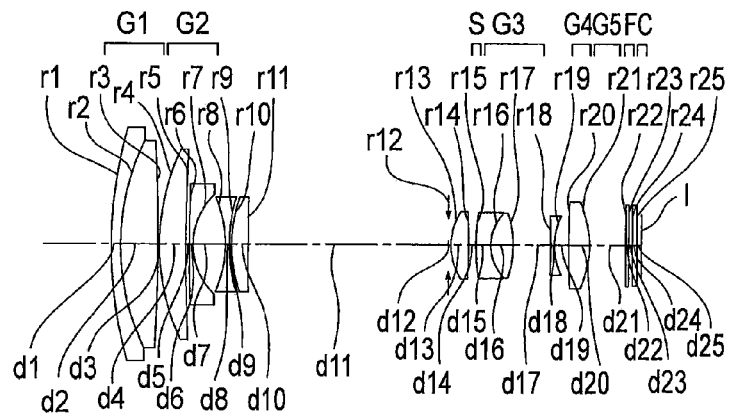
FIG. 7A, FIG. 7B, and FIG. 7C are diagrams similar to FIG. 1A, FIG. 1B, and FIG. 1C respectively, of a seventh embodiment of the zoom lens according to the present invention.
Figure 7B:
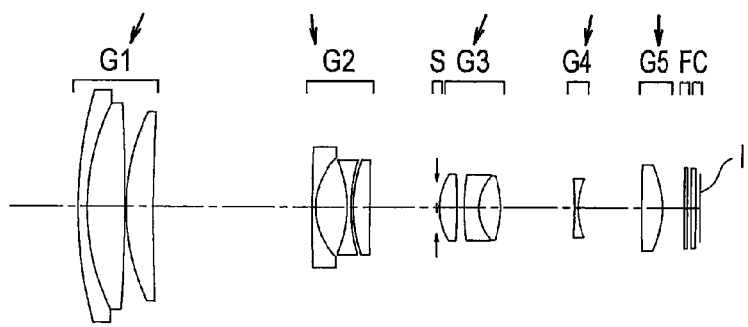
Figure 7C:
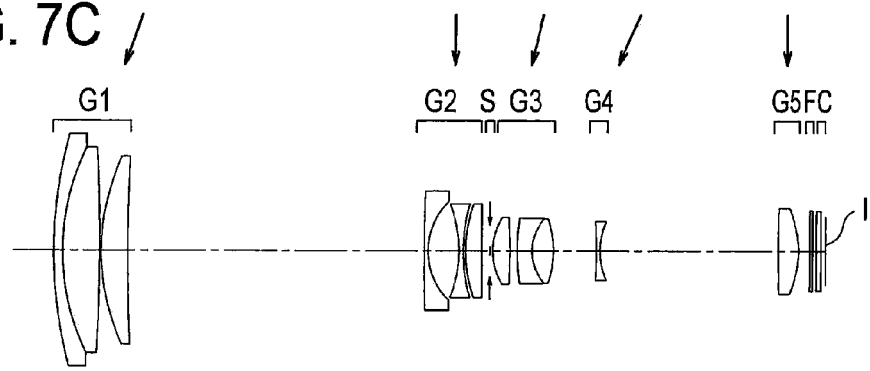

A zoom lens according to a seventh embodiment, as shown in FIG. 7A, FIG. 7B, and FIG. 7C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from the wide angle end to the telephoto end, the first lens unit G1 moves toward the object side. The second lens unit G2, after moving toward an image side, moves toward the object side. The third lens unit G3 moves toward the object side. The fourth lens unit G4 moves toward the object side. The fifth lens unit G5 moves toward the image side. Consequently, a distance between the first lens unit G1 and the second lens unit G2 increases, a distance between the second lens unit G2 and the third lens unit G3 decreases, a distance between the third lens unit G3 and the fourth lens unit G4 changes, and a distance between the fourth lens unit G4 and the fifth lens unit G5 increases.

In order from the object side, the first lens unit G1 includes a cemented lens of a negative meniscus lens having a convex surface directed toward the object side and a biconvex positive lens, and a positive meniscus lens having a convex surface directed toward the object side. The second lens unit G2 includes a negative meniscus lens having a convex surface directed toward the object side, a biconcave negative lens, and a positive meniscus lens having a convex surface directed toward the object side. The third lens unit G3 includes a biconvex positive lens, and a cemented lens of a negative meniscus lens having a convex surface directed toward the object side and a biconvex positive lens. The fourth lens unit G4 includes a biconcave negative lens. The fifth lens unit G5 includes a biconvex positive lens.

An aspheric surface is used for three surfaces namely, both surfaces of the biconvex positive lens in the third lens unit G3, and an image-side surface of the biconvex positive lens in the fifth lens unit G5.

Figure 8A:
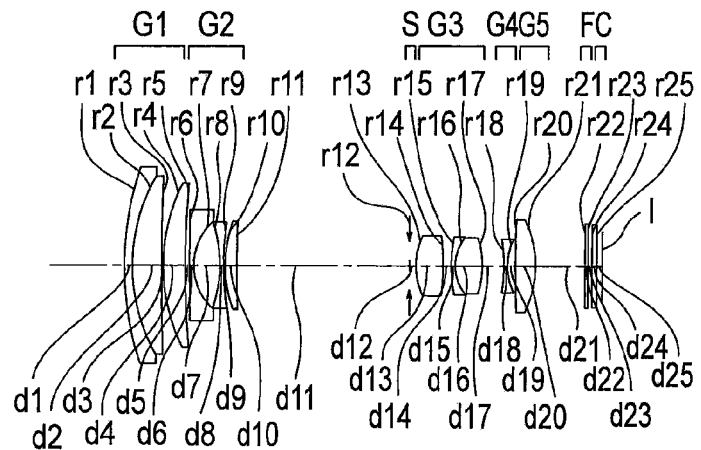
FIG. 8A, FIG. 8B, and FIG. 8C are diagrams similar to FIG. 1A, FIG. 1B, and FIG. 1C respectively, of an eighth embodiment of the zoom lens according to the present invention.
Figure 8B:
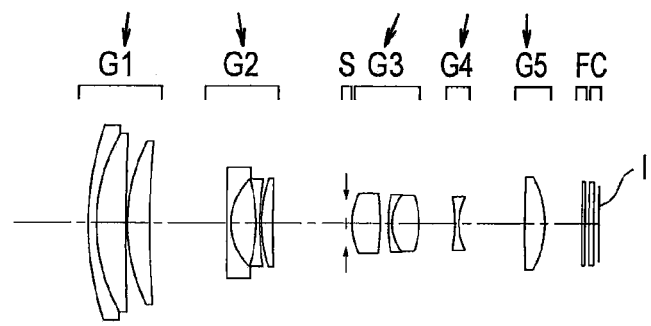
Figure 8C:
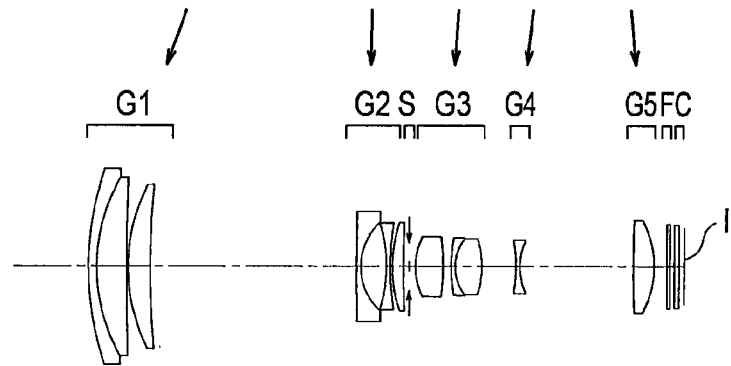

A zoom lens according to the eighth embodiment, as shown in FIG. 8A, FIG. 8B, and FIG. 8C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from the wide angle end to the telephoto end, the first lens unit G1 moves toward the object side. The second lens unit G2 moves toward an image side. The third lens unit G3 moves toward the object side. The fourth lens unit G4 moves toward the object side. The fifth lens unit G5 moves toward the image side. Consequently, a distance between the first lens unit G1 and the second lens unit G2 increases, a distance between the second lens unit G2 and the third lens unit G3 decreases, a distance between the third lens unit G3 and the fourth lens unit G4 changes, and a distance between the fourth lens unit G4 and the fifth lens unit G5 increases.

In order from the object side, the first lens unit G1 includes a cemented lens of a negative meniscus lens having a convex surface directed toward the object side and a positive meniscus lens having a convex surface directed toward the object side, and a positive meniscus lens having a convex surface directed toward the object side. The second lens unit G2 includes a negative meniscus lens having a convex surface directed toward the object side, a biconcave negative lens, and a positive meniscus lens having a convex surface directed toward the object side. The third lens unit G3 includes a biconvex positive lens, and a cemented lens of a negative meniscus lens having a convex surface directed toward the object side and a biconvex positive lens. The fourth lens unit G4 includes a biconcave negative lens. The fifth lens unit G5 includes a biconvex positive lens.

An aspheric surface is used for three surfaces namely, both surfaces of the biconvex positive lens in the third lens unit G3 and an image-side surface of the biconvex positive lens in the fifth lens unit G5.

Figure 9A:
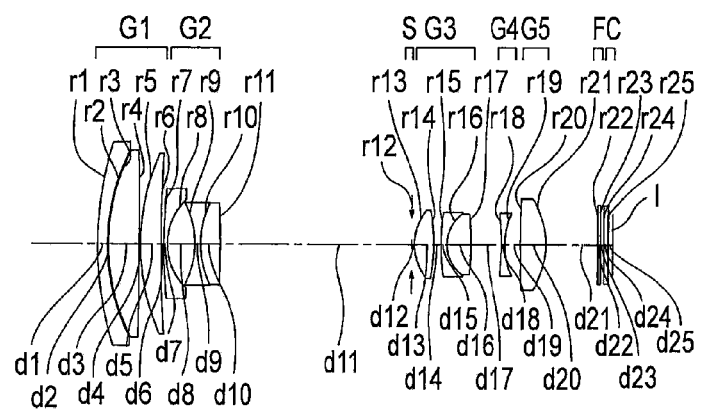
FIG. 9A, FIG. 9B, and FIG. 9C are diagrams similar to FIG. 1A, FIG. 1B, and FIG. 1C respectively, of a ninth embodiment of the zoom lens according to the present invention.
Figure 9B:
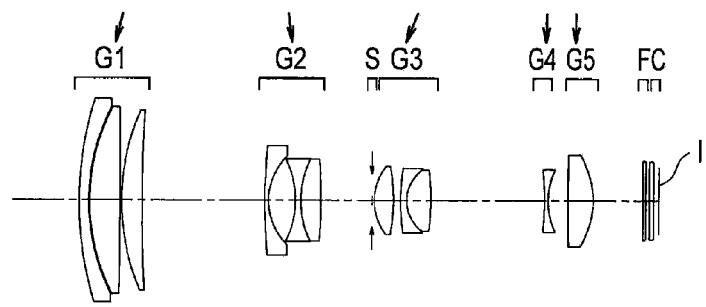
Figure 9C:
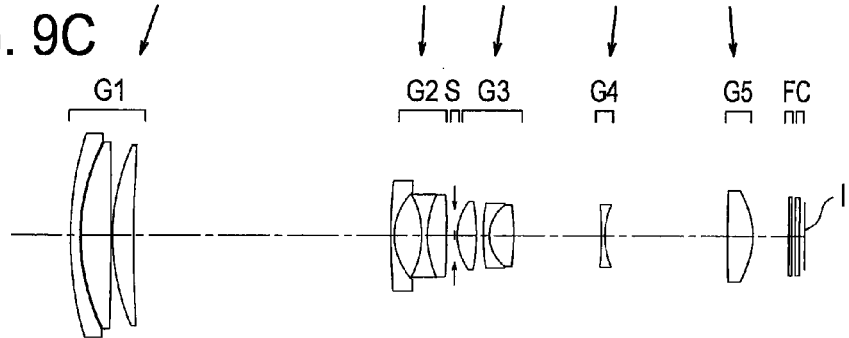

A zoom lens according to the ninth embodiment, as shown in FIG. 9A, FIG. 9B, and FIG. 9C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from the wide angle end to the telephoto end, the first lens unit G1 moves toward the object side. The second lens unit G2, after moving toward an image side, moves toward the object side. The third lens unit G3 moves toward the object side. The fourth lens unit G4 moves toward the object side. The fifth lens unit G5 moves toward the image side. Consequently, a distance between the first lens unit G1 and the second lens unit G2 increases, a distance between the second lens unit G2 and the third lens unit G3 decreases, a distance between the third lens unit G3 and the fourth lens unit G4 changes, and a distance between the fourth lens unit G4 and the fifth lens unit G5 increases.

In order from the object side, the first lens unit G1 includes a negative meniscus lens having a convex surface directed toward the object side, a biconvex positive lens, and a positive meniscus lens having a convex surface directed toward the object side. The second lens unit G2 includes a negative meniscus lens having a convex surface directed toward the object side, and a cemented lens of a biconcave negative lens and a biconvex positive lens. The third lens unit G3 includes a biconvex positive lens, and a cemented lens of a negative meniscus lens having a convex surface directed toward the object side and a biconvex positive lens. The fourth lens unit G4 includes a biconcave negative lens. The fifth lens unit G5 includes a biconvex positive lens.

An aspheric surface is used for four surfaces namely, a surface on the object side of the biconcave negative lens in the second lens unit G2, both surfaces of the biconvex positive lens in the third lens unit G3, and a surface on the image side of the biconvex positive lens in the fifth lens unit G5.

Figure 10A:
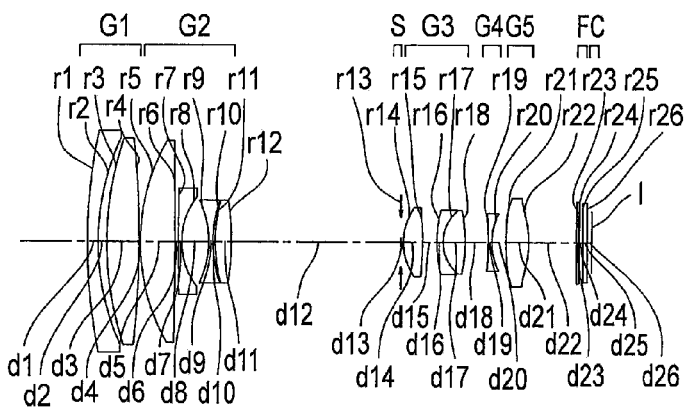
FIG. 10A, FIG. 10B, and FIG. 10C are diagrams similar to FIG. 1A, FIG. 1B, and FIG. 1C respectively, of a tenth embodiment of the zoom lens according to the present invention.
Figure 10B:
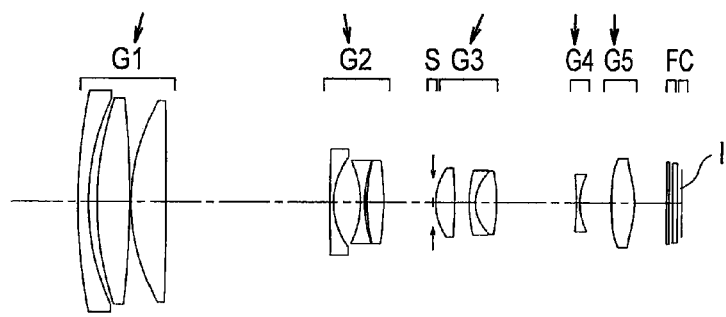
Figure 10C:
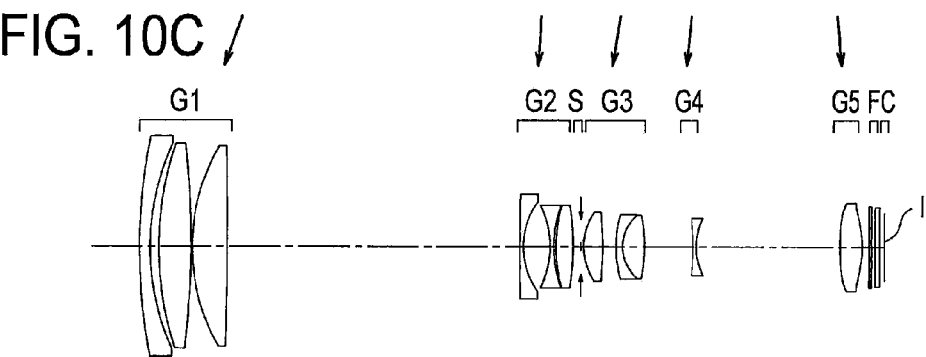
Figure 21:
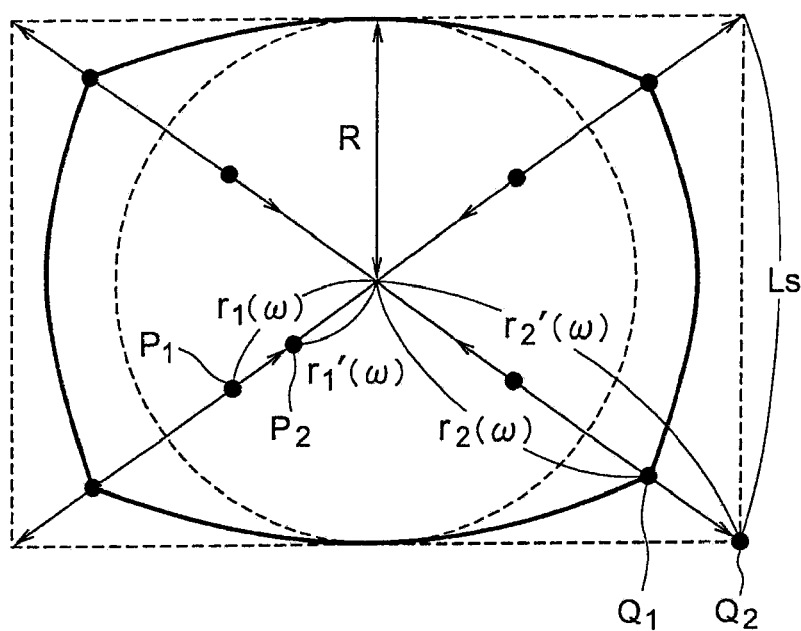
FIG. 21 is a diagram describing a correction of distortion.
Figure 22:
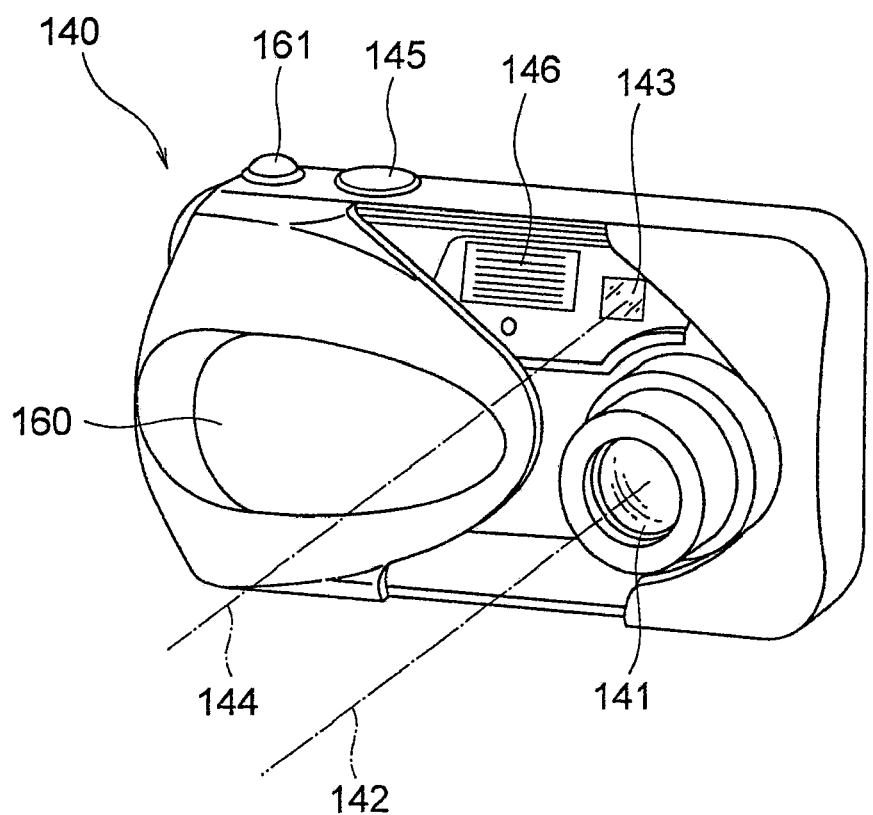
FIG. 22 is a front perspective view showing an appearance of a digital camera in which, the zoom lens according to the present invention is incorporated.
Figure 23:
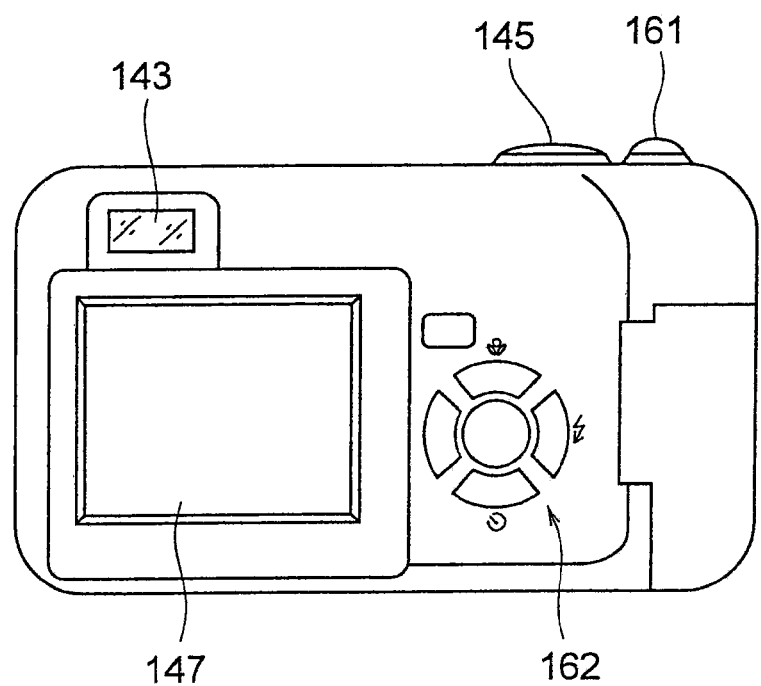
FIG. 23 is a rear perspective view of the digital camera in FIG. 22.
Figure 24:
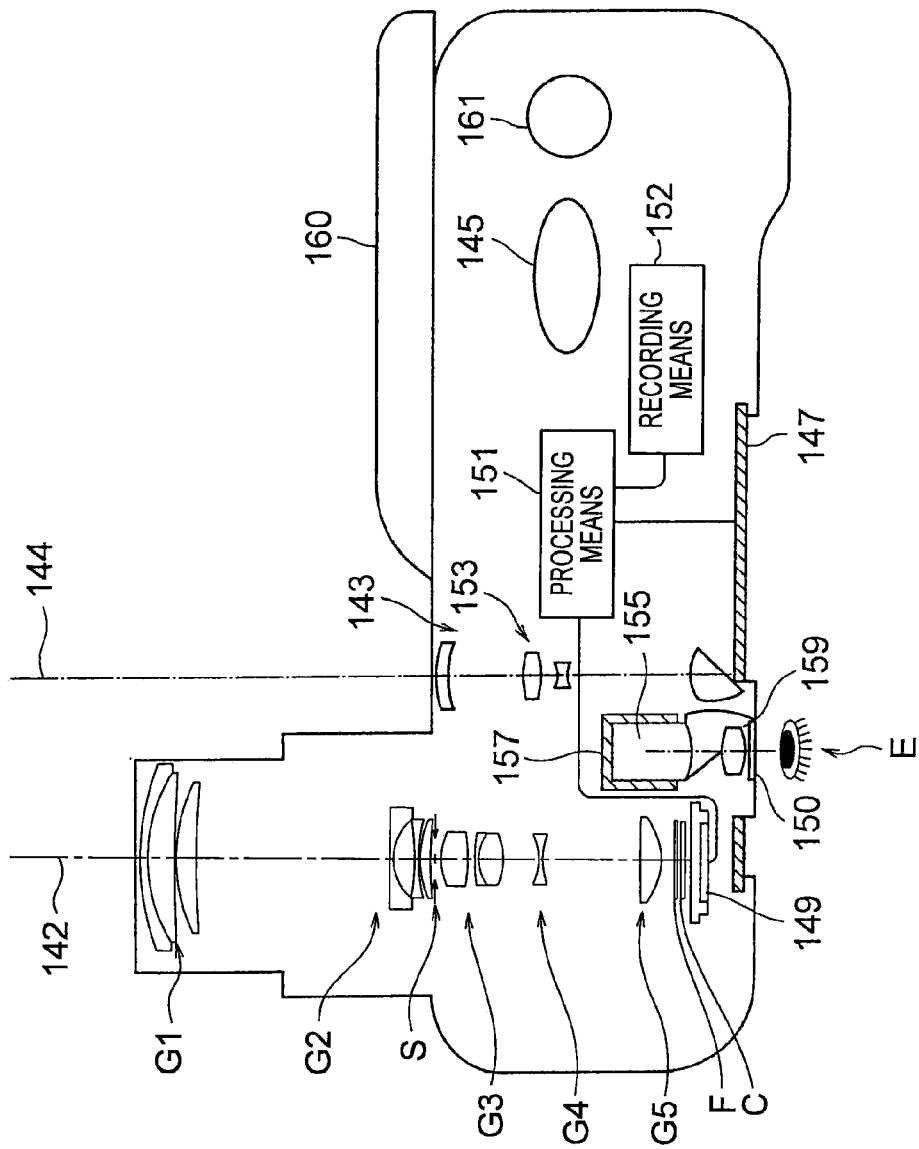
FIG. 24 is a cross-sectional view of the digital camera in FIG. 22.

A zoom lens according to the tenth embodiment, at shown in FIG. 10A, FIG. 10B, and FIG. 10C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from the wide angle end to the telephoto end, the first lens unit G1 moves toward the object side. The second lens unit G2, after moving toward an image side, moves toward the object side. The third lens unit G3 moves toward the object side. The fourth lens unit G4 moves toward the object side. The fifth lens unit G5 moves toward the image side. Consequently, a distance between the first lens unit G1 and the second lens unit G2 increases, a distance between the second lens unit G2 and the third lens unit G3 decreases, a distance between the third lens unit G3 and the fourth lens unit G4 changes, and a distance between the fourth lens unit G4 and the fifth lens unit G5 increases.

In order from the object side, the first lens unit G1 includes a negative meniscus lens having a convex surface directed toward the object side, a biconvex positive lens, and a biconvex positive lens. The second lens unit G2 includes a negative meniscus lens having a convex surface directed toward the object side, a biconcave negative lens, and a biconvex positive lens. The third lens unit G3 includes a biconvex positive lens, and a cemented lens of a negative meniscus lens having a convex surface directed toward the object side and a biconvex positive lens. The fourth lens unit G4 includes a biconcave negative lens. The fifth lens unit G5 includes a biconvex positive lens.

An aspheric surface is used for six surfaces namely, both surfaces of the biconcave negative lens in the second lens unit G2, both surfaces of the biconvex positive lens in the third lens unit G3, and both surfaces of the biconvex positive lens in the fifth lens unit G5.

Numerical data of each embodiment described above is shown below. Apart from symbols described above, f denotes a focal length of the entire zoom lens system, fb denotes back focus, f1, f2, . . . denotes focal length of each lens unit, IH (FIY) denotes an image height, Fno. denotes an F number, ω denotes a half angle of field, Wide angle denotes a wide angle end, Intermediate denotes an intermediate focal length state, Telephoto denotes a telephoto end, r denotes radius of curvature of each lens surface, d denotes a each of distance between two lenses, nd denotes a refractive index of each lens for a d-line, and vd denotes an Abbe constant for each lens.

The overall length of the lens system which will be described later is a length which is obtained by adding the back focus to a distance from the first lens surface up to the last lens surface. fb (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4 y^4+A_6 y^6+A_8 y^8+A_{10} y^{10}+A_{12} y^{12}$$

where, r denotes a paraxial radius of curvature, K denotes a conical coefficient, $A_4, A_6, A_8, A_{10}$, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Example 1

| | Unit mm | | | |
|---|---|---|---|---|
| | Surface data | | | |
| Surface no. | r | d | nd | vd |
| Object plane | ∞ | ∞ | | |
| 1 | 29.178 | 0.83 | 1.80100 | 34.97 |
| 2 | 18.031 | 3.00 | 1.49700 | 81.54 |
| 3 | 170.790 | 0.15 | | |
| 4 | 19.566 | 2.23 | 1.49700 | 81.54 |
| 5 | 101.299 | Variable | | |
| 6 | 11894.827 | 0.40 | 1.88300 | 40.76 |
| 7 | 5.702 | 2.37 | | |
| 8 | −23.961 | 0.40 | 1.72916 | 54.68 |
| 9 | 16.197 | 0.20 | | |
| 10 | 10.678 | 1.13 | 1.94595 | 17.98 |
| 11 | 39.196 | Variable | | |
| 12 (stop) | ∞ | 0.66 | | |
| 13* | 6.275 | 2.98 | 1.58313 | 59.38 |
| 14* | −18.669 | 0.78 | | |
| 15 | 20.888 | 0.40 | 1.90366 | 31.31 |
| 16 | 4.562 | 2.79 | 1.51633 | 64.14 |
| 17 | −7.103 | Variable | | |
| 18 | −6.039 | 0.40 | 1.51633 | 64.14 |
| 19 | 8.557 | Variable | | |
| 20 | 136.416 | 2.34 | 1.53071 | 55.60 |
| 21* | −6.448 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | Variable | | |
| Image plane (Light receiving surface) | ∞ | | | |

| Aspherical surface data |
|---|

13th surface k = 0.000
A4 = −7.53708e−04, A6 = −2.07762e−05, A8 = −1.93232e−06
14th surface k = 0.000
A4 = 2.83429e−04, A6 = −2.64067e−05, A8 = −1.88441e−06
21st surface k = 0.000
A4 = 1.07927e−03, A6 = −1.41822e−05, A8 = 4.15097e−07

| Zoom data | | | |
|---|---|---|---|
| | Wide angle | Intermediate | Telephoto |
| Focal length | 4.34 | 13.16 | 70.83 |
| Fno. | 2.93 | 4.45 | 5.76 |

| -continued | | | |
|---|---|---|---|
| | Unit mm | | |
| Angle of field 2ω | 85.58 | 31.35 | 6.14 |
| fb (in air) | 3.47 | 3.85 | 3.05 |
| Lens total length(in air) | 44.78 | 50.78 | 61.12 |
| d5 | 0.46 | 8.23 | 21.65 |
| d11 | 15.75 | 7.58 | 0.54 |
| d17 | 3.21 | 3.74 | 4.00 |
| d19 | 0.82 | 6.30 | 10.81 |
| d21 | 2.00 | 2.49 | 1.50 |
| d25 | 0.54 | 0.44 | 0.62 |

| Unit focal length | | | | |
|---|---|---|---|---|
| f1 = 35.72 | f2 = −5.97 | f3 = 7.71 | f4 = −6.79 | f5 = 11.67 |

Example 2

| | Unit mm | | | |
|---|---|---|---|---|
| | Surface data | | | |
| Surface no. | r | d | nd | vd |
| Object plane | ∞ | ∞ | | |
| 1 | 27.097 | 0.83 | 1.80100 | 34.97 |
| 2 | 17.249 | 3.00 | 1.49700 | 81.54 |
| 3 | 111.151 | 0.15 | | |
| 4 | 19.580 | 2.23 | 1.49700 | 81.54 |
| 5 | 100.640 | Variable | | |
| 6 | −347.813 | 0.40 | 1.88300 | 40.76 |
| 7 | 5.878 | 2.34 | | |
| 8 | −24.308 | 0.40 | 1.72916 | 54.68 |
| 9 | 17.062 | 0.20 | | |
| 10 | 10.971 | 1.13 | 1.94595 | 17.98 |
| 11 | 40.238 | Variable | | |
| 12 (stop) | ∞ | 0.66 | | |
| 13* | 6.146 | 2.96 | 1.58313 | 59.38 |
| 14* | −18.801 | 0.74 | | |
| 15 | 20.683 | 0.40 | 1.90366 | 31.31 |
| 16 | 4.568 | 2.72 | 1.51633 | 64.14 |
| 17 | −7.182 | Variable | | |
| 18 | −5.206 | 0.40 | 1.51633 | 64.14 |
| 19 | 9.484 | Variable | | |
| 20 | 144.745 | 2.16 | 1.53071 | 55.60 |
| 21* | −6.167 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | Variable | | |
| Image plane (Light receiving surface) | ∞ | | | |

| Aspherical surface data |
|---|

13th surface k = 0.000
A4 = −8.87758e−04, A6 = −1.88845e−05, A8 = −2.83426e−06
14th surface k = 0.000
A4 = 1.44309e−04, A6 = −2.85426e−05, A8 = −2.32488e−06
21st surface k = 0.000
A4 = 1.22391e−03, A6 = −1.76446e−05, A8 = 6.07832e−07

| Zoom data | | | |
|---|---|---|---|
| | Wide angle | Intermediate | Telephoto |
| Focal length | 4.33 | 13.24 | 70.64 |
| Fno. | 2.87 | 4.44 | 5.74 |

-continued

| Unit mm | | | |
|---|---|---|---|
| Angle of field 2ω | 87.78 | 31.35 | 6.17 |
| fb (in air) | 3.13 | 3.67 | 2.96 |
| Lens total length(in air) | 44.20 | 50.06 | 60.49 |
| d5 | 0.46 | 8.08 | 21.66 |
| d11 | 15.80 | 7.60 | 0.54 |
| d17 | 3.37 | 3.75 | 3.92 |
| d19 | 0.72 | 6.24 | 10.69 |
| d21 | 1.70 | 2.20 | 1.50 |
| d25 | 0.50 | 0.54 | 0.53 |

| Unit focal length |
|---|
| f1 = 36.03  f2 = −6.09  f3 = 7.61  f4 = −6.45  f5 = 11.20 |

Example 3

| Unit mm | | | |
|---|---|---|---|
| Surface data | | | |
| Surface no. | r | d | nd | vd |
|---|---|---|---|---|
| Object plane | ∞ | ∞ | | |
| 1 | 24.835 | 0.83 | 1.80100 | 34.97 |
| 2 | 16.341 | 3.00 | 1.49700 | 81.54 |
| 3 | 76.979 | 0.15 | | |
| 4 | 21.495 | 2.23 | 1.49700 | 81.54 |
| 5 | 144.658 | Variable | | |
| 6 | 679.580 | 0.40 | 1.88300 | 40.76 |
| 7 | 5.895 | 2.39 | | |
| 8 | −26.792 | 0.40 | 1.72916 | 54.68 |
| 9 | 17.687 | 0.20 | | |
| 10 | 11.217 | 1.13 | 1.94595 | 17.98 |
| 11 | 39.935 | Variable | | |
| 12 (stop) | ∞ | 0.66 | | |
| 13* | 6.045 | 2.87 | 1.58313 | 59.38 |
| 14* | −17.330 | 0.73 | | |
| 15 | 20.695 | 0.40 | 1.90366 | 31.31 |
| 16 | 4.515 | 2.76 | 1.51633 | 64.14 |
| 17 | −7.253 | Variable | | |
| 18 | −4.714 | 0.40 | 1.51633 | 64.14 |
| 19 | 9.195 | Variable | | |
| 20 | 51.514 | 2.17 | 1.53071 | 55.60 |
| 21* | −6.371 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | Variable | | |
| Image plane (Light receiving surface) | ∞ | | | |

Aspherical surface data

13th surface k = 0.000
A4 = −1.01518e−03, A6 = −2.23928e−05, A8 = −4.02266e−06

14th surface k = 0.000
A4 = 1.85402e−05, A6 = −3.64816e−05, A8 = −2.82883e−06

21st surface k = 0.000
A4 = 1.20763e−03, A6 = −1.62921e−05, A8 = 4.76270e−07

| Zoom data | | | |
|---|---|---|---|
| | Wide angle | Intermediate | Telephoto |
| Focal length | 4.52 | 13.27 | 69.30 |
| Fno. | 2.86 | 4.51 | 6.13 |

-continued

| Unit mm | | | |
|---|---|---|---|
| Angle of field 2ω | 82.40 | 31.14 | 6.31 |
| fb (in air) | 2.71 | 3.29 | 2.37 |
| Lens total length(in air) | 43.46 | 48.95 | 60.37 |
| d5 | 0.46 | 7.50 | 21.62 |
| d11 | 15.40 | 7.53 | 0.54 |
| d17 | 3.41 | 3.67 | 4.05 |
| d19 | 0.76 | 6.25 | 11.07 |
| d21 | 1.20 | 1.80 | 1.00 |
| d25 | 0.59 | 0.56 | 0.44 |

| Unit focal length |
|---|
| f1 = 37.43  f2 = −6.37  f3 = 7.48  f4 = −5.98  f5 = 10.82 |

Example 4

| Unit mm | | | |
|---|---|---|---|
| Surface data | | | |
| Surface no. | r | d | nd | vd |
|---|---|---|---|---|
| Object plane | ∞ | ∞ | | |
| 1 | 29.605 | 0.83 | 1.80100 | 34.97 |
| 2 | 17.880 | 3.00 | 1.49700 | 81.54 |
| 3 | 188.328 | 0.15 | | |
| 4 | 19.808 | 2.23 | 1.49700 | 81.54 |
| 5 | 132.819 | Variable | | |
| 6 | −117.028 | 0.40 | 1.88300 | 40.76 |
| 7 | 5.980 | 2.47 | | |
| 8 | −16.680 | 0.40 | 1.72916 | 54.68 |
| 9 | 17.120 | 0.20 | | |
| 10 | 11.441 | 1.13 | 1.94595 | 17.98 |
| 11 | 72.766 | Variable | | |
| 12 (stop) | ∞ | 0.66 | | |
| 13* | 5.494 | 2.84 | 1.58313 | 59.38 |
| 14* | −40.404 | 0.63 | | |
| 15 | 15.696 | 0.40 | 1.90366 | 31.31 |
| 16 | 4.160 | 3.14 | 1.51633 | 64.14 |
| 17 | −8.145 | Variable | | |
| 18 | −4.424 | 0.40 | 1.51633 | 64.14 |
| 19 | 19.387 | Variable | | |
| 20 | 33.604 | 3.04 | 1.53071 | 55.60 |
| 21* | −6.305 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | Variable | | |
| Image plane (Light receiving surface) | ∞ | | | |

Aspherical surface data

13th surface k = 0.000
A4 = −8.60497e−04, A6 = −1.99413e−05, A8 = −2.00308e−06

14th surface k = 0.000
A4 = 4.63011e−05, A6 = −1.65346e−05, A8 = −2.22887e−06

21st surface k = 0.000
A4 = 1.86983e−03, A6 = −5.15517e−05, A8 = 1.14256e−06

| Zoom data | | | |
|---|---|---|---|
| | Wide angle | Intermediate | Telephoto |
| Focal length | 4.41 | 12.24 | 88.38 |
| Fno. | 2.93 | 4.55 | 6.71 |

-continued

| Unit mm | | | |
|---|---|---|---|
| Angle of field 2ω | 87.26 | 34.09 | 5.03 |
| fb (in air) | 2.43 | 2.81 | 2.21 |
| Lens total length (in air) | 43.53 | 50.82 | 64.10 |
| d5 | 0.46 | 7.61 | 22.03 |
| d11 | 14.39 | 8.30 | 0.54 |
| d17 | 3.90 | 3.99 | 3.97 |
| d19 | 0.41 | 6.19 | 13.44 |
| d21 | 1.00 | 1.33 | 0.75 |
| d25 | 0.51 | 0.55 | 0.53 |

| Unit focal length | | | | |
|---|---|---|---|---|
| f1 = 35.07 | f2 = −5.73 | f3 = 7.88 | f4 = −6.94 | f5 = 10.28 |

Example 5

| Unit mm | | | | |
|---|---|---|---|---|
| Surface data | | | | |
| Surface no. | r | d | nd | vd |
| Object plane | ∞ | ∞ | | |
| 1 | 28.671 | 0.83 | 1.80100 | 34.97 |
| 2 | 17.550 | 3.00 | 1.49700 | 81.54 |
| 3 | 160.357 | 0.15 | | |
| 4 | 19.520 | 2.23 | 1.49700 | 81.54 |
| 5 | 118.212 | Variable | | |
| 6 | −177.924 | 0.40 | 1.88300 | 40.76 |
| 7 | 5.950 | 2.46 | | |
| 8 | −16.543 | 0.40 | 1.72916 | 54.68 |
| 9 | 15.575 | 0.20 | | |
| 10 | 11.548 | 1.13 | 1.94595 | 17.98 |
| 11 | 79.158 | Variable | | |
| 12 (stop) | ∞ | 0.66 | | |
| 13* | 5.486 | 2.84 | 1.58313 | 59.38 |
| 14* | −39.378 | 0.63 | | |
| 15 | 15.425 | 0.40 | 1.90366 | 31.31 |
| 16 | 4.190 | 3.13 | 1.51633 | 64.14 |
| 17 | −8.177 | Variable | | |
| 18 | −4.463 | 0.40 | 1.51633 | 64.14 |
| 19 | 18.084 | Variable | | |
| 20 | 38.070 | 3.07 | 1.53071 | 55.60 |
| 21* | −6.331 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | Variable | | |
| Image plane (Light receiving surface) | ∞ | | | |

Aspherical surface data

13th surface k = 0.000
A4 = −8.34408e−04, A6 = −2.05634e−05, A8 = −2.11872e−06
14th surface k = 0.000
A4 = 1.00116e−04, A6 = −2.12976e−05, A8 = −2.06386e−06
21st surface k = 0.000
A4 = 1.40798e−03, A6 = −2.06580e−05, A8 = 5.58190e−07

| Zoom data | | | |
|---|---|---|---|
| | Wide angle | Intermediate | Telephoto |
| Focal length | 4.39 | 12.18 | 91.52 |
| Fno. | 2.95 | 4.53 | 6.83 |

-continued

| Unit mm | | | |
|---|---|---|---|
| Angle of field 2ω | 87.03 | 34.22 | 4.86 |
| fb (in air) | 2.86 | 3.02 | 2.08 |
| Lens total length (in air) | 43.72 | 50.88 | 64.10 |
| d5 | 0.46 | 7.66 | 22.02 |
| d11 | 14.40 | 8.24 | 0.54 |
| d17 | 3.57 | 3.88 | 3.99 |
| d19 | 0.49 | 6.15 | 13.53 |
| d21 | 1.42 | 1.58 | 0.64 |
| d25 | 0.51 | 0.51 | 0.51 |

| Unit focal length | | | | |
|---|---|---|---|---|
| f1 = 35.03 | f2 = −5.60 | f3 = 7.80 | f4 = −6.89 | f5 = 10.48 |

Example 6

| Unit mm | | | | |
|---|---|---|---|---|
| Surface data | | | | |
| Surface no. | r | d | nd | vd |
| Object plane | ∞ | ∞ | | |
| 1 | 45.206 | 1.00 | 1.88300 | 40.76 |
| 2 | 25.345 | 4.07 | 1.43700 | 95.10 |
| 3 | −485.800 | 0.15 | | |
| 4 | 24.539 | 3.33 | 1.49700 | 81.54 |
| 5 | 230.426 | Variable | | |
| 6 | 250.000 | 0.40 | 1.88300 | 40.76 |
| 7 | 7.782 | 3.56 | | |
| 8* | −11.908 | 0.45 | 1.67790 | 54.89 |
| 9* | 23.948 | 0.25 | | |
| 10 | 17.898 | 1.77 | 1.94595 | 17.98 |
| 11 | −361.806 | Variable | | |
| 12 (stop) | ∞ | 0.30 | | |
| 13* | 7.323 | 2.12 | 1.55332 | 71.68 |
| 14* | −32.960 | 1.27 | | |
| 15 | 28.799 | 0.92 | 1.90366 | 31.32 |
| 16 | 5.744 | 2.57 | 1.51742 | 52.43 |
| 17 | −11.326 | Variable | | |
| 18 | −33.381 | 0.40 | 1.59201 | 67.02 |
| 19 | 6.761 | Variable | | |
| 20 | 54.355 | 2.73 | 1.58913 | 61.15 |
| 21* | −7.762 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | Variable | | |
| Image plane (Light receiving surface) | ∞ | | | |

Aspherical surface data

8th surface k = 0.000
A4 = −1.36479e−04, A6 = 3.73634e−06, A8 = −6.40571e−09
9th surface k = 0.000
A4 = −1.08550e−04, A6 = 5.62375e−06
13th surface k = 0.000
A4 = −1.88539e−04, A6 = 1.11154e−06
14th surface k = 0.000
A4 = 3.56276e−04, A6 = 1.24325e−06
21st surface k = 0.000
A4 = 1.05000e−03, A6 = −1.78207e−05, A8 = 2.43867e−07

-continued

Unit mm

Zoom data

|  | Wide angle | Intermediate | Telephoto |
|---|---|---|---|
| Focal length | 4.55 | 23.00 | 140.00 |
| Fno. | 2.78 | 4.60 | 7.00 |
| Angle of field 2ω | 81.83 | 17.73 | 3.09 |
| fb (in air) | 4.10 | 3.22 | 2.25 |
| Lens total length (in air) | 60.41 | 70.53 | 85.22 |
| d5 | 0.40 | 17.55 | 32.05 |
| d11 | 23.46 | 8.41 | 0.90 |
| d17 | 5.62 | 9.45 | 8.80 |
| d19 | 1.54 | 6.61 | 15.93 |
| d21 | 2.68 | 1.77 | 0.80 |
| d25 | 0.49 | 0.53 | 0.52 |

Unit focal length

| f1 = 47.84 | f2 = −6.83 | f3 = 10.60 | f4 = −9.46 | f5 = 11.72 |

Example 7

Unit mm

Surface data

| Surface no. | r | d | nd | vd |
|---|---|---|---|---|
| Object plane | ∞ | ∞ | | |
| 1 | 48.170 | 1.00 | 1.88300 | 40.76 |
| 2 | 26.183 | 4.13 | 1.43700 | 95.10 |
| 3 | −214.568 | 0.15 | | |
| 4 | 24.404 | 2.97 | 1.49700 | 81.54 |
| 5 | 196.706 | Variable | | |
| 6 | 250.000 | 0.40 | 1.88300 | 40.76 |
| 7 | 7.698 | 3.53 | | |
| 8* | −13.017 | 0.45 | 1.67790 | 54.89 |
| 9* | 20.154 | 0.25 | | |
| 10 | 15.549 | 1.81 | 1.94595 | 17.98 |
| 11 | 440.974 | Variable | | |
| 12 (stop) | ∞ | 0.30 | | |
| 13* | 6.882 | 1.92 | 1.55332 | 71.68 |
| 14* | −37.736 | 0.79 | | |
| 15 | 25.954 | 1.62 | 1.90366 | 31.32 |
| 16 | 5.263 | 2.42 | 1.51742 | 52.43 |
| 17 | −10.993 | Variable | | |
| 18 | −54.334 | 0.40 | 1.59201 | 67.02 |
| 19 | 7.896 | Variable | | |
| 20 | 207.451 | 2.27 | 1.58913 | 61.15 |
| 21* | −9.652 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | Variable | | |
| Image plane (Light receiving surface) | ∞ | | | |

Aspherical surface data

8th surface k = 0.000
A4 = −4.77476e−05, A6 = 2.76876e−06, A8 = −4.11745e−09
9th surface k = 0.000
A4 = −2.19248e−05, A6 = 3.99206e−06
13th surface k = 0.000
A4 = −2.02438e−04, A6 = 3.20022e−06

-continued

Unit mm

14th surface k = 0.000
A4 = 4.01470e−04, A6 = 3.66199e−06
21st surface k = 0.000
A4 = 5.16276e−04, A6 = 1.78992e−06, A8 = −1.94839e−07

Zoom data

|  | Wide angle | Intermediate | Telephoto |
|---|---|---|---|
| Focal length | 4.55 | 23.00 | 140.00 |
| Fno. | 3.03 | 4.91 | 7.00 |
| Angle of field 2ω | 82.04 | 17.87 | 3.08 |
| fb (in air) | 5.52 | 3.99 | 2.72 |
| Lens total length (in air) | 58.36 | 68.59 | 85.23 |
| d5 | 0.40 | 17.68 | 32.87 |
| d11 | 22.29 | 7.46 | 0.90 |
| d17 | 4.19 | 8.07 | 4.72 |
| d19 | 1.56 | 6.99 | 19.61 |
| d21 | 4.07 | 2.53 | 1.26 |
| d25 | 0.52 | 0.53 | 0.53 |

Unit focal length

| f1 = 47.24 | f2 = −6.93 | f3 = 10.19 | f4 = −11.62 | f5 = 15.72 |

Example 8

Unit mm

Surface data

| Surface no. | r | d | nd | vd |
|---|---|---|---|---|
| Object plane | ∞ | ∞ | | |
| 1 | 31.163 | 0.83 | 1.80100 | 34.97 |
| 2 | 18.571 | 3.00 | 1.49700 | 81.54 |
| 3 | 307.514 | 0.15 | | |
| 4 | 18.690 | 2.23 | 1.49700 | 81.54 |
| 5 | 92.921 | Variable | | |
| 6 | 572.971 | 0.40 | 1.88300 | 40.76 |
| 7 | 6.053 | 2.61 | | |
| 8 | −14.941 | 0.40 | 1.72916 | 54.68 |
| 9 | 28.472 | 0.20 | | |
| 10 | 13.822 | 1.13 | 1.94595 | 17.98 |
| 11 | 126.077 | Variable | | |
| 12 (stop) | ∞ | 0.66 | | |
| 13* | 6.608 | 2.81 | 1.58313 | 59.38 |
| 14* | −25.461 | 0.80 | | |
| 15 | 15.722 | 0.40 | 1.90366 | 31.31 |
| 16 | 4.637 | 2.70 | 1.51633 | 64.14 |
| 17 | −8.983 | Variable | | |
| 18 | −16.101 | 0.40 | 1.51633 | 64.14 |
| 19 | 6.170 | Variable | | |
| 20 | 154.580 | 2.06 | 1.53071 | 55.60 |
| 21* | −10.004 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | Variable | | |
| Image plane (Light receiving surface) | ∞ | | | |

Aspherical surface data

13th surface k = 0.000
A4 = −4.53955e−04, A6 = −1.21442e−05, A8 = −5.54372e−07

-continued

Unit mm

14th surface k = 0.000
A4 = 3.85023e−0, A6 = −1.46634e−05, A8 = −7.38658e−07

21st surface k = 0.000
A4 = 1.10069e−04, A6 = −3.68048e−06, A8 = −1.01713e−09

Zoom data

|  | Wide angle | Intermediate | Telephoto |
| --- | --- | --- | --- |
| Focal length | 4.77 | 14.54 | 73.16 |
| Fno. | 3.17 | 4.58 | 5.60 |
| Angle of field 2ω | 79.51 | 29.30 | 6.02 |
| fb (in air) | 6.43 | 5.18 | 2.77 |
| Lens total length (in air) | 48.17 | 51.52 | 60.15 |
| d5 | 0.46 | 7.87 | 21.12 |
| d11 | 17.56 | 7.42 | 0.54 |
| d17 | 2.17 | 3.66 | 3.41 |
| d19 | 0.77 | 6.60 | 11.53 |
| d21 | 4.93 | 3.72 | 1.30 |
| d25 | 0.57 | 0.53 | 0.54 |

Unit focal length

| f1 = 34.73 | f2 = −6.30 | f3 = 8.14 | f4 = −8.59 | f5 = 17.78 |
| --- | --- | --- | --- | --- |

Example 9

Unit mm

Surface data

| Surface no. | r | d | nd | νd |
| --- | --- | --- | --- | --- |
| Object plane | ∞ | ∞ | | |
| 1 | 39.357 | 1.10 | 1.91082 | 35.25 |
| 2 | 23.644 | 0.10 | | |
| 3 | 23.366 | 3.46 | 1.49700 | 81.54 |
| 4 | −828.057 | 0.15 | | |
| 5 | 25.151 | 2.38 | 1.49700 | 81.54 |
| 6 | 161.378 | Variable | | |
| 7 | 66.195 | 0.40 | 1.78800 | 47.37 |
| 8 | 7.045 | 3.13 | | |
| 9* | −9.925 | 0.64 | 1.80139 | 45.45 |
| 10 | 11.035 | 2.25 | 1.92286 | 20.88 |
| 11 | −88.816 | Variable | | |
| 12 (stop) | ∞ | 0.30 | | |
| 13* | 6.012 | 2.18 | 1.49710 | 81.56 |
| 14* | −18.662 | 0.79 | | |
| 15 | 22.744 | 0.70 | 1.88300 | 40.80 |
| 16 | 4.406 | 2.71 | 1.58313 | 59.46 |
| 17 | −28.325 | Variable | | |
| 18 | −39.619 | 0.40 | 1.59282 | 68.63 |
| 19 | 8.516 | Variable | | |
| 20 | 205.026 | 2.84 | 1.51633 | 64.14 |
| 21* | −8.832 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | Variable | | |
| Image plane (Light receiving surface) | ∞ | | | |

Aspherical surface data

9th surface k = 0.000
A4 = 1.05000e−04, A6 = −6.14700e−06, A8 = 6.97500e−08

-continued

Unit mm

13th surface k = 0.000
A4 = −4.51200e−04, A6 = −9.05000e−08, A8 = −2.49200e−07

14th surface k = 0.000
A4 = 3.18800e−04

21st surface k = 0.000
A4 = 4.83400e−04, A6 = −4.61500e−06, A8 = 5.52100e−08

Zoom data

|  | Wide angle | Intermediate | Telephoto |
| --- | --- | --- | --- |
| Focal length | 4.55 | 24.27 | 140.07 |
| Fno. | 3.18 | 5.24 | 7.06 |
| Angle of field 2ω | 83.37 | 16.86 | 3.03 |
| d6 | 0.31 | 13.94 | 29.15 |
| d11 | 21.81 | 5.79 | 0.90 |
| d17 | 3.40 | 12.91 | 9.95 |
| d19 | 1.75 | 2.20 | 13.88 |
| d21 | 5.91 | 5.68 | 4.12 |
| d25 | 0.52 | 0.60 | 0.57 |

Unit focal length

| f1 = 43.30 | f2 = −5.77 | f3 = 10.14 | f4 = −11.79 | f5 = 16.47 |
| --- | --- | --- | --- | --- |

Example 10

Unit mm

Surface data

| Surface no. | r | d | nd | νd |
| --- | --- | --- | --- | --- |
| Object plane | ∞ | ∞ | | |
| 1 | 63.024 | 1.20 | 1.88300 | 40.76 |
| 2 | 27.945 | 0.99 | | |
| 3 | 36.559 | 3.67 | 1.43700 | 95.10 |
| 4 | −108.511 | 0.15 | | |
| 5 | 22.720 | 3.96 | 1.49700 | 81.54 |
| 6 | −729.394 | Variable | | |
| 7 | 250.000 | 0.40 | 1.88300 | 40.76 |
| 8 | 8.450 | 3.08 | | |
| 9* | −10.436 | 0.45 | 1.85400 | 40.39 |
| 10* | 14.266 | 0.25 | | |
| 11 | 17.445 | 1.91 | 1.94595 | 17.98 |
| 12 | −30.562 | Variable | | |
| 13 (stop) | ∞ | 0.30 | | |
| 14* | 6.745 | 2.15 | 1.55332 | 71.68 |
| 15* | −28.931 | 1.59 | | |
| 16 | 14.189 | 0.70 | 1.90366 | 31.32 |
| 17 | 4.643 | 2.46 | 1.51823 | 58.90 |
| 18 | −19.128 | Variable | | |
| 19 | −35.904 | 0.40 | 1.59201 | 67.02 |
| 20 | 7.307 | Variable | | |
| 21* | 34.210 | 2.57 | 1.58913 | 61.15 |
| 22* | −10.764 | Variable | | |
| 23 | ∞ | 0.30 | 1.51633 | 64.14 |
| 24 | ∞ | 0.40 | | |
| 25 | ∞ | 0.50 | 1.51633 | 64.14 |
| 26 | ∞ | Variable | | |
| Image plane (Light receiving surface) | ∞ | | | |

-continued

Unit mm

Aspherical surface data

9th surface k = 0.000
A4 = −2.17523e−05, A6 = 5.00460e−06, A8 = 4.07235e−08
10th surface k = 0.000
A4 = −1.40927e−04, A6 = 6.31214e−06
14th surface k = 0.000
A4 = −2.52496e−04, A6 = 7.20719e−07
15th surface k = 0.000
A4 = 3.25350e−04, A6 = 2.95802e−06
21st surface k = 0.000
A4 = 4.25796e−05, A6 = 2.19625e−05
22nd surface k = 0.000
A4 = 2.76946e−04, A6 = 2.02688e−05

Zoom data

|  | Wide angle | Intermediate | Telephoto |
| --- | --- | --- | --- |
| Focal length | 4.55 | 23.00 | 139.90 |
| Fno. | 3.21 | 4.79 | 6.50 |
| Angle of field 2ω | 82.14 | 17.82 | 3.21 |
| fb (in air) | 6.95 | 5.17 | 2.26 |
| Lens total length (in air) | 56.99 | 68.27 | 84.30 |
| d6 | 0.40 | 18.74 | 33.29 |
| d12 | 19.23 | 5.62 | 0.90 |
| d18 | 2.63 | 8.97 | 5.46 |
| d20 | 1.56 | 3.55 | 16.17 |
| d22 | 5.49 | 3.71 | 0.80 |
| d26 | 0.53 | 0.53 | 0.53 |

Unit focal length

| f1 = 45.72 | f2 = −6.21 | f3 = 9.64 | f4 = −10.22 | f5 = 14.20 |

FIG. 11A, FIG. 11B, FIG. 11C, and FIG. 11D are diagrams showing spherical aberration (SA), astigmatism (AS), distortion (DT), and chromatic aberration of magnification (CC) respectively, at the wide angle end of the first embodiment;

FIG. 11E, FIG. 11F, FIG. 11G, and FIG. 11H are diagrams showing spherical aberration (SA), astigmatism (AS), distortion (DT), and chromatic aberration of magnification (CC) respectively, in the intermediate focal length state of the first embodiment;

FIG. 11I, FIG. 11J, FIG. 11K, and FIG. 11L are diagrams showing spherical aberration (SA), astigmatism (AS), distortion (DT), and chromatic aberration of magnification (CC) respectively, at the telephoto end of the first embodiment;

FIG. 12A, FIG. 12B, FIG. 12C, and FIG. 12D are diagrams showing spherical aberration (SA), astigmatism (AS), distortion (DT), and chromatic aberration of magnification (CC) respectively, at the wide angle end of the second embodiment;

FIG. 12E, FIG. 12F, FIG. 12G, and FIG. 12H are diagrams showing spherical aberration (SA), astigmatism (AS), distortion (DT), and chromatic aberration of magnification (CC) respectively, in the intermediate focal length state of the second embodiment;

FIG. 12I, FIG. 12J, FIG. 12K, and FIG. 12L are diagrams showing spherical aberration (SA), astigmatism (AS), distortion (DT), and chromatic aberration of magnification (CC) respectively, at the telephoto end of the second embodiment;

FIG. 13A, FIG. 13B, FIG. 13C, and FIG. 13D are diagrams showing spherical aberration (SA), astigmatism (AS), distortion (DT), and chromatic aberration of magnification (CC) respectively, at the wide angle end of the third embodiment;

FIG. 13E, FIG. 13F, FIG. 13G, and FIG. 13H are diagrams showing spherical aberration (SA), astigmatism (AS), distortion (DT), and chromatic aberration of magnification (CC) respectively, in the intermediate focal length state of the third embodiment;

FIG. 13I, FIG. 13J, FIG. 13K, and FIG. 13L are diagrams showing spherical aberration (SA), astigmatism (AS), distortion (DT), and chromatic aberration of magnification (CC) respectively, at the telephoto end of the third embodiment;

FIG. 14A, FIG. 14B, FIG. 14C, and FIG. 14D are diagrams showing spherical aberration (SA), astigmatism (AS), distortion (DT), and chromatic aberration of magnification (CC) respectively, at the wide angle end of the fourth embodiment;

FIG. 14E, FIG. 14F, FIG. 14G, and FIG. 14H are diagrams showing spherical aberration (SA), astigmatism (AS), distortion (DT), and chromatic aberration of magnification (CC) respectively, in the intermediate focal length state of the fourth embodiment;

FIG. 14I, FIG. 14J, FIG. 14K, and FIG. 14L are diagrams showing spherical aberration (SA), astigmatism (AS), distortion (DT), and chromatic aberration of magnification (CC) respectively, at the telephoto end of the fourth embodiment;

FIG. 15A, FIG. 15B, FIG. 15C, and FIG. 15D are diagrams showing spherical aberration (SA), astigmatism (AS), distortion (DT), and chromatic aberration of magnification (CC) respectively, at the wide angle end of the fifth embodiment;

FIG. 15E, FIG. 15F, FIG. 15G, and FIG. 15H are diagrams showing spherical aberration (SA), astigmatism (AS), distortion (DT), and chromatic aberration of magnification (CC) respectively, in the intermediate focal length state of the fifth embodiment;

FIG. 15I, FIG. 15J, FIG. 15K, and FIG. 15L are diagrams showing spherical aberration (SA), astigmatism (AS), distortion (DT), and chromatic aberration of magnification (CC) respectively, at the telephoto end of the fifth embodiment;

FIG. 16A, FIG. 16B, FIG. 16C, and FIG. 16D are diagrams showing spherical aberration (SA), astigmatism (AS), distortion (DT), and chromatic aberration of magnification (CC) respectively, at the wide angle end of the sixth embodiment;

FIG. 16E, FIG. 16F, FIG. 16G, and FIG. 16H are diagrams showing spherical aberration (SA), astigmatism (AS), distortion (DT), and chromatic aberration of magnification (CC) respectively, in the intermediate focal length state of the sixth embodiment;

FIG. 16I, FIG. 16J, FIG. 16K, and FIG. 16L are diagrams showing spherical aberration (SA), astigmatism (AS), distortion (DT), and chromatic aberration of magnification (CC) respectively, at the telephoto end of the sixth embodiment;

FIG. 17A, FIG. 17B, FIG. 17C, and FIG. 17D are diagrams showing spherical aberration (SA), astigmatism (AS), distortion (DT), and chromatic aberration of magnification (CC) respectively, at the wide angle end of the seventh embodiment;

FIG. 17E, FIG. 17F, FIG. 17G, and FIG. 17H are diagrams showing spherical aberration (SA), astigmatism (AS), distortion (DT), and chromatic aberration of magnification (CC) respectively, in the intermediate focal length state of the seventh embodiment;

FIG. 17I, FIG. 17J, FIG. 17K, and FIG. 17L are diagrams showing spherical aberration (SA), astigmatism (AS), distortion (DT), and chromatic aberration of magnification (CC) respectively, at the telephoto end of the seventh embodiment;

FIG. 18A, FIG. 18B, FIG. 18C, and FIG. 18D are diagrams showing spherical aberration (SA), astigmatism (AS), distortion (DT), and chromatic aberration of magnification (CC) respectively, at the wide angle end of the eighth embodiment;

FIG. 18E, FIG. 18F, FIG. 18G, and FIG. 18H are diagrams showing the spherical aberration (SA), the astigmatism (AS), the distortion (DT), and chromatic aberration of magnification (CC) respectively, in the intermediate focal length state of the eighth embodiment;

FIG. 18I, FIG. 18J, FIG. 18K, and FIG. 18L are diagrams showing spherical aberration (SA), astigmatism (AS), distortion (DT), and chromatic aberration of magnification (CC) respectively, at the telephoto end of the eighth embodiment;

FIG. 19A, FIG. 19B, FIG. 19C, and FIG. 19D are diagrams showing spherical aberration (SA), astigmatism (AS), distortion (DT), and chromatic aberration of magnification (CC) respectively, at the wide angle end of the ninth embodiment;

FIG. 19E, FIG. 19F, FIG. 19G, and FIG. 19H are diagrams showing spherical aberration (SA), astigmatism (AS), distortion (DT), and chromatic aberration of magnification (CC) respectively, in the intermediate focal length state of the ninth embodiment;

FIG. 19I, FIG. 19J, FIG. 19K, and FIG. 19L are diagrams showing spherical aberration (SA), astigmatism (AS), distortion (DT), and chromatic aberration of magnification (CC) respectively, at the telephoto end of the ninth embodiment;

FIG. 20A, FIG. 20B, FIG. 20C, and FIG. 20D are diagrams showing spherical aberration (SA), astigmatism (AS), distortion (DT), and chromatic aberration of magnification (CC) respectively, at the wide angle end of the tenth embodiment;

FIG. 20E, FIG. 20F, FIG. 20G, and FIG. 20H are diagrams showing spherical aberration (SA), astigmatism (AS), distortion (DT), and chromatic aberration of magnification (CC) respectively, in the intermediate focal length state of the tenth embodiment; and FIG. 20I, FIG. 20J, FIG. 20K, and FIG. 20L are diagrams showing spherical aberration (SA), astigmatism (AS), distortion (DT), and chromatic aberration of magnification (CC) respectively, at the telephoto end of the tenth embodiment.

In the diagrams, FIY denotes the maximum image height.

Conditional values of each of the examples are shown below:

|   |   | Example 1 | Example 2 | Example 3 | Example 4 |
|---|---|---|---|---|---|
| (1a), (1b) | β4T/β4W | 1.641 | 1.732 | 1.802 | 1.966 |
| (2) | β3T/β3W | 1.737 | 1.708 | 1.760 | 1.584 |
| (3) | β5T/β5W | 1.052 | 1.022 | 1.044 | 1.031 |
| (4) | Δ3G/Δ4G | 1.082 | 1.057 | 1.064 | 1.005 |
| (5a), (5b) | |f4|/ft | 0.096 | 0.091 | 0.086 | 0.078 |
| (6) | |f5|/ft | 0.165 | 0.159 | 0.156 | 0.116 |
| (7) | |f3|/f | 0.109 | 0.108 | 0.108 | 0.089 |
| (8) | |f2|/ft | 0.084 | 0.086 | 0.092 | 0.065 |
| (9) | |f1|/ft | 0.504 | 0.510 | 0.540 | 0.397 |
| (10) | Δ5G/Δ4G | −0.044 | −0.018 | −0.035 | −0.018 |
| (11) | Δ5G/fw | −0.097 | −0.041 | −0.077 | −0.053 |
| (12) | Δ3G/ft | 0.146 | 0.146 | 0.153 | 0.145 |
| (13) | (β2T/β2W)/(ft/fw) | 0.334 | 0.331 | 0.302 | 0.312 |
| (14) | |β2T| | 1.253 | 1.265 | 1.094 | 1.397 |
| (15) | (R1r + R11)/(R1r − R11) | −1.236 | −1.367 | −1.539 | −1.210 |
| (16) | (R2r + R21)/(R2r − R21) | −1.479 | −1.483 | −1.349 | −1.351 |
| (17) | R1c/f1 | 0.505 | 0.479 | 0.437 | 0.510 |
| (18) | vd4 | 64.14 | 64.14 | 64.14 | 64.14 |
| (19) | vd1G | 81.54 | 81.54 | 81.54 | 81.54 |
| (20) | ft/fw | 16.314 | 16.326 | 15.332 | 20.070 |
| (21) | dt/ft | 0.863 | 0.856 | 0.871 | 0.725 |
| (22) | (β4T/β4W)/(ft/fw) | 0.101 | 0.106 | 0.118 | 0.098 |

-continued

|   |   | Example 5 | Example 6 | Example 7 |
|---|---|---|---|---|
| (1a), (1b) | β4T/β4W | 1.836 | 1.550 | 1.550 |
| (2) | β3T/β3W | 1.622 | 2.156 | 1.649 |
| (3) | β5T/β5W | 1.107 | 1.251 | 1.277 |
| (4) | Δ3G/Δ4G | 1.034 | 1.254 | 1.035 |
| (5a), (5b) | |f4|/ft | 0.075 | 0.068 | 0.083 |
| (6) | |f5|/ft | 0.114 | 0.084 | 0.112 |
| (7) | |f3|/ft | 0.085 | 0.076 | 0.073 |
| (8) | |f2|/ft | 0.061 | 0.049 | 0.049 |
| (9) | |f1|/ft | 0.383 | 0.342 | 0.337 |
| (10) | Δ5G/Δ4G | −0.064 | −0.148 | −0.184 |
| (11) | Δ5G/fw | −0.179 | −0.408 | −0.617 |
| (12) | Δ3G/ft | 0.138 | 0.112 | 0.113 |
| (13) | (β2T/β2W)/(ft/fw) | 0.303 | 0.239 | 0.306 |
| (14) | |β2T| | 1.382 | 1.375 | 1.799 |
| (15) | (R1r + R11)/(R1r − R11) | −1.246 | −0.901 | −0.782 |
| (16) | (R2r + R21)/(R2r − R21) | −1.396 | −1.238 | −1.283 |
| (17) | R1c/f1 | 0.501 | 0.530 | 0.554 |
| (18) | vd4 | 64.14 | 67.02 | 67.02 |
| (19) | vd1G | 81.54 | 88.32 | 88.32 |
| (20) | ft/fw | 20.834 | 30.780 | 30.779 |
| (21) | dt/ft | 0.700 | 0.608 | 0.609 |
| (22) | (β4T/β4W)/(ft/fw) | 0.088 | 0.050 | 0.050 |

|   |   | Example 8 | Example 9 | Example 10 |
|---|---|---|---|---|
| (1a), (1b) | β4T/β4W | 1.185 | 1.248 | 1.094 |
| (2) | β3T/β3W | 1.631 | 2.651 | 1.741 |
| (3) | β5T/β5W | 1.325 | 1.198 | 1.685 |
| (4) | Δ3G/Δ4G | 1.176 | 1.633 | 1.285 |
| (5a), (5b) | |f4|/ft | 0.117 | 0.084 | 0.073 |
| (6) | |f5|/ft | 0.243 | 0.118 | 0.101 |
| (7) | |f3|/ft | 0.111 | 0.072 | 0.069 |
| (8) | |f2|/ft | 0.086 | 0.041 | 0.044 |
| (9) | |f1|/ft | 0.475 | 0.309 | 0.327 |
| (10) | Δ5G/Δ4G | −0.517 | −0.173 | −0.474 |
| (11) | Δ5G/fw | −0.769 | −0.393 | −1.033 |
| (12) | Δ3G/ft | 0.114 | 0.120 | 0.091 |
| (13) | (β2T/β2W)/(ft/fw) | 0.390 | 0.252 | 0.312 |
| (14) | |β2T| | 1.522 | 1.354 | 1.620 |
| (15) | (R1r + R11)/(R1r − R11) | −1.129 | −0.945 | −0.496 |
| (16) | (R2r + R21)/(R2r − R21) | −1.504 | −1.369 | −0.940 |
| (17) | R1c/f1 | 0.535 | 0.546 | 0.611 |
| (18) | vd4 | 64.14 | 68.63 | 67.02 |
| (19) | vd1G | 81.54 | 81.54 | 88.32 |
| (20) | ft/fw | 15.346 | 30.799 | 30.761 |
| (21) | dt/ft | 0.822 | 0.592 | 0.602 |
| (22) | (β4T/β4W)/(ft/fw) | 0.077 | 0.041 | 0.036 |

(Correction of Distortion)

Incidentally, when the zoom lens system of the present invention is used, a digital correction of distortion of an image is carried out electrically. Therefore, by reducing an image height IH at the wide angle end, the effective image pickup area is let to be barrel shaped at the wide angle end.

A basic concept for the digital correction of the distortion of an image will be described below.

For example, as shown in FIG. 15, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 15, a point $P_1$ on a circumference of an arbitrary radius $r_1(ω)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(1)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \tan \omega (0 \leq \alpha \leq 1)$$

where, $\omega$ is a half angle of field of an object, f is a focal length of an imaging optical system (the zoom lens system in the present invention), and $\alpha$ is no fewer than 0, nor more than 1.

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega)-r(\omega)$, an arrangement may be made such that a relationship between $r(\omega)$, in other words, half angle of field and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6Ls$$

where, Ls is a length of a short side of the effective image pickup surface.

It is preferable that the radius R satisfies the following conditional expression.

$$0.3Ls \leq R \leq 0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial image quality, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = a \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and $\omega$ denotes an angle (object half angle of field) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

FIG. 16 to FIG. 18 are conceptual diagrams of a structure of a digital camera according to the present invention in which a zoom lens system described above is incorporated in a taking optical system 141. FIG. 16 is a front perspective view showing an appearance of a digital camera 140, FIG. 17 is a rear view of the same, and FIG. 18 is a schematic cross-sectional view showing a structure of the digital camera 140. In FIG. 16 and FIG. 18, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 18, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle of field.

Moreover, an arrangement may be made such that the zoom lens is detachable from a camera main-body which holds an image pickup element, and the zoom lens may be structured as an interchangeable lens. Nowadays, apart from a single-lens reflex camera which includes a quick-return mirror inside the camera main-body, an interchangeable lens camera in which the quick-return mirror is eliminated is becoming popular. However, in the zoom lens according to each of the embodiments, since back focus is moderately short, it is preferable to use the zoom lens according to each of the embodiments as an interchangeable lens of a camera without the quick-return mirror.

(Internal Circuit Structure)

FIG. 19 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 19, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (Bayer data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As it has been described above, the zoom lens according to the present invention, while having a wide angle of view and a high zoom ratio, is useful for an optical system which corrects various aberrations favorably, and is particularly suitable for an optical system of an image pickup apparatus which includes an electronic image pickup element such as a CCD or a CMOS.

What is claimed is:

1. A zoom lens consisting in order from an object side:
a first lens unit having a positive refractive power;
a second lens unit having a negative refractive power;
a third lens unit having a positive refractive power;
a fourth lens unit having a negative refractive power; and
a fifth lens unit having a positive refractive power, wherein
at the time of zooming from a wide angle end to a telephoto end,
the first lens unit moves toward the object side,
the third lens unit moves toward the object side,
the fourth lens unit moves toward the object side,
a distance between the first lens unit and the second lens unit increases,
a distance between the second lens unit and the third lens unit decreases,
a distance between the third lens unit and the fourth lens unit changes, and
a distance between the fourth lens unit and the fifth lens unit increases, and
the zoom lens satisfies the following conditional expressions (1a), (2), and (3)

$$1.54 < \beta_{4T}/\beta_{4w} < 3.0 \quad (1a)$$

$$1.0 < \beta_{3T}/\beta_{3w} < 5.0 \quad (2)$$

$$1.0 < \beta_{5T}/\beta_{5w} < 3.0 \quad (3)$$

where,
$\beta_{4T}$ denotes a lateral magnification of the fourth lens unit at the telephoto end,
$\beta_{4w}$ denotes a lateral magnification of the fourth lens unit at the wide angle end,
$\beta_{3T}$ denotes a lateral magnification of the third lens unit at the telephoto end,
$\beta_{3w}$ denotes a lateral magnification of the third lens unit at the wide angle end,
$\beta_{5T}$ denotes a lateral magnification of the fifth lens unit at the telephoto end, and
$\beta_{5w}$ denotes a lateral magnification of the fifth lens unit at the wide angle end.

2. The zoom lens according to claim 1, wherein the zoom lens satisfies the following conditional expression (4)

$$1.0 \leq \Delta 3G/\Delta 4G \leq 1.9 \quad (4)$$

where,
$\Delta 3G$ denotes an amount of movement of the third lens unit from a wide angle end position to a telephoto end position, and
$\Delta 4G$ denotes an amount of movement of the fourth lens unit from a wide angle end position to a telephoto end position.

3. The zoom lens according to claim 1, wherein the zoom lens satisfies the following conditional expression (5a)

$$0.05 < |f_4/f_t| < 0.14 \quad (5a)$$

where,
$f_4$ denotes a focal length of the fourth lens unit, and
$f_t$ denotes a focal length of the overall zoom lens system at the telephoto end.

4. The zoom lens according to claim 1, wherein the zoom lens satisfies the following conditional expression (6)

$$0.05 < |f_5|/f_t < 0.3 \quad (6)$$

where,
$f_5$ denotes a focal length of the fifth lens unit.

5. The zoom lens according to claim 1, wherein the zoom lens satisfies the following conditional expression (7)

$$0.05 < |f_3|/f_t < 0.15 \quad (7)$$

where,
$f_3$ denotes a focal length of the third lens unit.

6. The zoom lens according to claim 1, wherein the zoom lens satisfies the following conditional expression (8)

$$0.02 < |f_2|/f_t < 0.15 \quad (8)$$

where,
$f_2$ denotes a focal length of the second lens unit.

7. The zoom lens according to claim 1, wherein the zoom lens satisfies the following conditional expression (9)

$$0.2 < |f_1|/f_t < 0.6 \quad (9)$$

where,
$f_1$ denotes a focal length of the first lens unit.

8. The zoom lens according to claim 1, wherein the zoom lens satisfies the following conditional expression (10)

$$-0.7 \leq \Delta 5G/\Delta 4G \leq 0 \quad (10)$$

where,
$\Delta 5G$ denotes an amount of movement of the fifth lens unit from a wide angle end position to a telephoto end position.

9. The zoom lens according to claim 1, wherein the zoom lens satisfies the following conditional expression (11)

$$-1.5 \leq \Delta 5G/f_w \leq 0 \quad (11)$$

where,
$f_w$ denotes a focal length of the overall zoom lens system at the wide angle end.

10. The zoom lens according to claim 1, wherein
the third lens unit moves integrally with an aperture stop at the time of zooming, and
the zoom lens satisfies the following conditional expression (12)

$$\Delta 3G/f_t \leq 0.2 \qquad (12).$$

11. The zoom lens according to claim 1, wherein the zoom lens satisfies the following conditional expression (13)

$$(\beta_{2T}/\beta_{2W})/(f_t/f_w) \leq 0.45 \qquad (13)$$

where,
$\beta_{2T}$ denotes a lateral magnification of the second lens unit at the telephoto end, and
$\beta_{2W}$ denotes a lateral magnification of the second lens unit at the wide angle end.

12. The zoom lens according to claim 1, wherein the zoom lens satisfies the following conditional expression (14)

$$|\beta_{2T}| \geq 0.8 \qquad (14).$$

13. The zoom lens according to claim 1, wherein
the first lens unit comprises,
a first lens element having a positive refractive power, and
a second lens element having a positive refractive power, and
the zoom lens satisfies the following conditional expressions (15) and (16)

$$-2.0 \leq (R_{1r}+R_{1l})/(R_{1r}-R_{1l})-0.3 \qquad (15)$$

$$-2.0 \leq (R_{2r}+R_{2l})/(R_{2r}-R_{2l})-0.9 \qquad (16)$$

where,
$R_{1r}$ denotes a radius of curvature of an object-side surface of the first lens element in the first lens unit,
$R_{1l}$ denotes a radius of curvature of an image-side surface of the first lens element in the first lens unit,
$R_{2r}$ denotes a radius of curvature of an object-side surface of the second lens element in the first lens unit, and
$R_{2l}$ denotes a radius of curvature of an image-side surface of the second lens element in the first lens unit.

14. The zoom lens according to claim 1, wherein
the first lens unit comprises a cemented lens in which, a lens having a negative refractive power and a lens having a positive refractive power are cemented, and
satisfies the following conditional expression (17)

$$0.4 \leq R_{1c}/f_1 \leq 0.7 \qquad (17)$$

where,
$R_{1c}$ denotes a radius of curvature of a cemented surface of the cemented lens in the first lens unit.

15. The zoom lens according to claim 1, wherein
the number of lenses in the fourth lens unit is one, and
the number of lenses in the fifth lens unit is one.

16. The zoom lens according to claim 1, wherein
the fourth lens unit comprises a negative refractive power lens, and
the negative refractive power lens satisfies the following conditional expression (18)

$$\nu_{d4} \geq 60 \qquad (18)$$

where,
$\nu_{d4}$ denotes Abbe's number for the negative refractive power lens in the fourth lens unit.

17. The zoom lens according to claim 13, wherein the zoom lens satisfies the following conditional expression (19)

$$\nu_{d1G} \geq 70 \qquad (19)$$

where,
$\nu_{d1G}$ denotes an average value of Abbe's number for the positive lenses in the first lens unit.

18. The zoom lens according to claim 1, wherein the zoom lens satisfies the following conditional expression (20)

$$f_t/f_w > 11 \qquad (20).$$

19. The zoom lens according to claim 1, wherein the zoom lens satisfies the following conditional expression (21)

$$d_t/f_t < 1.0 \qquad (21)$$

where,
$d_t$ denotes an overall length of the zoom lens at the telephoto end.

20. An image pickup apparatus comprising:
a zoom lens according to claim 1; and
an image pickup element having an image pickup surface which converts an optical image to an electric signal.

21. A zoom lens consisting in order from an object side:
a first lens unit having a positive refractive power;
a second lens unit having a negative refractive power;
a third lens unit having a positive refractive power;
a fourth lens unit having a negative refractive power; and
a fifth lens unit having a positive refractive power, wherein
at the time of zooming from a wide angle end to a telephoto end,
the first lens unit moves toward the object side,
the third lens unit moves toward the object side,
the fourth lens unit moves toward the object side,
a distance between the first lens unit and the second lens unit increases,
a distance between the second lens unit and the third lens unit decreases,
a distance between the third lens unit and the fourth lens unit changes, and
a distance between the fourth lens unit and the fifth lens unit increases, and
the zoom lens satisfies the following conditional expressions (1b), (2), (3), and (5b)

$$1.0 < \beta_{4T}/\beta_{4w} < 3.0 \qquad (1b)$$

$$1.0 < \beta_{3T}/\beta_{3w} < 5.0 \qquad (2)$$

$$1.0 < \beta_{5T}/\beta_{5w} < 3.0 \qquad (3)$$

$$0.05 < |f_4|/f_t < 0.12 \qquad (5b)$$

where,
$\beta_{4T}$ denotes a lateral magnification of the fourth lens unit at the telephoto end,
$\beta_{4w}$ denotes a lateral magnification of the fourth lens unit at the wide angle end,
$\beta_{3T}$ denotes a lateral magnification of the third lens unit at the telephoto end,
$\beta_{3w}$ denotes a lateral magnification of the third lens unit at the wide angle end,
$\beta_{5T}$ denotes a lateral magnification of the fifth lens unit at the telephoto end, and
$\beta_{5w}$ denotes a lateral magnification of the fifth lens unit at the wide angle end,
$f_4$ denotes a focal length of the fourth lens unit, and
$f_t$ denotes a focal length of the overall zoom lens system at the telephoto end.

22. The zoom lens according to claim 21, wherein the zoom lens satisfies the following conditional expression (4)

$$1.0 \leq \Delta 3G/\Delta 4G \leq 1.9 \qquad (4)$$

where,

Δ3G denotes an amount of movement of the third lens unit from a wide angle end position to a telephoto end position, and Δ4G denotes an amount of movement of the fourth lens unit from a wide angle end position to a telephoto end position.

23. The zoom lens according to claim 21, wherein the zoom lens satisfies the following conditional expression (6)

$$0.05<|f_5|/f_t<0.3 \tag{6}$$

where, $f_5$ denotes a focal length of the fifth lens unit.

24. The zoom lens according to claim 21, wherein the zoom lens satisfies the following conditional expression (7)

$$0.05<|f_3|/f_t<0.15 \tag{7}$$

where, $f_3$ denotes a focal length of the third lens unit.

25. The zoom lens according to claim 21, wherein the zoom lens satisfies the following conditional expression (8)

$$0.02<|f_2|/f_t<0.15 \tag{8}$$

where, $f_2$ denotes a focal length of the second lens unit.

26. The zoom lens according to claim 21, wherein the zoom lens satisfies the following conditional expression (9)

$$0.2<|f_1|/f_t<0.6 \tag{9}$$

where, $f_1$ denotes a focal length of the first lens unit.

27. The zoom lens according to claim 21, wherein the zoom lens satisfies the following conditional expression (10)

$$-0.7 \leq \Delta 5G/\Delta 4G \leq 0 \tag{10}$$

where,

Δ5G denotes an amount of movement of the fifth lens unit from a wide angle end position to a telephoto end position.

28. The zoom lens according to claim 21, wherein the zoom lens satisfies the following conditional expression (11)

$$-1.5 \leq \Delta 5G/f_w \leq 0 \tag{11}$$

where, $f_w$ denotes a focal length of the overall zoom lens system at the wide angle end.

29. The zoom lens according to claim 21, wherein the third lens unit moves integrally with an aperture stop at the time of zooming, and the zoom lens satisfies the following conditional expression (12)

$$\Delta 3G/f_t \leq 0.2 \tag{12}$$

30. The zoom lens according to claim 21, wherein the zoom lens satisfies the following conditional expression (13)

$$(\beta_{2T}/\beta_{2w})/(f_t/f_w) \leq 0.45 \tag{13}$$

where, $\beta_{2T}$ denotes lateral magnification of the second lens unit at the telephoto end, and $\beta_{2w}$ denotes lateral magnification of the second lens unit at the wide angle end.

31. The zoom lens according to claim 21, wherein the zoom lens satisfies the following conditional expression (14)

$$|\beta_{2T}| \geq 0.8 \tag{14}$$

32. The zoom lens according to claim 21, wherein the first lens unit comprises, a first lens element having a positive refractive power, and a second lens element having a positive refractive power, and the zoom lens satisfies the following conditional expressions (15) and (16)

$$-2.0 \leq (R_{1r}+R_{1l})/(R_{1r}-R_{1l}) - 0.3 \tag{15}$$

$$-2.0 \leq (R_{2r}+R_{2l})/(R_{2r}-R_{2l}) - 0.9 \tag{16}$$

where, $R_{1r}$ denotes a radius of curvature of an object-side surface of the first lens element in the first lens unit, $R_{1l}$ denotes a radius of curvature of an image-side surface of the first lens element in the first lens unit, $R_{2r}$ denotes a radius of curvature of an object-side surface of the second lens element in the first lens unit, and $R_{2l}$ denotes a radius of curvature of an image-side surface of the second lens element in the first lens unit.

33. The zoom lens according to claim 21, wherein the first lens unit comprises a cemented lens in which, a lens having a negative refractive power and a lens having a positive refractive power are cemented, and satisfies the following conditional expression (17)

$$0.4 \leq R_{1c}/f_1 \leq 0.7 \tag{17}$$

where, $R_{1c}$ denotes a radius of curvature of a cemented surface of the cemented lens in the first lens unit.

34. The zoom lens according to claim 21, wherein the number of lenses in the fourth lens unit is one, and the number of lenses in the fifth lens unit is one.

35. The zoom lens according to claim 21, wherein the fourth lens unit comprises a negative refractive power lens, and the negative refractive power lens satisfies the following conditional expression (18)

$$\nu_{d4} \geq 60 \tag{18}$$

where, $\nu_{d4}$ denotes Abbe's number for the negative refractive power lens in the fourth lens unit.

36. The zoom lens according to claim 32, wherein the zoom lens satisfies the following conditional expression (19)

$$\nu_{d1G} \geq 70 \tag{19}$$

where, $\nu_{d1G}$ denotes an average value of Abbe's number for the positive lenses in the first lens unit.

37. The zoom lens according to claim 21, wherein the zoom lens satisfies the following conditional expression (20)

$$f_t/f_w > 11 \tag{20}$$

38. The zoom lens according to claim 21, wherein the zoom lens satisfies the following conditional expression (21)

$$d_t/f_t < 1.0 \tag{21}$$

where, $d_t$ denotes an overall length of the zoom lens at the telephoto end.

39. An image pickup apparatus comprising:

a zoom lens according to claim 21; and an image pickup element having an image pickup surface which converts an optical image to an electric signal.

40. A zoom lens consisting in order from an object side:

a first lens unit having a positive refractive power;

a second lens unit having a negative refractive power;

a third lens unit having a positive refractive power;

a fourth lens unit having a negative refractive power; and a fifth lens unit having a positive refractive power, wherein at the time of zooming from a wide angle end to a telephoto end, the first lens unit moves toward the object side, the third lens unit moves toward the object side, the fourth lens unit moves toward the object side, a distance between the first lens unit and the second lens unit increases,
a distance between the second lens unit and the third lens unit decreases,
a distance between the third lens unit and the fourth lens unit changes, and
a distance between the fourth lens unit and the fifth lens unit increases, and
the zoom lens satisfies the following conditional expressions (22), (1b), and (5b)

$$0.02 < (\beta_{4T}/\beta_{4w})/(f_T/f_w) < 0.25 \quad (22)$$

$$1.0 < \beta_{4T}/\beta_{4w} < 3.0 \quad (1b)$$

$$0.05 < |f_4|/f_t < 0.12 \quad (5b)$$

where,
$\beta_{4T}$ denotes a lateral magnification of the fourth lens unit at the telephoto end,
$\beta_{4w}$ denotes a lateral magnification of the fourth lens unit at the wide angle end,
$f_t$ denotes a focal length of the overall zoom lens system at the telephoto end,
$f_w$ denotes a focal length of the overall zoom lens system at the wide angle end, and
$f_4$ denotes a focal length of the fourth lens unit.

41. The zoom lens according to claim 40, wherein the zoom lens satisfies the following conditional expression (4)

$$1.0 \leq \Delta 3G/\Delta 4G \leq 1.9 \quad (4)$$

where,
$\Delta 3G$ denotes an amount of movement of the third lens unit from a wide angle end position to a telephoto end position, and
$\Delta 4G$ denotes an amount of movement of the fourth lens unit from a wide angle end position to a telephoto end position.

42. The zoom lens according to claim 40, wherein the zoom lens satisfies the following conditional expression (6)

$$0.05 < |f_5|/f_t < 0.3 \quad (6)$$

where,
$f_5$ denotes a focal length of the fifth lens unit.

43. The zoom lens according to claim 40, wherein the zoom lens satisfies the following conditional expression (7)

$$0.05 < |f_3|/f_t < 0.15 \quad (7)$$

where,
$f_3$ denotes a focal length of the third lens unit.

44. The zoom lens according to claim 40, wherein the zoom lens satisfies the following conditional expression (8)

$$0.02 < f_2|/f_t < 0.15 \quad (8)$$

where,
$f_2$ denotes a focal length of the second lens unit.

45. The zoom lens according to claim 40, wherein the zoom lens satisfies the following conditional expression (9)

$$0.2 < |f_1|/f_t < 0.6 \quad (9)$$

where,
$f_1$ denotes a focal length of the first lens unit.

46. The zoom lens according to claim 40, wherein the zoom lens satisfies the following conditional expression (10)

$$-0.7 \leq \Delta 5G/\Delta 4G \leq 0 \quad (10)$$

where,
$\Delta 5G$ denotes an amount of movement of the fifth lens unit from a wide angle end position to a telephoto end position.

47. The zoom lens according to claim 40, wherein the zoom lens satisfies the following conditional expression (11)

$$-1.5 \leq \Delta 5G/f_w \leq 0 \quad (11)$$

where,
$f_w$ denotes a focal length of the overall zoom lens at the wide angle end.

48. The zoom lens according to claim 40, wherein
the third lens unit moves integrally with an aperture stop at the time of zooming, and
the zoom lens satisfies the following conditional expression (12)

$$\Delta 3G/f_t \leq 0.2 \quad (12).$$

49. The zoom lens according to claim 40, wherein the zoom lens satisfies the following conditional expression (13)

$$(\beta_{2T}/\beta_{2w})/(f_t/f_w) \leq 0.45 \quad (13)$$

where,
$\beta_{2T}$ denotes a lateral magnification of the second lens unit at the telephoto end, and
$\beta_{2w}$ denotes a lateral magnification of the second lens unit at the wide angle end.

50. The zoom lens according to claim 40, wherein the zoom lens satisfies the following conditional expression (14)

$$|\beta_{2T}| \geq 0.8 \quad (14).$$

51. The zoom lens according to claim 40, wherein
the first lens unit comprises,
a first lens element having a positive refractive power, and
a second lens element having a positive refractive power, and
the zoom lens satisfies the following conditional expressions (15) and (16)

$$-2.0 \leq (R_{1r}+R_{1l})/(R_{1r}-R_{1l}) \leq -0.3 \quad (15)$$

$$-2.0 \leq (R_{2r}+R_{2l})/(R_{2r}-R_{2l}) \leq -0.9 \quad (16)$$

where,
$R_{1r}$ denotes a radius of curvature of an object-side surface of the first lens element in the first lens unit,
$R_{1l}$ denotes a radius of curvature of an image-side surface of the first lens element in the first lens unit,
$R_{2r}$ denotes a radius of curvature of an object-side surface of the second lens element in the first lens unit, and
$R_{2l}$ denotes a radius of curvature of an image-side surface of the second lens element in the first lens unit.

52. The zoom lens according to claim 40, wherein
the first lens unit comprises a cemented lens in which, a lens having a negative refractive power and a lens having a positive refractive power are cemented, and
satisfies the following conditional expression (17)

$$0.4 \leq R_{1c}/f_1 \leq 0.7 \quad (17)$$

where,
$R_{1c}$ denotes a radius of curvature of a cemented surface of the cemented lens in the first lens unit.

53. The zoom lens according to claim 40, wherein
the number of lenses in the fourth lens unit is one, and
the number of lenses in the fifth lens unit is one.

54. The zoom lens according to claim 40, wherein
the fourth lens unit comprises a negative refractive power lens, and
the negative refractive power lens satisfies the following conditional expression (18)

$$v_{d4} \geq 60 \quad (18)$$

where,
$v_{d4}$ denotes Abbe's number for the negative refractive power lens in the fourth lens unit.

55. The zoom lens according to claim 51, wherein the zoom lens satisfies the following conditional expression (19)

$$\nu_{d1G} \geqq 70 \tag{19}$$

where, $\nu_{d1G}$ denotes an average value of Abbe's number for the positive lenses in the first lens unit.

56. The zoom lens according to claim 40, wherein the zoom lens satisfies the following conditional expression (20)

$$f_t/f_w > 11 \tag{20}$$

57. The zoom lens according to claim 40, wherein the zoom lens satisfies the following conditional expression (21)

$$d_t/f_t < 1.0 \tag{21}$$

where, $d_t$ denotes an overall length of the zoom lens at the telephoto end.

58. An image pickup apparatus comprising:

a zoom lens according to claim 40; and an image pickup element having an image pickup surface which converts an optical image to an electric image.

\* \* \* \* \*